US012346989B2

(12) United States Patent
Tsuda

(10) Patent No.: US 12,346,989 B2
(45) Date of Patent: Jul. 1, 2025

(54) SAFETY PERFORMANCE EVALUATION APPARATUS, SAFETY PERFORMANCE EVALUATION METHOD, INFORMATION PROCESSING APPARATUS, AND INFORMATION PROCESSING METHOD

(71) Applicant: SONY GROUP CORPORATION, Tokyo (JP)

(72) Inventor: Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 534 days.

(21) Appl. No.: 17/621,967

(22) PCT Filed: Jun. 30, 2020

(86) PCT No.: PCT/JP2020/025720
§ 371 (c)(1),
(2) Date: Dec. 22, 2021

(87) PCT Pub. No.: WO2021/002368
PCT Pub. Date: Jan. 7, 2021

(65) Prior Publication Data
US 2022/0238019 A1 Jul. 28, 2022

(30) Foreign Application Priority Data
Jul. 1, 2019 (JP) ................. 2019-123177

(51) Int. Cl.
*G06Q 50/40* (2024.01)
*G06Q 40/08* (2012.01)
*H04W 4/38* (2018.01)

(52) U.S. Cl.
CPC ............ *G06Q 50/40* (2024.01); *G06Q 40/08* (2013.01); *H04W 4/38* (2018.02)

(58) Field of Classification Search
None
See application file for complete search history.

(56) References Cited

U.S. PATENT DOCUMENTS 9,646,428 B1   5/2017   Konrardy et al.
9,715,711 B1   7/2017   Konrardy et al.
(Continued)

FOREIGN PATENT DOCUMENTS

CN     110651313 A     1/2020
JP     2016-018477 A   2/2016
(Continued)

OTHER PUBLICATIONS

Extended European Search Report of EP Application No. 20834393. 9, issued on May 13, 2022, 07 pages.
(Continued)

*Primary Examiner* — Amelia Vorce
(74) *Attorney, Agent, or Firm* — CHIP LAW GROUP

(57) ABSTRACT

Provided are a safety performance evaluation apparatus, a safety performance evaluation method, an information processing apparatus, and an information processing method, which enable evaluation of safety performance of a driving assistance processing unit. The safety performance evaluation apparatus includes: an acquisition unit that acquires information regarding a driving assistance function of a mobile object; and an evaluation unit that evaluates safety performance of the driving assistance function of the mobile object on the basis of the acquired information.

19 Claims, 31 Drawing Sheets

3: SAFETY PERFORMANCE EVALUATION SYSTEM

(56) References Cited

U.S. PATENT DOCUMENTS

| | | |
|---|---|---|
| 9,754,325 B1 | 9/2017 | Konrardy et al. |
| 9,767,516 B1 | 9/2017 | Konrardy et al. |
| 9,792,656 B1 | 10/2017 | Konrardy et al. |
| 9,805,423 B1 | 10/2017 | Konrardy et al. |
| 9,852,475 B1 | 12/2017 | Konrardy et al. |
| 9,858,621 B1 | 1/2018 | Konrardy et al. |
| 9,946,531 B1 | 4/2018 | Fields |
| 10,026,130 B1 | 7/2018 | Konrardy et al. |
| 10,043,323 B1 | 8/2018 | Konrardy et al. |
| 10,055,794 B1 | 8/2018 | Konrardy et al. |
| 10,089,693 B1 | 10/2018 | Konrardy et al. |
| 10,181,161 B1 | 1/2019 | Konrardy et al. |
| 10,185,997 B1 | 1/2019 | Konrardy et al. |
| 10,185,998 B1 | 1/2019 | Konrardy et al. |
| 10,223,479 B1 | 3/2019 | Konrardy et al. |
| 10,354,330 B1 | 7/2019 | Konrardy et al. |
| 10,467,704 B1 | 11/2019 | Konrardy et al. |
| 10,504,306 B1 | 12/2019 | Konrardy et al. |
| 10,510,123 B1 | 12/2019 | Konrardy et al. |
| 10,529,027 B1 | 1/2020 | Konrardy et al. |
| 10,685,403 B1 | 6/2020 | Konrardy et al. |
| 10,719,885 B1 | 7/2020 | Konrardy et al. |
| 10,726,498 B1 | 7/2020 | Konrardy et al. |
| 10,726,499 B1 | 7/2020 | Konrardy et al. |
| 10,963,969 B1 | 3/2021 | Konrardy et al. |
| 11,010,840 B1 | 5/2021 | Konrardy et al. |
| 11,023,629 B1 | 6/2021 | Konrardy et al. |
| 11,062,395 B1 | 7/2021 | Konrardy et al. |
| 11,062,396 B1 | 7/2021 | Konrardy et al. |
| 11,062,399 B1 | 7/2021 | Konrardy et al. |
| 11,100,591 B1 | 8/2021 | Konrardy et al. |
| 11,127,083 B1 | 9/2021 | Konrardy et al. |
| 11,238,538 B1 | 2/2022 | Konrardy et al. |
| 11,288,751 B1 | 3/2022 | Konrardy et al. |
| 2017/0161840 A1 | 6/2017 | Omata |
| 2017/0278312 A1* | 9/2017 | Minster ............... G05D 1/0297 |
| 2018/0075538 A1 | 3/2018 | Konrardy et al. |
| 2018/0121576 A1* | 5/2018 | Mosher ............... G06N 20/00 |
| 2018/0315146 A1* | 11/2018 | Matthiesen ........ G01C 21/3461 |
| 2019/0066407 A1* | 2/2019 | Kwak ................... G07C 5/008 |
| 2019/0092339 A1* | 3/2019 | Jang ...................... G07C 5/085 |
| 2020/0027292 A1* | 1/2020 | Watson ............... G07C 5/0841 |
| 2020/0079368 A1 | 3/2020 | Yamada et al. |
| 2020/0302545 A1 | 9/2020 | Konrardy et al. |
| 2020/0302546 A1 | 9/2020 | Konrardy et al. |
| 2020/0302547 A1 | 9/2020 | Konrardy et al. |
| 2020/0302548 A1 | 9/2020 | Konrardy et al. |
| 2020/0310450 A1* | 10/2020 | Reschka ............ G01C 21/3815 |
| 2020/0364953 A1* | 11/2020 | Simoudis ............... G06N 20/00 |
| 2021/0001886 A1* | 1/2021 | Jia ..................... B60W 50/0205 |
| 2021/0049705 A1 | 2/2021 | Konrardy et al. |
| 2021/0097863 A1* | 4/2021 | Eaton ..................... H04W 4/44 |
| 2021/0133871 A1 | 5/2021 | Konrardy et al. |
| 2021/0138659 A1* | 5/2021 | Arora .................. G05D 1/0274 |
| 2021/0171027 A1* | 6/2021 | Kang .................... G07C 5/008 |
| 2021/0387645 A1* | 12/2021 | Kim ................ B60W 30/18154 |
| 2022/0230255 A1* | 7/2022 | Grant ..................... G05D 1/101 |
| 2023/0025414 A1* | 1/2023 | Ma .................. B60W 60/00188 |
| 2023/0038372 A1* | 2/2023 | Yu ........................ G05D 1/0295 |

FOREIGN PATENT DOCUMENTS

| | | |
|---|---|---|
| JP | 2018-155577 A | 10/2018 |
| JP | 2018156550 A | 10/2018 |
| JP | 2018-195301 A | 12/2018 |
| WO | 2016/006234 A1 | 1/2016 |
| WO | WO-2017180394 A1 | 10/2017 |
| WO | 2018/212090 A1 | 11/2018 |

OTHER PUBLICATIONS

International Search Report and Written Opinion of PCT Application No. PCT/JP2020/025720, issued on Sep. 15, 2020, 09 pages of ISRWO.

* cited by examiner

FIG. 2

| VARIOUS SENSORS AND THE LIKE | SAFETY PERFORMANCE INFORMATION | | |
|---|---|---|---|
| | FIRST CONTRACT VEHICLE | SECOND CONTRACT VEHICLE | ... |
| Lidar | ABC-1234XXX | – | ... |
| Radar | RD-647X6P | RD-677Y8P | ... |
| Front Camera | CX-777P | CX-777P | ... |
| Rear Camera | CX-777P | MN-893Y | ... |
| ... | ... | ... | ... |

FIG. 3

| VARIOUS SENSORS AND THE LIKE | SAFETY PERFORMANCE INFORMATION | |  |
| --- | --- | --- | --- |
|  | FIRST CONTRACT VEHICLE | SECOND CONTRACT VEHICLE | ... |
| Lidar | 123FE98C | — | ... |
| Radar | 34F57C29 | 34F57C21 | ... |
| Front Camera | 1A23C977 | 1A23C977 | ... |
| Rear Camera | 1A23C977 | 987BB3FF | ... |
| ... | ... | ... | ... |

FIG. 4

| VARIOUS SENSORS AND THE LIKE | SAFETY PERFORMANCE INFORMATION | | |
|---|---|---|---|
| | FIRST CONTRACT VEHICLE | SECOND CONTRACT VEHICLE | ... |
| V2X MODULE | QCM-333 | ITL-555 | ... |
| LiDAR | ✔ | | ... |
| RADAR | ✔ | ✔ | ... |
| FRONT CAMERA | ✔ | ✔ | ... |
| REAR CAMERA | ✔ | ✔ | ... |
| SIGNAL PROCESSING CHIP | P3768 | P3703 | ... |
| SOFTWARE | QOSver8 | QOSver5 | ... |
| ... | ... | ... | ... |

FIG. 5

| VARIOUS SENSORS AND THE LIKE | SAFETY PERFORMANCE INFORMATION | | |
|---|---|---|---|
| | FIRST CONTRACT VEHICLE | SECOND CONTRACT VEHICLE | ... |
| V2X MODULE | QCM-333 | ITL-555 | ... |
| LiDAR | ABC-1234XXX | — | ... |
| RADAR | RD-647X6P | RD-677Y8P | ... |
| FRONT CAMERA | CX-777P | CX-777P | ... |
| REAR CAMERA | CX-777P | MN-893Y | ... |
| SIGNAL PROCESSING CHIP | P3768 | P3703 | ... |
| SOFTWARE | QOSver8 | QOSver5 | ... |
| ... | ... | ... | ... |

5: SERVER (SAFETY PERFORMANCE EVALUATION APPARATUS 1)

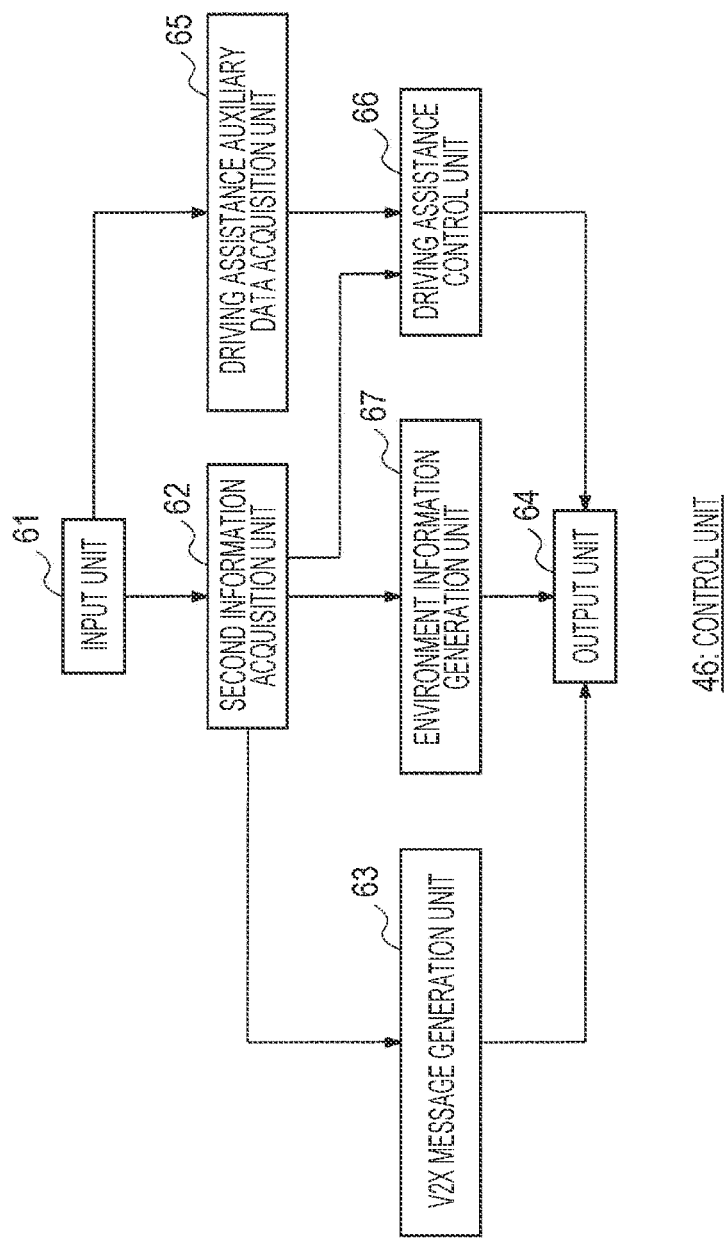

FIG. 10

TRIGGER CONDITIONS AND END CONDITIONS FOR DENM TRANSMISSION

| USE CONDITION | TRIGGER CONDITION | END CONDITION |
|---|---|---|
| EMERGENCY ELECTRONIC BRAKE LAMP | SLAMMING ON BRAKE OF VEHICLE | AUTOMATIC RESTORATION AFTER TIME LIMIT |
| ROAD DIFFERENCE WARNING | DETECTION OF DRIVING ON WRONG ROUTE BY DRIVING VEHICLE IN WRONG DIRECTION | VEHICLE THAT HAS TRAVELED ON WRONG ROUTE PASSES ROAD |
| ACCIDENT OF STOPPED VEHICLE | e-CALL/TRIGGER | VEHICLE THAT HAS HAD ACCIDENT IS MOVED FROM ROAD |
| PROBLEM OF STOPPED VEHICLE | DETECTION OF DISABLED VEHICLE OR STOPPED VEHICLE THAT ISSUES WARNING | VEHICLE IS MOVED FROM ROAD OR PASSES ROAD |
| TRAFFIC JAM WARNING | DETECTION OF TRAFFIC JAM | END OF TRAFFIC JAM |
| TRAFFIC SIGNAL VIOLATION WARNING | DETECTION OF VEHICLE THAT HAS VIOLATED SIGNAL | CORRECTION OF VIOLATION OF SIGNAL BY VEHICLE |
| ROAD CONSTRUCTION WARNING | OUTPUT OF SIGNAL BY FIXED OR MOBILE ROADSIDE ITS STATION | END OF ROAD CONSTRUCTION |
| COLLISION RISK WARNING | DETECTION OF TURN COLLISION RISK BY ROADSIDE ITS STATION | END OF COLLISION RISK |
| | DETECTION OF CROSSING COLLISION RISK BY ROADSIDE ITS STATION | END OF COLLISION RISK |
| | DETECTION OF JOINING COLLISION RISK BY ROADSIDE ITS STATION | END OF COLLISION RISK |
| DANGEROUS SPOT | DETECTION OF DANGEROUS SPOT | AUTOMATIC RESTORATION AFTER TIME LIMIT |
| FALLING | DETECTION OF HEAVY RAIN OR HEAVY SNOW BY VEHICLE (ACTIVATION OF WIPER) | DETECTION OF END OF HEAVY RAIN OR HEAVY SNOW |
| ROAD SLIPPERINESS | DETECTION OF ROAD SLIPPERINESS (ACTIVATION OF ESP) | DETECTION OF END OF ROAD SLIPPERINESS |
| VISIBILITY | DETECTION OF LOW VISIBILITY STATE (ACTIVATION OF LIGHT OR FOG LIGHT) | DETECTION OF END OF LOW VISIBILITY STATE |
| WIND | DETECTION OF STRONG WIND STATE (VEHICLE STABILITY CONTROL) | DETECTION OF END OF STRONG WIND STATE |

5b: SERVER (SAFETY PERFORMANCE EVALUATION APPARATUS 1b)

SAFETY PERFORMANCE EVALUATION APPARATUS, SAFETY PERFORMANCE EVALUATION METHOD, INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2020/025720 filed on Jun. 30, 2020, which claims priority benefit of Japanese Patent Application No. JP 2019-123177 filed in the Japan Patent Office on Jul. 1, 2019. Each of the above-referenced applications is hereby incorporated herein by reference in its entirety.

TECHNICAL FIELD

The present disclosure relates to a safety performance evaluation apparatus, a safety performance evaluation method, an information processing apparatus, and an information processing method.

BACKGROUND ART

In recent years, various sensors have been mounted on a vehicle. A driving assistance system (hereinafter, also referred to as a driving assistance processing unit) that performs driving assistance by performing wireless communication with surrounding vehicles and infrastructure facilities while using output information of this type of sensor has been studied. In order to improve safety performance of the vehicle, the driving assistance system is expected to be more and more developed and spread in the future.

In order to further improve the safety performance of the driving assistance system described above, it is necessary to provide a high-performance sensor, a processor with high processing capability, and the like, and thus, an equipment cost increases. For this reason, although it is known that the safety performance is further improved, there is a concern that the equipment cost becomes a bottleneck which hinders the spread of the driving assistance processing unit having high safety performance.

Meanwhile, a user of the vehicle is required to necessarily purchase an insurance. In order to reduce a burden of insurance premiums, a service in which an insurance premium is discounted according to a travel distance and a past violation history of a driver is performed. In addition, a service in which the insurance premium is decided according to quality of driving of the driver and a driving situation has also been proposed (See Patent Documents 1 and 2).

CITATION LIST

Patent Document

Patent Document 1: Japanese Patent Application Laid-Open No. 2002-297910
Patent Document 2: Japanese Patent Application Laid-Open No. 2006-39642

SUMMARY OF THE INVENTION

Problems to be Solved by the Invention

In a case where it is possible to discount the insurance premium of the vehicle equipped with a driving assistance function having high safety performance, there is a possibility that motivation to introduce the driving assistance system having high safety performance is enhanced and the spread of the driving assistance system is promoted. In order to discount the insurance premium of the vehicle equipped with the driving assistance function having high safety performance, a measure for evaluating safety performance of the driving assistance function that the vehicle is equipped with is required.

An aspect of the present disclosure provides a safety performance evaluation apparatus, a safety performance evaluation method, an information processing apparatus, and an information processing method, which enable evaluation of safety performance of a driving assistance function.

Solutions to Problems

In order to solve the above-described problems, an aspect of the present disclosure provides a safety performance evaluation apparatus including:

an acquisition unit that acquires information regarding a driving assistance function of a mobile object; and an evaluation unit that evaluates safety performance of the driving assistance function of the mobile object on the basis of the acquired information.

The information regarding the driving assistance function of the mobile object may include identification information of a driving assistance processing unit mounted on the mobile object, and the evaluation unit may evaluate the safety performance of the driving assistance function of the mobile object on the basis of the identification information of the driving assistance processing unit.

The information regarding the driving assistance function of the mobile object may include safety performance information of the driving assistance processing unit, and the evaluation unit may evaluate the safety performance of the driving assistance function of the mobile object on the basis of the identification information and the safety performance information of the driving assistance processing unit.

The safety performance information may include at least one of identification information or output information of a sensor built in or connected to the driving assistance processing unit.

The safety performance information may include at least one of identification information of a signal processing large scale integrated circuit (LSI) that implements a function of the driving assistance processing unit, version information of software that implements the function of the driving assistance processing unit, or accident information of the mobile object.

The evaluation unit may evaluate the safety performance of the driving assistance function of the mobile object on the basis of detection capability of a sensor built in or connected to the driving assistance processing unit.

The evaluation unit may evaluate the safety performance of the driving assistance function of the mobile object on the basis of time difference information from a time when the sensor built in or connected to the driving assistance processing unit detects a target object at a reference point to a time when the mobile object passes through the reference point.

The safety performance evaluation apparatus may further include
a number-of-times measurement unit that measures the number of times a specific message has been transmitted by the driving assistance processing unit, in which the evaluation unit may evaluate the safety performance of the driving assistance function of the mobile object on the basis of the number of times measured by the number-of-times measurement unit.

The evaluation unit may evaluate the safety performance of the driving assistance function of the mobile object on the basis of the output information of the sensor built in or connected to the driving assistance processing unit when the mobile object transmits a message.

The safety performance evaluation apparatus may further include:
an area setting unit that sets a predetermined area; and
an information extraction unit that extracts the information regarding the driving assistance function of the mobile object acquired within the predetermined area by the acquisition unit,
in which the evaluation unit may evaluate the safety performance of the driving assistance function of the mobile object on the basis of the information extracted by the information extraction unit.

The safety performance evaluation apparatus may further include:
a time zone setting unit that sets a predetermined time zone; and
an information extraction unit that extracts the information regarding the driving assistance function of the mobile object acquired within the predetermined time zone by the acquisition unit,
in which the evaluation unit may evaluate the safety performance of the driving assistance function of the mobile object on the basis of the information extracted by the information extraction unit.

The safety performance evaluation apparatus may further include a deciding unit that decides an insurance premium for the mobile object on the basis of the safety performance evaluated by the evaluation unit.

The safety performance evaluation apparatus may further include:
a safety performance standard determination unit that determines whether or not the safety performance evaluated by the evaluation unit has reached a predetermined standard; and
a maintenance alert unit that urges maintenance of the driving assistance function of the mobile object in a case where it is determined by the safety performance standard determination unit that the predetermined standard has not been reached.

Another aspect of the present disclosure provides a safety performance evaluation method including:
acquiring information regarding a driving assistance function of a mobile object; and
evaluating safety performance of the driving assistance function of the mobile object on the basis of the acquired information is provided.

Another aspect of the present disclosure provides an information processing apparatus including:
a driving assistance processing unit that generates information regarding safety performance evaluation for a driving assistance function; and
a communication unit that transmits the information,
in which the information transmitted from the communication unit includes first identification information for identifying the driving assistance processing unit and second identification information for identifying a mobile object on which the driving assistance processing unit and the communication unit are mounted.

One or more sensors may be built in or connected to the driving assistance processing unit, and
the information may include output information of the one or more sensors and third identification information for identifying the one or more sensors.

The information may include at least one of identification information of a signal processing LSI that implements a function of the driving assistance processing unit, version information of software that implements the function of the driving assistance processing unit, or accident information of the mobile object.

The driving assistance processing unit may dynamically set a type of a specific message according to at least one of an area in which the mobile object is positioned or a time zone in which the communication unit performs communication.

The information processing apparatus may further include:
a first determination unit that determines whether or not a predetermined event has occurred; and
a second determination unit that determines whether or not the mobile object is traveling in a predetermined area or in a predetermined time zone,
in which the driving assistance processing unit generates dynamic information regarding safety performance corresponding to the event in a case where it is determined that the predetermined event has occurred, and
in a case where it is determined that the predetermined event has occurred and it is determined that the mobile object is traveling in the predetermined area or the predetermined time zone, the transmission unit transmits the dynamic information corresponding to the event.

Another aspect of the present disclosure provides an information processing method including:
generating information regarding safety performance evaluation for a driving assistance function of a mobile object; and
transmitting a plurality of messages and the information from a communication unit,
in which the information transmitted from the communication unit in a case where the communication unit transmits a specific message among the plurality of messages includes first identification information for identifying a driving assistance processing unit mounted on the mobile object and second identification information for identifying the mobile object on which the driving assistance processing unit and the communication unit are mounted.

BRIEF DESCRIPTION OF DRAWINGS

FIG. 2 is a diagram illustrating a first example of safety performance information of a first contract vehicle and a second contract vehicle registered in a server.

FIG. 3 is a diagram illustrating a second example of the safety performance information of the first contract vehicle and the second contract vehicle registered in the server.

FIG. 4 is a diagram illustrating a third example of the safety performance information of the first contract vehicle and the second contract vehicle registered in the server.

FIG. 5 is a diagram illustrating a fourth example of the safety performance information of the first contract vehicle and the second contract vehicle registered in the server.

FIG. 9 is a block diagram illustrating an example of a detailed configuration of a control unit of FIG. 7.

FIG. 10 is a diagram illustrating use conditions, trigger conditions, and end conditions for transmitting a decentralized environmental notification message (DENM).

MODE FOR CARRYING OUT THE INVENTION

Hereinafter, embodiments of a safety performance evaluation apparatus and an information processing apparatus will be described with reference to the drawings. Hereinafter, main components of the safety performance evaluation apparatus and the information processing apparatus will be mainly described, but the safety performance evaluation apparatus and the information processing apparatus can have components and functions that are not illustrated or described. The following description does not exclude components and functions that are not illustrated or described.

Hereinafter, an example in which the safety performance evaluation apparatus is mounted on a server and the information processing apparatus is mounted on a vehicle will be mainly described, but the information processing apparatus can also be mounted on various mobile objects other than a vehicle, for example, an aircraft, a ship, a drone, a robot, and the like. Furthermore, the safety performance evaluation apparatus can be mounted on various computer devices such as a device capable of performing communication with the information processing apparatus, for example, a personal computer, a workstation, or the like. Hereinafter, a contract vehicle that has purchased any vehicle insurance will be described as an example of the vehicle on which the information processing apparatus is mounted.

First Embodiment

Figure 1:
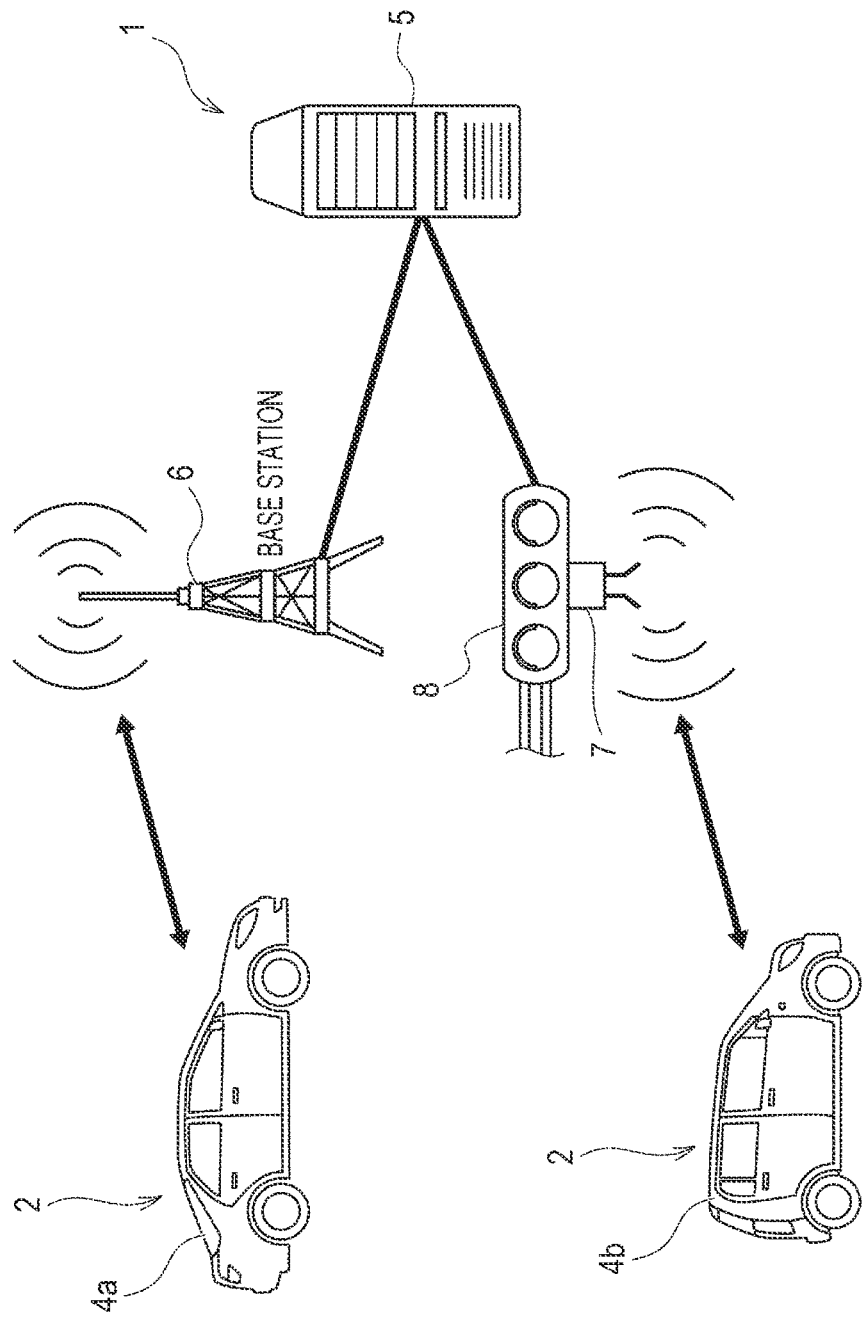
FIG. 1 is a block diagram illustrating a schematic configuration of a safety performance evaluation system including a safety performance evaluation apparatus and an information processing apparatus according to a first embodiment.

FIG. 1 is a block diagram illustrating a schematic configuration of a safety performance evaluation system 3 including a safety performance evaluation apparatus 1 and an information processing apparatus 2 according to a first embodiment. The safety performance evaluation system 3 of FIG. 1 includes a first contract vehicle 4a and a second contract vehicle 4b each on which the information processing apparatus 2 is mounted, and a server 5 on which the safety performance evaluation apparatus 1 is mounted. The first contract vehicle 4a and the second contract vehicle 4b are vehicles having an insurance contract with an insurance company. Specific contents and types of the insurance are not limited. For example, any insurance related to a vehicle, such as a personal injury liability insurance, a property damage liability insurance, a personal injury insurance, and a vehicle insurance can be covered. Further, although only two contract vehicles are illustrated in FIG. 1, the number of contract vehicles that performs communication with the server 5 is arbitrary.

An advanced driver-assistance systems (ADAS)/autonomous driving (AD) system that implements a driving assistance function is mounted on each of the first contract vehicle 4a and the second contract vehicle 4b. The ADAS/AD systems mounted on the first contract vehicle 4a and the second contract vehicle 4b are different from each other, and have different safety performance. The server 5 receives, for example, safety performance information of the ADAS/AD system from each contract vehicle through wireless communication via a base station 6 or a road side unit (RSU) 7, and registers and holds the safety performance information. As described later, the server 5 has a function of evaluating safety performance of each contract vehicle on the basis of the safety performance information received from each contract vehicle. The server 5 can decide an insurance premium of each contract vehicle on the basis of a result of evaluating the safety performance of each contract vehicle. For example, a contract vehicle having more excellent safety performance can get a higher discount rate for a basic insurance premium, that is, the insurance premium can be reduced.

Here, the safety performance information includes static safety performance information that does not depend on a time, a situation, and the like, and dynamic safety performance information that changes according to a time, a situation, and the like. In the present embodiment, the safety performance of the ADAS/AD system is evaluated on the basis of the static safety performance information.

The static safety performance information includes information such as a specification of the ADAS/AD system mounted on each contract vehicle and specifications of various facilities mounted on each contract vehicle and affecting the safety performance. More specifically, the static safety performance information includes identification information of each sensor connected to the ADAS/AD system mounted on each contract vehicle, identification information of the ADAS/AD system, identification information of each contract vehicle, and the like. In addition, the static safety performance information may include identification information of a signal processing large scale integrated circuit (LSI) that implements the function of the ADAS/AD system and information of its kind, and a type and version information of software that implements the function of the ADAS/AD system.

An example of the static safety performance information regarding the sensor is information regarding a type of the sensor. Examples of the sensor include a position information sensor, a camera module (including an image sensor), a light detection and ranging or laser imaging detection and ranging (LiDAR), a radar, and the like. In addition, the static safety performance information may include information of a manufacturer of each sensor and a specification of the sensor. For example, the specification of the sensor is the number of pixels or an angle of view in a case of the camera module (image sensor) or the LiDAR. In a case of the radar, the specification of the sensor is resolution (azimuth resolution/range resolution).

Further, in a case where a contractor or a user of the contract vehicle makes an insurance contract for the contract vehicle, information of a sensor reported as being mounted on the contract vehicle may be registered in the server 5 as the static safety performance information. Further, the static safety performance information may include a product model number of each sensor, or may include unique identification information allocated to each product model number of each sensor.

In addition to the identification information of the sensor, the static safety performance information included in the safety performance information includes, for example, an identification number of the vehicle on which the ADAS/AD system is mounted, the identification information of the ADAS/AD system, the identification information of the signal processing LSI that implements the function of the ADAS/AD system, the version information of the software that implements the function of the ADAS/AD system, and the like. Here, the identification information of the vehicle on which the ADAS/AD system is mounted may be, for example, a vehicle type name or a model name of the vehicle.

In addition, in a case where a general-purpose communication device such as a vehicle-to-everything (V2X) module cooperating with the ADAS/AD system is mounted on the vehicle, identification information such as a model name of the V2X module or the like can be included in the static safety performance information.

FIG. 1 illustrates an example in which the ADAS/AD system of the first contract vehicle 4a has more excellent safety performance than the ADAS/AD system of the second contract vehicle 4b. The first contract vehicle 4a performs cellular wireless communication with the base station 6, whereas the second contract vehicle 4b performs wireless communication with the RSU 7 installed on a traffic light 8, a road sign (not illustrated), or the like. Note that the first contract vehicle 4a may have a function of performing wireless communication with the RSU 7 installed on the traffic light 8, a road sign (not illustrated), or the like, in addition to the function of performing cellular wireless communication with the base station 6.

The server 5 registers the safety performance information of the ADAS/AD system mounted on the first contract vehicle 4a and the safety performance information of the ADAS/AD system mounted on the second contract vehicle 4b in a distinguishable manner. The ADAS/AD systems having different safety performance functions are mounted on the first contract vehicle 4a and the second contract vehicle 4b, respectively. In the present specification, the ADAS/AD system may be collectively referred to as a driving assistance processing unit. The driving assistance processing unit performs various types of driving assistance processing. For example, the driving assistance processing unit performs various types of driving assistance processing such as a function of predicting a collision with an obstacle ahead and issuing an alarm or automatically applying a brake, a function of assisting a steering wheel operation so as to travel while keeping the lane, a function of maintaining a constant inter-vehicle distance, a function of automatically parking the vehicle in a parking space, or a function of assisting the driver at the time of parking the vehicle in a parking space. The driving assistance processing unit according to the present embodiment generates information regarding safety performance evaluation for the driving assistance function.

The server 5 according to the present embodiment evaluates the safety performance of the ADAS/AD system on the basis of the static safety performance information of the ADAS/AD system mounted on each contract vehicle. FIG. 2 is a diagram illustrating a first example of the static safety performance information of the first contract vehicle 4a and the second contract vehicle 4b registered in the server 5. In the example of FIG. 2, a product model number of each sensor such as a LiDAR, a radar, a front camera, a rear camera, or the like is registered. Note that, although FIG. 2 illustrates an example in which the product model number of each mounted sensor is registered for each contract vehicle, the product model number of each sensor may be registered for each piece of unique identification information assigned to each contract vehicle by the insurance company. The identification information of each contract vehicle may be a number uniquely assigned to identify a vehicle body, a chassis number, a vehicle registration number plate, or a vehicle number plate. Here, the product model number of each sensor is registered for each contract vehicle. However, the product model number of each sensor may also be registered for each vehicle type.

FIG. 3 is a diagram illustrating a second example of the safety performance information of the first contract vehicle 4a and the second contract vehicle 4b registered in the server 5. Similarly to FIG. 2, in the example of FIG. 3, for each contract vehicle, each sensor is classified for each type, and unique identification information with the same number of digits is given to each sensor.

FIG. 4 is a diagram illustrating a third example of the safety performance information of the first contract vehicle 4a and the second contract vehicle 4b registered in the server 5. In the example of FIG. 4, the product model number of the V2X module cooperating with the ADAS/AD system and information regarding whether or not each sensor corresponds to the V2X module are registered. FIG. 4 illustrates that the sensor with a check mark corresponds to the V2X module. In addition, as the safety performance information other than the sensor, a product model number of the signal processing LSI that implements the function of the ADAS/AD system and a version number of the software that implements the function of the ADAS/AD system are registered. Both the product model number of the signal processing LSI and the version number of the software are identification information for identifying the signal processing LSI and the software. Note that, more specifically, the signal processing LSI is a generic name of a semiconductor circuit that performs a processing operation for implementing the function of the ADAS/AD system, and is interpreted including a board on which a plurality of LSIs is mounted. Further, the signal processing LSI may have a processing function including image processing and further including image recognition processing.

FIG. 5 is a diagram illustrating a fourth example of the safety performance information of the first contract vehicle 4a and the second contract vehicle 4b registered in the server 5. In the example of FIG. 5, the product model number of each sensor connected to each V2X module is registered. Further, similarly to FIG. 4, the product model number of the signal processing LSI that implements the function of the ADAS/AD system and the version number of the software that implements the function of the ADAS/AD system are registered.

FIGS. 2 to 5 merely illustrate the safety performance information of each contract vehicle registered in the server 5, and various variations are conceivable. For example, in a case where the type of the mounted ADAS/AD system is different for each model name of the vehicle, the model name of the vehicle or the identification information thereof may be included in the safety performance information.

Figure 6:
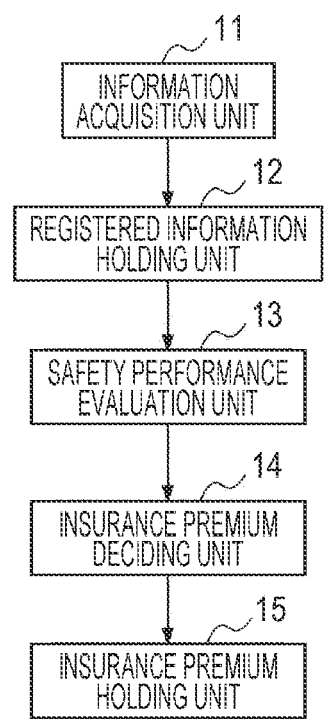
FIG. 6 is a block diagram illustrating an internal configuration of the server on which the safety performance evaluation apparatus is mounted according to the first embodiment.

FIG. 6 is a block diagram illustrating an internal configuration of the server 5 on which the safety performance evaluation apparatus 1 according to the first embodiment is mounted. The server 5 of FIG. 6 includes an information acquisition unit 11, a registered information holding unit 12, a safety performance evaluation unit 13, an insurance premium deciding unit 14, and an insurance premium holding unit 15. Among them, the information acquisition unit 11 and the safety performance evaluation unit 13 are essential constituent units, and the others are optional constituent units that can be appropriately omitted.

The information acquisition unit 11 acquires information from each contract vehicle through wireless communication via the base station 6 or the RSU 7. The information acquired by the information acquisition unit 11 is information regarding the driving assistance function of the contract vehicle, and includes the static safety performance information described above. The information acquisition unit 11 acquires the static safety performance information that does not depend on a time, a situation, and the like.

The registered information holding unit 12 holds the static safety performance information included in the safety performance information. For example, the registered information holding unit 12 holds information that does not change according to an environment, a time, and a traveling state, such as information regarding the specification of the ADAS/AD system. Note that the registered information holding unit 12 may pre-register information regarding the ADAS/AD system mounted on each contract vehicle. In addition, the information acquisition unit 11 may regularly or irregularly acquire the information regarding the ADAS/AD system, and the pre-registered information may be updated with the static safety performance information acquired by the information acquisition unit 11. The information held in the registered information holding unit 12 is a part of the safety performance information, and is transmitted to the safety performance evaluation unit 13 as necessary.

FIGS. 2 to 5 described above illustrate the static safety performance information held in the registered information holding unit 12. The registered information holding unit 12 may classify and register each sensor according to a type, an installation place, or the like of each sensor connected to the ADAS/AD system. At this time, the registered information holding unit 12 may identify each sensor by the product model number, or may hold identification information in a format common to all sensors. As described above, a data format of the information registered in the registered information holding unit 12 is arbitrary.

The safety performance evaluation unit 13 evaluates the safety performance of the ADAS/AD system mounted on each contract vehicle on the basis of the static safety performance information held in the registered information holding unit 12. The evaluation result is transmitted to the insurance premium deciding unit 14 as a safety performance evaluation level. More specifically, the safety performance evaluation unit 13 evaluates the safety performance of the ADAS/AD system on the basis of the driving assistance function of the ADAS/AD system mounted on each contract vehicle. In a case where a plurality of sensors is connected to the ADAS/AD system, the safety performance may be evaluated for each sensor. In addition, the identification information of the signal processing LSI that implements the function of the ADAS/AD system, the version information of the software that implements the function of the ADAS/AD system, and the like can also be elements for evaluating the safety performance of the ADAS/AD system.

Furthermore, the safety performance evaluation unit 13 may evaluate the safety performance of the ADAS/AD system on the basis of whether or not a specific type of sensor is connected to the ADAS/AD system. For example, the safety performance evaluation unit 13 evaluates the safety performance of the ADAS/AD system as being higher in a case where a sensor having higher safety performance different from a sensor provided as standard equipment in the ADAS/AD system is optionally connected to the ADAS/AD system.

For example, evaluation information of a safe driving facility of the vehicle evaluated in the new car assessment programme (NCAP) may be prepared in advance and held in the safety performance evaluation unit 13, and a safety performance level of the ADAS/AD system of each contract vehicle may be decided on the basis of the evaluation result. In addition, a result obtained by analyzing an evaluation result of the NCAP according to the type of the mounted sensor, the type and version of the software, or the like may be prepared, and the safety performance level of the ADAS/AD system of each contract vehicle may be decided on the basis of the analysis result according to the type of the used sensor. It is a matter of course that not only the evaluation result obtained by the NCAP but also evaluation results obtained by other groups may be used.

Furthermore, in a case where a plurality of sensors is connected to the ADAS/AD system, the safety performance may be evaluated for each of the plurality of sensors connected to the ADAS/AD system, and the safety performance level may be decided by comprehensively considering the safety performance evaluation results of the respective sensors. At that time, priority may be given to the plurality of sensors, and the safety performance level may be decided comprehensively with more emphasis on safety performance of a sensor having a high safety priority.

The insurance premium deciding unit 14 decides an insurance cost of the vehicle, that is, the insurance premium on the basis of the safety performance level of the ADAS/AD system evaluated by the safety performance evaluation unit 13. The insurance premium deciding unit 14 increases a discount rate for the basic insurance premium as the ADAS/AD system having more excellent safety performance is mounted on the contract vehicle. As described above, motivation to mount the ADAS/AD system having excellent safety performance is enhanced and the ADAS/AD system having excellent safety performance can be spread by actively discounting the insurance premium of the contract vehicle on which the ADAS/AD system having excellent safety performance is mounted.

In a case where the safety performance evaluation unit 13 evaluates that the safety performance is high, the insurance premium deciding unit 14 increases the discount rate for the basic insurance premium. For example, in a case where a sensor having safety performance more excellent than usual is connected to the ADAS/AD system and the safety performance is evaluated as being high by the safety performance evaluation unit 13, the insurance premium deciding unit 14 increases the discount rate for the basic insurance premium.

Figure 7:
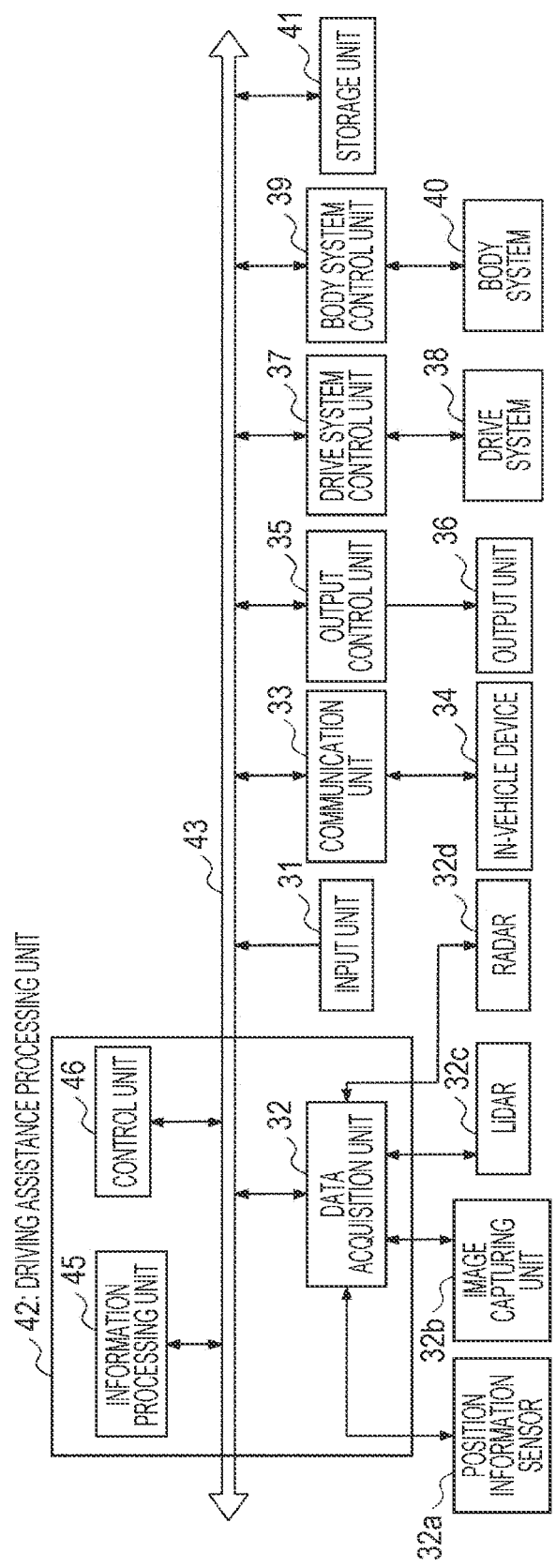
FIG. 7 is a block diagram illustrating a schematic configuration of the information processing apparatus mounted on the first contract vehicle and the second contract vehicle.

FIG. 7 is a block diagram illustrating a schematic configuration of the information processing apparatus 2 mounted on the first contract vehicle 4a and the second contract vehicle 4b. The information processing apparatus 2 of FIG. 7 includes an input unit 31, a data acquisition unit 32, a communication unit 33, an in-vehicle device 34, an output control unit 35, an output unit 36, a drive system control unit 37, a drive system 38, a body system control unit 39, a body system 40, a storage unit 41, and a driving assistance processing unit 42.

The respective units in the information processing apparatus 2 are connected to one another via a communication network 43. As the communication network 43, for example, an in-vehicle communication network according to any protocol such as a controller area network (CAN), a local interconnect network (LIN), a local area network (LAN), a FlexRay (registered trademark), or the like, a bus, or the like can be used. Note that at least some constituent units in the information processing apparatus 2 may be directly connected to one another without the communication network 43. Note that, hereinafter, even in a case where each unit of the information processing apparatus 2 performs communication via the communication network 43, the description of the communication network 43 may be omitted.

The input unit 31 includes an apparatus used by a passenger for inputting various data, instructions, and the like. For example, the input unit 31 includes an operation device such as a touch panel, a button, a microphone, a switch, a lever, or the like, an operation device capable of performing input using a voice, a gesture, a change in viewpoint, or the like by a method other than a manual operation, and the like. Furthermore, for example, the input unit 31 may be a remote control apparatus using infrared rays or other electric waves, or an external connection device such as a mobile device, a wearable device, or the like corresponding to the operation of the information processing apparatus 2. The input unit 31 generates an input signal on the basis of data, an instruction, or the like input by the passenger, and supplies the input signal to each unit of the information processing apparatus 2.

Various sensors are connected to the data acquisition unit 32. The data acquisition unit 32 acquires output information of these sensors. The output information of each sensor acquired by the data acquisition unit 32 is supplied to each unit of the information processing apparatus 2.

For example, the data acquisition unit 32 acquires the output information of various sensors for detecting the state of the vehicle and the like. There are various sensors acquired by the data acquisition unit 32. In FIG. 7, a position information sensor 32a, an image capturing unit 32b, a LiDAR 32c, and a radar 32d are illustrated as representative sensors, but the sensor whose output information is acquired by the data acquisition unit 32 is not limited to the illustrated sensors.

The position information sensor 32a is a sensor that receives a global navigation satellite system (GNSS) signal from a GNSS satellite represented by a global positioning system (GPS). Position information may be detected by a method other than or in combination with a method of receiving the GNSS signal to detect the position information. For example, the position information may be detected by performing map matching with a vehicle speed sensor. Here, map information used for the map matching may be a dynamic map, and furthermore, image information captured by the image capturing unit 32b may be used.

The image capturing unit 32b includes, for example, an image sensor such as a complementary metal oxide semiconductor (CMOS) sensor, a charge coupled device (CCD) sensor, or the like. Furthermore, the image capturing unit 32b may be various apparatuses in which the image sensor is built, such as a Time of Flight (ToF) camera, a stereo camera, a monocular camera, an infrared camera, other cameras, and the like.

The LiDAR 32c radiates light such as ultraviolet rays, visible rays, or near-infrared rays, and measures a distance to a target object on the basis of a time until reflected light thereof is received. The radar 32d measures a distance to a target object by using an electromagnetic wave having a wavelength (for example, 40 GHz band) shorter than that of the LiDAR 32c.

Note that other sensors may also be used as the sensor whose output information is to be acquired by the data acquisition unit 32. For example, the data acquisition unit 32 may acquire output information of a gyro sensor, an acceleration sensor, and an inertial measurement unit (IMU). Alternatively, the data acquisition unit 32 may acquire output information of a sensor for detecting an operation amount of an accelerator pedal, an operation amount of a brake pedal, a steering angle of a steering wheel, an engine speed, a motor speed, a wheel rotation speed, or the like.

Furthermore, the data acquisition unit 32 may acquire output information of an environment sensor for detecting climate, weather, or the like, or a surrounding information detection sensor for detecting an object around the vehicle. Examples of the environmental sensor may include a raindrop sensor, a fog sensor, a sunshine sensor, a snow sensor, and the like. Examples of the surrounding information detection sensor may include an ultrasonic sensor, a sonar, and the like in addition to the LiDAR 32c and the radar 32d described above. In addition, in a case where weather information is reported, the data acquisition unit 32 may acquire the reported information and acquire information regarding an environment.

Furthermore, for example, the data acquisition unit 32 may acquire output information of various sensors for detecting information inside the vehicle. For example, the data acquisition unit 32 may acquire output information of an image capturing apparatus that captures an image of the driver, a biological sensor that detects biological information of the driver, a microphone that collects sound in a passenger compartment, and the like. The biological sensor is provided at, for example, a seat surface, a steering wheel, or the like, and detects biological information of the passenger sitting on a seat or the driver holding the steering wheel.

The communication unit 33 performs communication with the in-vehicle device 34, various devices outside the vehicle, the server 5, the base station 6, and the like, transmits data supplied from each unit of the information processing apparatus 2, and supplies received data to each unit of the information processing apparatus 2. Note that a communication protocol supported by the communication unit 33 is not particularly limited. Further, the communication unit 33 can support a plurality of types of communication protocols.

For example, the communication unit 33 performs wireless communication with the in-vehicle device 34 by long term evolution (LTE), a fifth generation mobile communication system (5G), device-to-device (D2D) communication, wireless LAN, Bluetooth (registered trademark), near field communication (NFC), wireless USB (WUSB), or the like. Furthermore, for example, the communication unit 33 performs wired communication with the in-vehicle device 34 via a connecting terminal (not illustrated) (and, if necessary, via a cable) by using a universal serial bus (USB), a high-definition multimedia interface (HDMI), a mobile high-definition link (MHL), or the like.

Moreover, for example, the communication unit 33 may perform communication with a device (for example, an application server or a control server) present on an external network (for example, the Internet, a cloud network, or a company-specific network) through, for example, the base station 6 or an access point. Furthermore, for example, the communication unit 33 may perform communication with a terminal (for example, a terminal of a pedestrian or a shop, or a machine type communication (MTC) terminal) present in the vicinity of the vehicle by using a peer-to-peer (P2P) technology. Moreover, for example, the communication unit 33 performs V2X communication such as vehicle-to-vehicle communication, vehicle-to-infrastructure communication, vehicle-to-home communication, vehicle-to-network (base station 6) communication, vehicle-to-pedestrian communication, and the like. The V2X communication can be implemented by providing the V2X module in the communication unit 33. Note that a message transmitted and received by the vehicle is not necessarily limited to a V2X message. There may also be messages transmitted and received using a protocol other than a protocol used for the V2X communication. For example, the communication unit 33 includes a beacon receiving unit, receives electric waves or electromagnetic waves sent from a wireless station installed on a road, or the like, and acquire information such as a current position, a traffic jam, a traffic regulation, a time required, or the like. In the present specification, an example in which the vehicle mainly transmits and receives the V2X message will be described. Here, the V2X message refers to a message that is transmitted by using a protocol for performing the V2X communication when a specific event occurs.

The in-vehicle device 34 includes, for example, a mobile device or a wearable device of the passenger, an information device carried in or attached to the vehicle, a navigation device that searches for a route to an arbitrary destination, and the like.

The output control unit 35 controls output of various types of information to the passenger of the vehicle or to the outside of the vehicle. For example, the output control unit 35 controls output of visual information and auditory information from the output unit 36 by generating an output signal including at least one of the visual information (for example, image data) or the auditory information (for example, sound data) and supplying the output signal to the output unit 36. For example, the output control unit 35 combines image data captured by different image capturing devices of the data acquisition unit 32 to generate a bird's-eye view image, a panoramic image, or the like, and supplies an output signal including the generated image to the output unit 36. Furthermore, for example, the output control unit 35 generates sound data including a warning sound, a warning message, or the like for danger such as a collision, a contact, or an entry into a danger zone, and supplies an output signal including the generated sound data to the output unit 36.

The output unit 36 includes an apparatus capable of outputting the visual information or auditory information to the passenger of the vehicle or to the outside of the vehicle. For example, the output unit 36 includes a display apparatus, an instrument panel, an audio speaker, a headphone, a wearable device such as a glasses-type display worn by the passenger, a projector, a lamp, and the like. The display apparatus included in the output unit 36 may be a normal display, or may display visual information in the field of view of the driver, such as a head-up display, a transmissive display, an augmented reality (AR) display apparatus, or the like. Furthermore, the display apparatus included in the output unit 36 may be a transmissive display provided on a shield of a helmet.

The drive system control unit 37 controls the drive system 38 by generating various control signals and supplying the control signals to the drive system 38. In addition, the drive system control unit 37 supplies a control signal to each unit other than the drive system 38 as necessary, and makes a notification of a control state of the drive system 38 and the like. In addition, the drive system control unit 37 controls the drive system 38 by generating various control signals on the basis of output data from the driving assistance processing unit 42 and supplying the control signals to the drive system 38. For example, in a case where a distance to an obstacle in a traveling direction or a preceding vehicle is short, a control signal for applying a brake is generated to perform a brake control.

The drive system 38 includes various apparatuses related to a drive system of the vehicle. For example, the drive system 38 includes a driving force generation apparatus for generating a driving force such as an internal combustion engine or a driving motor, a driving force transmission mechanism for transmitting the driving force to wheels, a steering mechanism for adjusting a steering angle, a braking apparatus for generating a braking force, an antilock brake system (ABS), an electronic stability control (ESC), an electric power steering apparatus, and the like.

The body system control unit 39 controls the body system 40 by generating various control signals and supplying the control signals to the body system 40. Furthermore, the body system control unit 39 generates a signal for making a notification of a control state of the body system 40 and the like as necessary, and supplies the signal to each unit other than the body system 40.

The body system 40 includes various body apparatuses mounted on the vehicle body. For example, the body system 40 includes a keyless entry system, a smart key system, a power window apparatus, a power seat, a steering wheel, an air conditioner, various lamps (for example, a head lamp, a back lamp, a brake lamp, a blinker, a fog lamp, and the like), and the like.

The storage unit 41 includes, for example, a read only memory (ROM), a random access memory (RAM), a magnetic storage device such as a hard disc drive (HDD), a semiconductor storage device, an optical storage device, a magneto-optical storage device, and the like. The storage unit 41 stores various programs, data, and the like used by each unit of the information processing apparatus 2. For example, the storage unit 41 stores map data such as a three-dimensional high-precision map such as a dynamic map, a global map that is less accurate than the high-precision map and covers a wide area, a local map including information regarding the surrounding of the vehicle, and the like.

The driving assistance processing unit 42 performs, for example, signal processing for implementing the ADAS/AD system, and controls driving assistance such as collision prevention or the like. More specifically, the driving assistance processing unit 42 performs various driving assistance controls such as a control for preventing a collision with an obstacle ahead, a steering wheel operation control, constant inter-vehicle spacing control, and a parking guidance control. In addition, the driving assistance processing unit 42 generates information to be used for safety performance evaluation, including a plurality of V2X messages related to the driving assistance. The generated information to be used for the safety performance evaluation is transmitted to the server 5 through vehicle-to-infrastructure (V2I) communication or the like. Alternatively, the generated information to be used for the safety performance evaluation may be transmitted to the server 5 via another vehicle through vehicle-to-vehicle (V2V) communication. Data transmitted from the communication unit 33 when the information (including the V2X message) used for the safety performance evaluation is transmitted includes first identification information for identifying the driving assistance processing unit 42 and second identification information for identifying the vehicle on which the driving assistance processing unit 42 and the communication unit 33 are mounted. The first identification information is used to evaluate the safety performance of the ADAS/AD system. The second identification information is used to specify that the vehicle on which the driving assistance processing unit 42 is mounted is an insurance contract vehicle. The second identification information can be used to evaluate the safety performance of the ADAS/AD system. Further, in addition to the data acquisition unit 32 described above, the driving assistance processing unit 42 includes an information processing unit 45 and a control unit 46.

In addition, if necessary for the processing in the server 5, when the information to be used for the safety performance evaluation is transmitted, vehicle position information (/GPS information), time information (time information at the time of data transmission, time information at the time of event detection, and the like), information regarding a sensor that greatly contributes to the event detection, and the like may be transmitted together.

The information processing unit 45 performs various types of information processing on the basis of the output information of each sensor acquired by the data acquisition unit 32. For example, the information processing unit 45 uses the output information of each sensor to calculate the position information of the contract vehicle on which the driving assistance processing unit 42 is mounted. The position information is, for example, information of latitude, longitude, and altitude. The position information can be calculated, for example, on the basis of a GPS signal from the position information sensor 32a. Further, the position information may be information of a relative position with respect to three-dimensional map information that is called a dynamic map held by the contract vehicle in advance. During autonomous driving, it is necessary to control a traveling position of the vehicle so that the above-described information of the relative position is minimized.

In addition, the information processing unit 45 senses a target object that becomes an obstacle while the contract vehicle on which the driving assistance processing unit 42 is mounted is traveling, and calculates a distance to the target object.

The control unit 46 performs a control to generate the V2X message to be transmitted to a surrounding vehicle and the like, a control to perform autonomous driving, a control to avoid an emergency, and the like on the basis of the processing result of the information processing unit 45. The control unit 46 accesses the base station 6 or the like via the communication unit 33 and regularly or irregularly updates the dynamic map used by the information processing unit 45 to calculate the relative position information with respect to the target object. Furthermore, the control unit 46 generates the V2X message to be broadcast or unicast to the surroundings on the basis of the processing result of the information processing unit 45. The V2X message generated by the control unit 46 is transmitted to other vehicles, the base station 6, the RSU 7, and the like via the communication unit 33. Furthermore, the control unit 46 receives the V2X message transmitted from another vehicle or the RSU 7, and performs a control of the driving assistance according to the type of the received V2X message. The control of the driving assistance in this case is, for example, a control such as deceleration, stop, direction change, or the like.

In addition, the control unit 46 generates the safety performance information of the ADAS/AD system mounted on the own vehicle on the basis of the type, identification information, and the like of each sensor acquired by the data acquisition unit 32. The safety performance information generated by the control unit 46 is transmitted to the server 5 via the communication unit 33.

In addition, a plurality of sensors is connected to the driving assistance processing unit 42. In the example of FIG. 7, the position information sensor 32a, the image capturing unit 32b, the LiDAR 32c, and the radar 32d are connected to the driving assistance processing unit 42. At least some of these sensors may be built in the driving assistance processing unit 42, or sensors other than these sensors may be connected to or built in the driving assistance processing unit 42.

Figure 8:
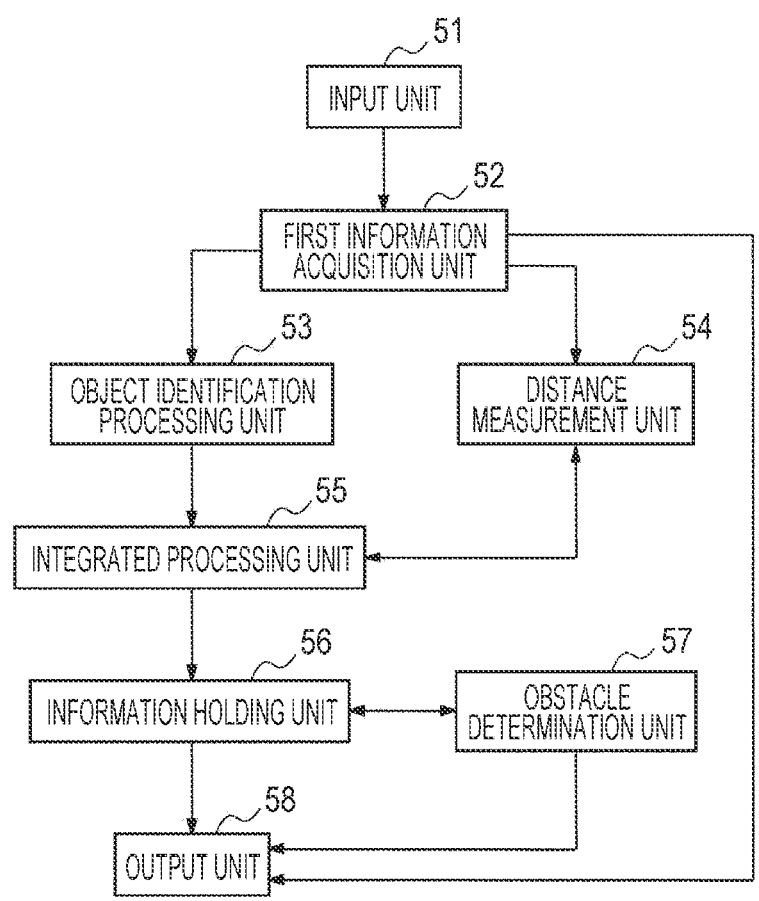
FIG. 8 is a block diagram illustrating an example of a detailed configuration of an information processing unit of FIG. 7.

FIG. 8 is a block diagram illustrating an example of a detailed configuration of the information processing unit 45 in the driving assistance processing unit 42 of FIG. 7. The information processing unit 45 of FIG. 8 includes, for example, an input unit 51, a first information acquisition unit 52, an object identification processing unit 53, a distance measurement unit 54, an integrated processing unit 55, an information holding unit 56, an obstacle determination unit 57, an output unit 58, and an information processing control unit (not illustrated).

The output information of each sensor acquired by the data acquisition unit 32 of FIG. 7 is input to the input unit 51. The first information acquisition unit 52 acquires the output information of each sensor input to the input unit 51. Specifically, the output information is output information from the image capturing unit 32b, the LiDAR 32c, and the radar 32d. In addition, the first information acquisition unit 52 also acquires information other than that from the sensor, such as the identification information of the signal processing LSI that implements the function of the ADAS/AD system and the version information of the software that implements the function of the ADAS/AD system. The information acquired by the first information acquisition unit 52 is transmitted to the object identification processing unit 53, the distance measurement unit 54, and the output unit 58 according to the information.

The object identification processing unit 53 acquires captured image information of the image capturing unit 32b and extracts an object candidate from the captured image of the image capturing unit 32b. Object candidate information is transmitted to the integrated processing unit 55. Note that the object candidate information includes information indicating a position and an attribute (a vehicle, a person, a bicycle, a motorcycle, or the like) of the object candidate.

The distance measurement unit 54 calculates position information of a reflective object and information regarding a distance to the reflective object on the basis of the signals from the LiDAR 32c and the radar 32d. In addition, the object candidate is extracted by using a signal intensity of a reflection signal detected by the radar 32d and the LiDAR 32c. Then, the position information/distance information of the object candidate is output to the integrated processing unit 55 as the object candidate information.

The integrated processing unit 55 acquires object candidate information (first object candidate information) from the image capturing unit 32b and object candidate information (second object candidate information) from the distance measurement unit 54. Then, the integrated processing unit 55 integrates the first object candidate information and the second object candidate information, and estimates, as the object, an object candidate that has a high certainty of being the object.

For example, the integrated processing unit 55 allocates an identification parameter (for example, a1, a2, a3, or the like) for identifying each object candidate extracted by the image capturing unit 32b or the distance measurement unit 54 and a numerical value (for example, 0.155, 0.125, 0.576, or the like) proportional to the certainty of being the object to each object candidate. At this time, the numerical value proportional to the certainty of being the object may be a vector value. The integrated processing unit 55 calculates a correlation for determining that the object candidate calculated by the distance measurement unit 54 and the object candidate extracted by the object identification processing unit 53 are the same object. In a case where a magnitude of the correlation exceeds a threshold value, the integrated processing unit 55 determines that object candidates based on the output information of each sensor are the same, estimates (detects) the object candidates as the object, and reallocates the same identification parameter. Note that, here, the object is estimated on the basis of whether or not both object candidates are the same object, but the object may also be estimated by deleting an object candidate having a low certainty of being the object.

Note that it goes without saying that the attribute of the object includes not only a person, a vehicle, a bicycle, and a motorcycle but also a wide concept including a street tree, a guardrail, a sign, a traffic light, freezing of a road, depression of a road, a falling object placed on a road, and the like.

The identification parameter and the numerical value proportional to the certainty of being the object for the object estimated by the integrated processing unit 55, the position information of the estimated object, and the attribute information of the estimated object are transmitted to the information holding unit 56.

The information holding unit 56 holds a time when the object estimated by the integrated processing unit 55 is detected, the identification parameter, the numerical value proportional to the certainty of being the object, the position information, the attribute information, and time-series data output from each sensor.

The obstacle determination unit 57 determines whether or not the object is an obstacle on the traveling course of the vehicle on the basis of the position information of the object held in the information holding unit 56. For the object determined as being an obstacle, an identification parameter thereof is output to the output unit 58.

The output unit 58 outputs, on the basis of the identification parameter received from the obstacle determination unit 57, information regarding the time when the object determined as being an obstacle by the obstacle determination unit 57 is detected, information regarding the position of the obstacle, a relative speed with respect to the vehicle, or information regarding an absolute speed of the vehicle and an absolute speed of the obstacle. Note that the relative speed with respect to the vehicle is obtained by time differentiation of a distance to the detected object. The speed of the vehicle is obtained by acquiring information of a speedometer of the vehicle. The absolute speed of the obstacle is obtained from the relative speed and the absolute speed of the vehicle.

Here, information regarding the obstacle (a position, a size, an attribute, a speed, a detection time, or the like) among the detected objects is output, but information regarding the detected object (a position, a size, an attribute, a speed, a detection time, or the like) may be output regardless of the obstacle determination.

In addition, the output unit 58 outputs the time-series data of each sensor held in the information holding unit 56 for a certain period including a time point at which the obstacle determination unit 57 determines that the object is an obstacle. Furthermore, the output unit 58 outputs information regarding the position and speed of the vehicle at a constant cycle or a dynamically variable cycle in order to generate a specific V2X message expected to be regularly transmitted.

Furthermore, in addition to the regular outputting, the output unit 58 may appropriately perform the outputting on the basis of a request from another processing block. For example, when the control unit 46 generates the V2X message, in a case where the V2X message is the specific V2X message, the control unit 46 may instruct the information processing unit 45 to output related sensor information. For example, once the information processing unit 45 receives this instruction from the control unit 46, the information processing control unit (not illustrated) extracts, from the information holding unit 56, the time-series data output from each sensor within a certain period including a determination time point of each sensor used for the determination of the obstacle that has activated the generation of the specific V2X message. The extracted time-series data output from the sensor is supplied to the control unit 46 via the output unit 58.

In a case where a plurality of object candidates extracted by the object identification processing unit 53 or the distance measurement unit 54 is close to each other within a set distance, the integrated processing unit 55 may combine the plurality of object candidates into one group and handle the one group as one object candidate. In a case of treating the plurality of object candidates as a group, an identification parameter of the group, an identification parameter of each object candidate constituting the group, a numerical value of each object candidate proportional to a certainty of being the object, position information of each object candidate estimated as the object, and attribute information of the estimated object are generated as information related to the group in the integrated processing unit 55 and are transmitted to the information holding unit 56.

Here, the position information may be allocated to the group as position information representing position information of one object among the plurality of object candidates included in the group. The representative position may be a position of an object in the group that is the closest to the own vehicle. Alternatively, the representative position may be a barycentric position of positions of the plurality of object candidates in the group. Note that the set distance of the respective object candidates in the group for which closeness is determined can be dynamically set or updated for each area, time zone, group, or the like.

In addition, constituent elements of the object candidates included in the group estimated by the integrated processing unit 55 can be dynamically changed. For example, in a case where a bicycle and a pedestrian are waiting within a set distance in front of a crosswalk, the bicycle and the pedestrian can be estimated as the object candidates of one group. Meanwhile, in a case where the bicycle and the pedestrian thereafter start crossing the crosswalk at different speeds and the bicycle deviates from within the distance set for the group including the pedestrian, the bicycle is excluded from the constituent elements of the group, and processing of estimating the bicycle as one new object candidate is separately performed.

In this case, the obstacle determination unit 57 determines whether or not the object is an obstacle on the traveling course of the vehicle on the basis of the position information of the object (alternatively, the group) held in the information holding unit 56. Then, for the object determined as being an obstacle, the identification parameter thereof is output to the output unit 58.

Further, the information transmitted from the integrated processing unit 55 to the information holding unit 56 may include history information in addition to the object candidate information described above. The history information is information regarding a group constituted by the object candidate in the past, and is generated when the object candidate is separated from the group. The history information includes an identification parameter of the group, a numerical value of the object candidate proportional to a certainty of being the object (a numerical value at the time of separation from the group), position information (position information at the time of separation from the group), and attribute information (attribute information at the time of separation from the group). In a case where the number of object candidates constituting one group is changed from two to one by the separation processing, information regarding the group may be treated as information regarding one of the two object candidates.

The processing of grouping the object candidates and the processing of separating the object candidate from the group in the integrated processing unit 55 have been described above. Similarly, the obstacle determination unit 57 may also perform processing of grouping obstacles or processing of classifying obstacles from a group.

In a case where a plurality of objects determined as being obstacles by the obstacle determination unit 57 is close to each other within a set distance, the obstacle determination unit 57 may handle the plurality of objects (obstacles) as one group. For example, in a case where a person is pushing or pulling a bicycle, the person and the bicycle are close to each other, and thus are handled as obstacles of one group. In this case, as information regarding the group, a position, a size, an attribute, a speed, a detection time, and the like are generated for each object (obstacle) constituting the group. These pieces of information are output to the information holding unit 56 or the output unit 58. Note that the distance as a threshold value for determining the closeness can be dynamically set or updated for each area, time zone, group, or the like.

In addition, the obstacle determination unit 57 can dynamically change the constituent elements of the objects (obstacles) included in the group. For example, in a case where a bicycle and a pedestrian are waiting within a set distance in front of a crosswalk, the bicycle and the pedestrian can be handled as the objects (obstacles) of one group.

Meanwhile, in a case where the bicycle and the pedestrian thereafter start crossing the crosswalk at different speeds and the bicycle deviates from within the distance set for the group including the pedestrian, the bicycle is excluded from the constituent elements of the group, and is separately handled as one new object (obstacle). In this case, in a case where there is position information of each constituent object as the information regarding the group, the processing of performing separation from the group is performed using the position information. In a case where there is no position information of each constituent object as the information regarding the group, although not illustrated, the position information of each object is separately acquired from the distance measurement unit 54, and the processing of performing separation from the group is performed.

The information output from the obstacle determination unit 57 to the information holding unit 56 and the output unit 58 may include history information for one new obstacle separated from the group in addition to the above-described information. The history information is information regarding the group to which the object (obstacle) belonged in the past, and is generated when the object is separated from the group. The history information includes an identification parameter of the group, a numerical value proportional to a certainty of being the object (obstacle) (a numerical value at the time of separation from the group), position information (position information at the time of separation from the group), and attribute information (attribute information at the time of separation from the group). In a case where the number of objects (obstacles) constituting one group is changed from two to one by the separation processing, information regarding the group may be treated as information regarding one of the two objects (obstacles).

Note that, in the integrated processing unit 55 and the obstacle determination unit 57, a distance as a threshold value for determining that objects are in the same group and a distance as a threshold value for determining that an arbitrary object is separated from constituent elements in one group may be the same value or different values. In a case of different values, for example, in order to avoid frequent processing of performing grouping and separation from the constituent elements in the group, one threshold value to which a positive or negative offset is given may be used as the other threshold value to apply hysteresis.

In addition, the object identification processing unit 53 may perform not only detection of each object candidate but also processing of detecting a group including a plurality of close object candidates. In this case, information regarding the group is output as the output of the object identification processing unit 53. For example, in a case where a person is pushing or pulling a bicycle, the person and the bicycle are close to each other, and thus are handled as object candidates of one group. That is, a plurality of attributes is allocated to this group. Note that the distance as a threshold value for determining the closeness can be dynamically set or updated for each area, time zone, group, or the like.

In addition, constituent elements of the object candidates included in the group extracted by the object identification processing unit 53 can be dynamically changed. For example, in a case where a bicycle and a pedestrian are waiting within a set distance in front of a crosswalk, the bicycle and the pedestrian can be handled as the object candidates of one group. Meanwhile, in a case where the bicycle and the pedestrian thereafter start crossing the crosswalk at different speeds and the bicycle deviates from within the distance set for the group including the pedestrian, the bicycle is excluded from the constituent elements of the group, and is separately handled as one new object candidate. Here, the fact that one new object candidate was a constituent element of the group in the past may be held as the history information.

Furthermore, although the object detection/recognition function and the distance measurement function of the information processing unit 45 have been described, signal processing related to environment estimation such as situation determination for the object as to whether or not the detected object is stopped, traffic jam detection processing based on the situation of the detected object, or the like may be further performed to perform environment estimation/situation determination.

FIG. 9 is a block diagram illustrating an example of a detailed configuration of the control unit 46 of FIG. 7. The control unit 46 of FIG. 9 includes, for example, an input unit 61, a second information acquisition unit 62, a V2X message generation unit 63, an output unit 64, a driving assistance auxiliary data acquisition unit 65, a driving assistance control unit 66, and an environment information generation unit 67.

The second information acquisition unit 62 acquires information regarding an obstacle and information of each sensor from the information processing unit 45 via the input unit 61.

The V2X message generation unit 63 generates a V2X message of an appropriate type on the basis of a predefined activation condition of each V2X message on the basis of the information regarding the obstacle or the information of each sensor acquired by the second information acquisition unit 62. The generated V2X message is output via the output unit 64 according to the activation condition. In addition, in a case where a specific V2X message is generated, the V2X message generation unit 63 instructs the first information acquisition unit 52 via the output unit 64 to extract time-series data output from each sensor used for determining the obstacle that has activated the generation of the V2X message.

In addition, the V2X message generation unit 63 may dynamically switch the type or content of the V2X message to be transmitted on the basis of at least one of a time zone in which the contract vehicle travels or an area in which the contract vehicle is positioned. The contract vehicle performs communication with a surrounding vehicle and the like, and transmits and receives the V2X message as necessary. An accident occurrence rate and a traffic volume also change depending on the time zone or the area in which the contract vehicle travels. Therefore, the V2X message generation unit 63 can improve safety performance by dynamically switching the type of the V2X message to be transmitted to the surroundings depending on the time zone or the area. In addition, the V2X message generation unit 63 may switch the predefined activation condition of each V2X message depending on the time zone or the area.

The driving assistance auxiliary data acquisition unit 65 acquires, via the input unit 61, the V2X message transmitted from another vehicle or the RSU 7, and further acquires a 3D map called a dynamic map as auxiliary data for assisting autonomous driving.

The driving assistance control unit 66 generates control information for driving assistance or autonomous driving by utilizing the information regarding the obstacle and the information of each sensor acquired by the second information acquisition unit 62, the V2X message transmitted by another vehicle or the RSU 7 acquired from the driving assistance auxiliary data acquisition unit 65, the dynamic map, and the like.

Here, the control information for driving assistance or autonomous driving is, for example, control information to be supplied to a power system, such as acceleration and deceleration, control information to be supplied to the braking apparatus, such as deceleration and stop, and control information to be supplied to the steering apparatus, such as xx [cm] to the left and yy [cm] to the right. These pieces of control information for driving assistance are output to the drive system control unit 37 via the output unit 64.

The drive system control unit 37 controls a drive system apparatus of the own vehicle on the basis of the information for driving assistance. As a result, in a case where there is a possibility of collision between the own vehicle and the obstacle (alternatively, a group constituted by obstacles) detected by the driving assistance processing unit 42, processing of causing the own vehicle to avoid the obstacle (alternatively, a group constituted by obstacles) (processing of changing the traveling direction of the own vehicle), processing of decelerating the speed of the own vehicle by a brake operation, and processing of stopping the own vehicle are performed.

The environment information generation unit 67 generates environment information including output information of various sensors of the ADAS/AD system and output information of the ADAS/AD system (including a signal analysis result in the ADAS/AD system) on the basis of the output information of the information processing unit 45, the output information of each sensor, and the like acquired by the second information acquisition unit 62. Further, if necessary, the environment information may include the static safety performance information. The environment information is output from the output unit 64 and transmitted to the server 5 via the communication unit 33, for example. The environment information is information included in the dynamic safety performance information.

If necessary, the V2X message generation unit 63 may transmit the V2X message together with the vehicle position information (/GPS information) at the time of the event detection, the time information (the time information at the time of data transmission, the time information at the time of the event detection, and the like), the information regarding a sensor that greatly contributes to the event detection, and the like. Further, the V2X message may include information regarding a distance to the detected object or a direction with respect to the own vehicle, information regarding an estimated position of the detected object, the speed of the own vehicle, a time when the own vehicle passes near the estimated position of the detected object, or the position information of the own vehicle.

Furthermore, if necessary, the environment information generation unit 67 may transmit the V2X message together with the vehicle position information (/GPS information) at the time of the event detection, the time information (the time information at the time of data transmission, the time information at the time of the event detection, and the like), the information regarding a sensor that greatly contributes to the event detection, and the like. Further, the environment information may include the information regarding the distance to the detected object or the direction with respect to the own vehicle, the information regarding the estimated position of the detected object, the speed of the own vehicle, the time when the own vehicle passes near the estimated position of the detected object, or the position information of the own vehicle.

The V2X module cooperating with the driving assistance processing unit 42 can transmit and receive the V2X messages that are called a decentralized environmental notification message (DENM), a cooperative awareness message (CAM), and a basic safety message (BSM), in order to implement the ADAS/AD system and autonomous driving. For example, the DENM with a specific use condition, for example, a condition for activating the DENM in a case of a dangerous spot or falling is dangerous spot detection or heavy rain or heavy snow detection by the vehicle. The V2X message generation unit 63 generates the V2X message on the basis of the type and performance of the sensor mounted on the contract vehicle. Furthermore, at the time of the generation of the V2X message, the second information acquisition unit 62 can acquire information such as a time when the detection is made by the sensor, information regarding a detection position, a type of the sensor that has instructed the generation of the V2X message, time-series data of the sensor, and the like. Note that the CAM is a technical specification of ETSI TS 102 637-2 and CAR 2 CAR Communication Consortium (C2CCC). Furthermore, the BSM is defined by a message standard SAE J2735.

FIG. 10 is a diagram illustrating use conditions, trigger conditions, and end conditions for transmitting the DENM described in a standard with Standardization No. 102637-3 of the Cooperative-Intelligent Transport Systems (C-ITS) of the European Telecommunications Standards Institute (ETSI). In FIG. 10, trigger conditions for activating the transmission of the V2X message and end conditions for the transmission of the V2X message are defined for each use condition such as an emergency electronic brake lamp, a wrong road warning, an accident of a stopped vehicle, a problem of a stopped vehicle, a traffic jam warning, a traffic signal violation warning, a road construction warning, a collision risk warning, a dangerous spot, a precipitation amount, road slipperiness, visibility, or wind. The type of the V2X message transmitted according to each use condition and each trigger condition specified in FIG. 10 depends on the type of the sensor connected to the driving assistance processing unit 42.

In addition, the control unit 46 transmits, for example, sensor information including the type of the activated sensor to the server 5 via the communication unit 33 as the safety performance information of the contract vehicle.

The control unit 46 may group the DENM, the ADAS, the BSM, or each independently implemented V2X message by an arbitrary index. For example, the V2X messages may be classified into a regularly transmitted V2X message and a V2X message for an event/trigger. Furthermore, for example, a dangerous spot, falling, and road slipperiness may be further grouped for the V2X messages triggered in association with the situation of the road surface among the V2X messages for an event/trigger. Furthermore, for example, a traffic jam warning, a field of view, and wind may be grouped for the V2X messages triggered according to the environment. This grouping may be utilized to sort a group for which processing of determining whether or not an event is triggered is to be preferentially performed depending on the area and the time zone.

Figure 11:
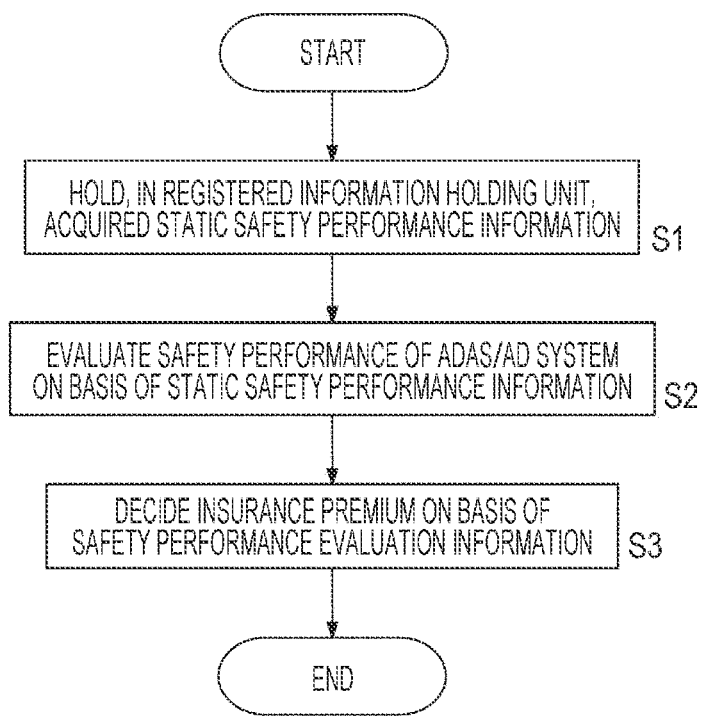
FIG. 11 is a flowchart illustrating a processing operation of the safety performance evaluation apparatus according to the first embodiment mounted on the server.

FIG. 11 is a flowchart illustrating a processing operation of the safety performance evaluation apparatus 1 according to the first embodiment mounted on the server 5. The flowchart of FIG. 11 is performed, for example, for each insurance contract vehicle at each insurance premium renewal timing. Note that a timing and an interval at which the processing of the flowchart of FIG. 11 is performed are arbitrary. First, the information acquisition unit 11 acquires the static safety performance information for each contract vehicle, and holds the acquired static safety performance information in the registered information holding unit 12

(Step S1). The registered information holding unit 12 can hold not only the static safety performance information acquired by the information acquisition unit 11 but also static safety performance information of each contract vehicle set in advance without passing through the information acquisition unit 11.

Next, the safety performance evaluation unit 13 evaluates the safety performance of the ADAS/AD system mounted on each contract vehicle on the basis of the static safety performance information of each contract vehicle held in the registered information holding unit 12 (Step S2). More specifically, the safety performance evaluation unit 13 evaluates, for each contract vehicle, the safety performance of the ADAS/AD system on the basis of the static safety performance information including at least one of the identification information of each contract vehicle, the identification information of the ADAS/AD system, the identification information of each sensor connected to the ADAS/AD system, the identification information of the signal processing LSI that implements the function of the ADAS/AD system, or the version information of the software that implements the function of the ADAS/AD system. Then, the safety performance evaluation level is decided as the evaluation result.

Next, the insurance premium deciding unit 14 decides the insurance premium for each contract vehicle on the basis of the safety performance evaluation level evaluated by the safety performance evaluation unit 13 (Step S3). In a case where it is determined that the safety performance is high on the basis of the safety performance evaluation level, a discount amount is increased and the insurance premium is reduced.

As described above, in the first embodiment, the safety performance of the ADAS/AD system mounted on each contract vehicle can be evaluated on the basis of the static safety performance information of each contract vehicle in the data transmitted from each contract vehicle to the server 5. This evaluation can be performed by the server 5 on which the safety performance evaluation apparatus 1 is mounted. Each contract vehicle transmits the static safety performance information to the server 5 via the V2X module. In the server 5, the safety performance of the ADAS/AD system can be easily and quickly evaluated by receiving the static safety performance information from each contract vehicle. In addition, the server 5 can easily calculate the discount rate for the basic insurance premium on the basis of the evaluated safety performance evaluation level. As a result, for the contract vehicle on which the driving assistance processing unit 42 having high safety performance is mounted, it is possible to increase the discount amount for the basic insurance premium, enhance motivation to mount the ADAS/AD system having high safety performance on the vehicle, and promote the spread of the ADAS/AD system having high safety performance.

In addition, since the safety performance of each contract vehicle can be evaluated on the basis of the identification information of the signal processing LSI that implements the function of the ADAS/AD system and the version information of the software that implements the function of the ADAS/AD system, it is possible to evaluate that a contract vehicle on which an ADAS/AD system having a more excellent function has higher safety performance and to further increase the discount rate of the insurance premium. As a result, the spread of the ADAS/AD system on which the high-performance signal processing LSI is mounted can be promoted, and the contractor can be made to recognize the importance of constantly updating the software to the latest version.

Moreover, in a case where a higher-performance sensor is connected to the ADAS/AD system, the safety performance can be evaluated as being higher, such that it is also possible to enhance motivation to optionally connect a higher-performance sensor than a standard product.

Second Embodiment

In each of second and subsequent embodiments described below, safety performance of an ADAS/AD system is evaluated on the basis of dynamic safety performance information or on the basis of the dynamic safety performance information and static safety performance information. However, in the second embodiment, not only the static safety performance information but also the dynamic safety performance information is transmitted from each contract vehicle to a server 5a.

The dynamic safety performance information is safety performance information that changes according to a time, a situation, and the like. Specifically, the dynamic safety performance information includes output information of various sensors connected to an ADAS/AD system, output information of the ADAS/AD system (including a signal analysis result in the ADAS/AD system), a V2X message generated by each contract vehicle, and the like. The server 5a can manage the dynamic safety performance information in association with the static safety performance information such as identification information (third identification information) of each sensor, identification information of the ADAS/AD system, identification information of each contract vehicle, or the like. In order to perform such management, the server 5a may receive the dynamic safety performance information associated with the static safety performance information from each contract vehicle.

An example of the dynamic safety performance information regarding the sensor included in the safety performance information is sensor output information. The sensor related to the safety performance information of the ADAS/AD system is not limited to the above-described sensors, and includes any sensor that can affect the safety performance of the vehicle, for example, an acceleration sensor, a gyro sensor, an atmospheric pressure sensor, and the like. Each contract vehicle transmits an output of each sensor mounted on the own vehicle to the server 5a via a base station 6 or an RSU 7. The server 5a registers each sensor output transmitted from each contract vehicle in association with the corresponding contract vehicle. In a case where a plurality of sensors of the same type is provided in one contract vehicle, the server 5a may classify sensors of the same type for each installation place and register each sensor output. In addition, the server 5a may classify each sensor by a product model number and register each sensor output for each product model number. Moreover, the server 5a may register the identification information and output information of each sensor for each manufacturing time of each sensor.

In addition, the dynamic safety performance information includes, for example, a time when a specific V2X message is detected, information regarding a position where the specific V2X message is detected, the specific V2X message, and the like. In addition, the server 5a may acquire the dynamic safety performance information together with the static safety performance information related to the dynamic safety performance information, such as information for identifying the specific V2X message or the like. Further, the dynamic safety performance information may include information such as a position of a detected object, a type of the detected object, a distance between the detected object and the contract vehicle, a time when the detected object is detected, a position where the detected object is detected, and the like.

Moreover, a control unit 46 may transmit, to the server 5a, the dynamic safety performance information that includes the output information of each sensor and a speed of the contract vehicle when the specific V2X message is transmitted.

Note that information regarding the type of the sensor that has activated the V2X message may be included in, for example, the static safety performance information such as a product model number of the sensor, an identifier allocated to the product model number, or the like, and be transmitted to the server 5a.

In a safety performance evaluation system 3 according to the second embodiment, a part of an internal configuration of a safety performance evaluation apparatus 1a mounted on the server 5a is different from that in FIG. 6, and an information processing apparatus 2 mounted on each contract vehicle has a configuration similar to that in FIGS. 7 to 9.

Figure 12:
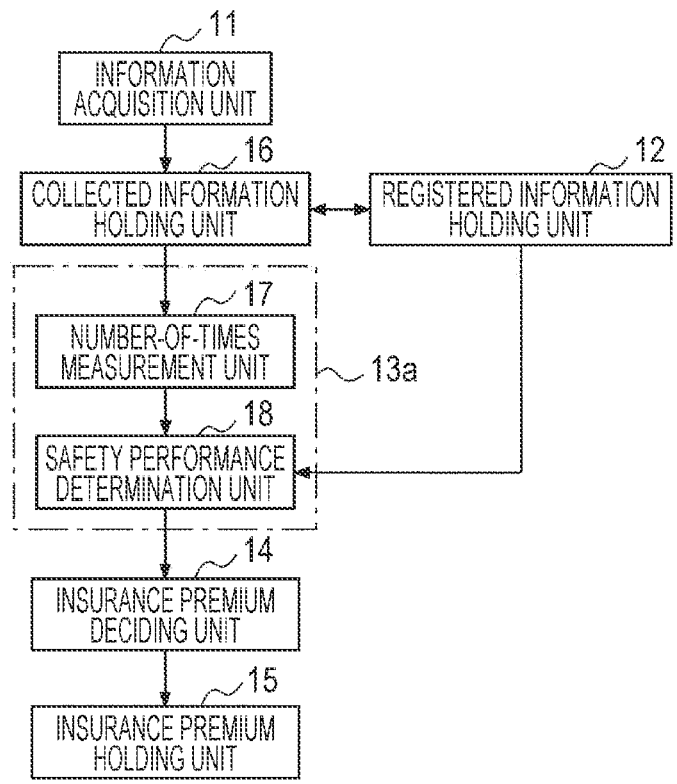
FIG. 12 is a block diagram illustrating an internal configuration of a server on which a safety performance evaluation apparatus according to a second embodiment is mounted.

FIG. 12 is a block diagram illustrating the internal configuration of the safety performance evaluation apparatus 1a according to the second embodiment mounted on the server 5a. The safety performance evaluation apparatus 1a of FIG. 12 includes a collected information holding unit 16 in addition to the configuration of the safety performance evaluation apparatus 1 of FIG. 6. The collected information holding unit 16 holds the dynamic safety performance information acquired by the information acquisition unit 11. The dynamic safety performance information includes, for example, an output of each sensor mounted on each contract vehicle. As a result, the server 5a can grasp the fact that the contract vehicle is disabled from the output of each sensor mounted on the contract vehicle. In addition, the server 5a can also grasp the fact that the contract vehicle has entered an accident-prone area from position information output from a specific sensor mounted on the contract vehicle or the V2X message transmitted by the contract vehicle. Note that it is assumed that a location in the accident-prone area is known in advance on the basis of accident occurrence information. As described above, since the dynamic safety performance information such as the output of the sensor, the V2X message, or the like affects the safety performance of the contract vehicle, the dynamic safety performance information is transmitted from the collected information holding unit 16 to a safety performance evaluation unit 13a in the server 5a. The dynamic safety performance information held in the collected information holding unit 16 may be appropriately deleted or updated with new information after being transmitted to the safety performance evaluation unit 13a.

Furthermore, the safety performance evaluation unit 13a in the safety performance evaluation apparatus 1a of FIG. 12 is different from the safety performance evaluation unit 13 of FIG. 6. The safety performance evaluation unit 13a of FIG. 12 appropriately refers not only to the dynamic safety performance information held in the collected information holding unit 16 but also to the static safety performance information held in a registered information holding unit 12 to evaluate the safety performance of the ADAS/AD system mounted on each contract vehicle. More specifically, the safety performance evaluation unit 13a of FIG. 12 includes a number-of-times measurement unit 17 and a safety performance determination unit 18.

The number-of-times measurement unit 17 measures the number of times the driving assistance processing unit 42 has transmitted the specific V2X message. For example, the specific V2X message is a message for notifying that an obstacle exists. Since it can be determined that the larger the number of times the specific V2X message has been transmitted, the higher the safety performance is, the safety performance determination unit 18 determines that the safety performance of a driving assistance processing unit 42 is high in a case where the number of times measured by the number-of-times measurement unit 17 is large. Alternatively, another example of the specific V2X message is a specific V2X message transmitted from the contract vehicle to a surrounding vehicle among a plurality of types of V2X messages that can be transmitted and received between the contract vehicle and the surrounding vehicle or the like.

Note that the server 5a is notified of the fact that the contract vehicle has transmitted the specific V2X message via the base station 6 or the RSU 7 that has received the V2X message, for example. That is, the V2X message is transmitted through vehicle-to-vehicle communication via the base station 6 or the RSU 7, and is also transmitted to the server 5a including the safety performance evaluation apparatus 1a by the base station 6 or the RSU 7.

In addition, the driving assistance processing unit 42 connected to a V2X module mounted on the contract vehicle may notify the server 5a of the number of times the contract vehicle has transmitted the specific V2X message.

The safety performance determination unit 18 determines the safety performance of the driving assistance processing unit on the basis of the number of times of transmission of the specific V2X message per unit time. The number of times of transmission of the specific V2X message per unit time can be calculated by statistical processing such as averaging or the like. The registered information holding unit 12 holds information regarding the number of times of transmission of the V2X message for a plurality of contract vehicles. Therefore, the safety performance determination unit 18 compares the number of times of transmission of the V2X message measured by the number-of-times measurement unit 17 for a specific contract vehicle with the number of times of transmission of the V2X message of another contract vehicle, determines the safety performance of the ADAS/AD system mounted on the specific contract vehicle, and sets a safety performance level. The safety performance level is set to a higher level as the number of times the specific V2X message has been transmitted per unit time increases.

The safety performance level set by the safety performance determination unit 18 is input to an insurance premium deciding unit 14 as an evaluation result of the safety performance evaluation unit 13a. The insurance premium deciding unit 14 decides, on the basis of the safety performance level, a discount rate so as to increase the discount rate for a basic insurance premium as the number of times the specific V2X message has been transmitted increases.

Figure 13:
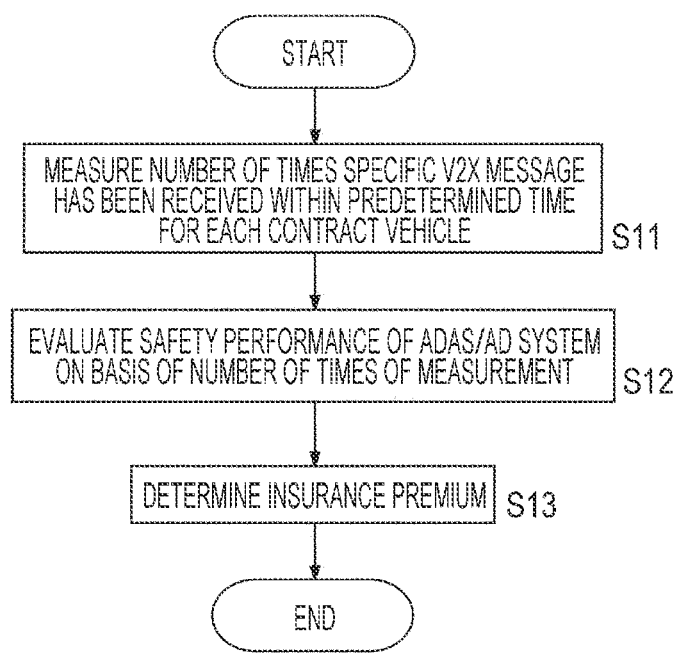
FIG. 13 is a flowchart illustrating a processing operation of the safety performance evaluation apparatus according to the second embodiment mounted on the server.

FIG. 13 is a flowchart illustrating a processing operation of the safety performance evaluation apparatus 1 according to the second embodiment mounted on the server 5a. First, the number of times the specific V2X message has been received within a predetermined time is measured for each contract vehicle (Step S11). In Step S11, the number-of-times measurement unit 17 in the safety performance evaluation unit 13a measures the number of times. For example, the number-of-times measurement unit 17 starts to measure the number of times at a timing at which the specific V2X message has first been received for each contract vehicle, and measures the number of times the specific V2X message has been received within the predetermined time from the timing. Alternatively, the number of times the specific V2X message has been received between a first time and a second time that are set in advance may be measured for each contract vehicle.

Next, the safety performance determination unit 18 in the safety performance evaluation unit 13a determines the safety performance of the ADAS/AD system on the basis of the number of times of measurement (Step S12). It is considered that the larger the number of times of measurement of the specific V2X message, the higher the sensing capability of the sensor that causes generation of the specific V2X message. Therefore, the safety performance determination unit 18 determines that the safety performance of the contract vehicle is high in a case where the number of times of measurement is large. In addition, the safety performance determination unit 18 may determine the safety performance of the contract vehicle that is an evaluation target by performing comparison with the number of times of transmission of the specific V2X message in another contract vehicle.

Next, the insurance premium deciding unit 14 decides an insurance premium on the basis of the safety performance evaluation level as the safety performance evaluation result (Step S13). The processing in Step S13 is the same as Step S2 and the like in FIG. 11.

As described above, in the second embodiment, it can be said that the safety performance of the ADAS/AD system is evaluated and the capability to detect a specific event is evaluated on the basis of the number of times the contract vehicle has transmitted the specific V2X message. In addition, in a case where the safety performance of the ADAS/AD system is evaluated on the basis of the number of times the contract vehicle has transmitted the V2X message to the surroundings, the safety performance of the ADAS/AD system can be evaluated on the basis of whether or not the V2X message for calling attention is more actively transmitted to the surrounding vehicle or the like.

Third Embodiment

In a safety performance evaluation system 3 according to a third embodiment, a part of an internal configuration of a safety performance evaluation apparatus 1b mounted on a server 5b is different from those in FIGS. 6 and 12, and an information processing apparatus 2 mounted on each contract vehicle has a configuration similar to that in FIGS. 7 to 9. However, in the third embodiment, not only static safety performance information but also dynamic safety performance information is transmitted from each contract vehicle to the server 5b.

Figure 14:
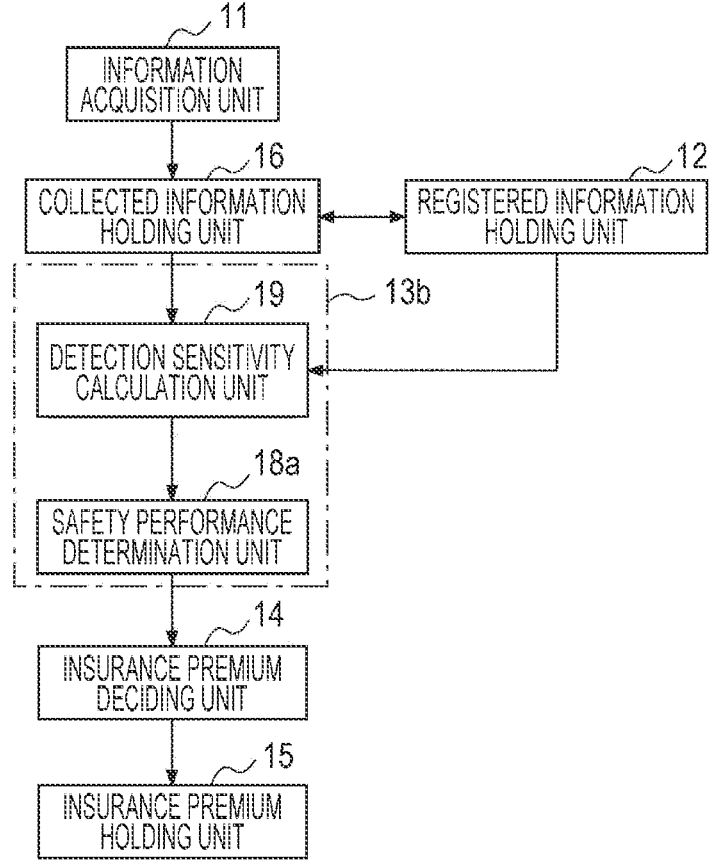
FIG. 14 is a block diagram illustrating an internal configuration of a server on which a safety performance evaluation apparatus according to a third embodiment is mounted.

FIG. 14 is a block diagram illustrating the internal configuration of the safety performance evaluation apparatus 1b according to the third embodiment mounted on the server 5b. A safety performance evaluation unit 13b in the safety performance evaluation apparatus 1b of FIG. 14 is partially different from the safety performance evaluation unit 13a of FIG. 12. The safety performance evaluation unit 13b evaluates safety performance of an ADAS/AD system on the basis of a characteristic, that is, a detection capability of a sensor connected to the ADAS/AD system of each contract vehicle. More specifically, the safety performance evaluation unit 13b can evaluate safety performance of a driving assistance function of the contract vehicle on the basis of time difference information from detection of a target object at a reference point to the passage of the contract vehicle through the reference point or a position where the target object at the reference point is detected, on the basis of the sensor connected to the ADAS/AD system of the contract vehicle. More specifically, the safety performance evaluation unit 13b of FIG. 14 includes a detection sensitivity calculation unit 19 and a safety performance determination unit 18a.

The detection sensitivity calculation unit 19 calculates a detection sensitivity in object detection of the ADAS/AD system based on an output of a specific sensor for each contract vehicle.

The safety performance determination unit 18a compares an object detection speed of the ADAS/AD system based on the output of the evaluation target sensor calculated for each contract vehicle by the detection sensitivity calculation unit 19, and determines the safety performance of the ADAS/AD system mounted on each contract vehicle. The safety performance evaluation unit 13b outputs the determination result of the safety performance determination unit 18a as an evaluation result of the safety performance of the ADAS/AD system.

Figure 15:
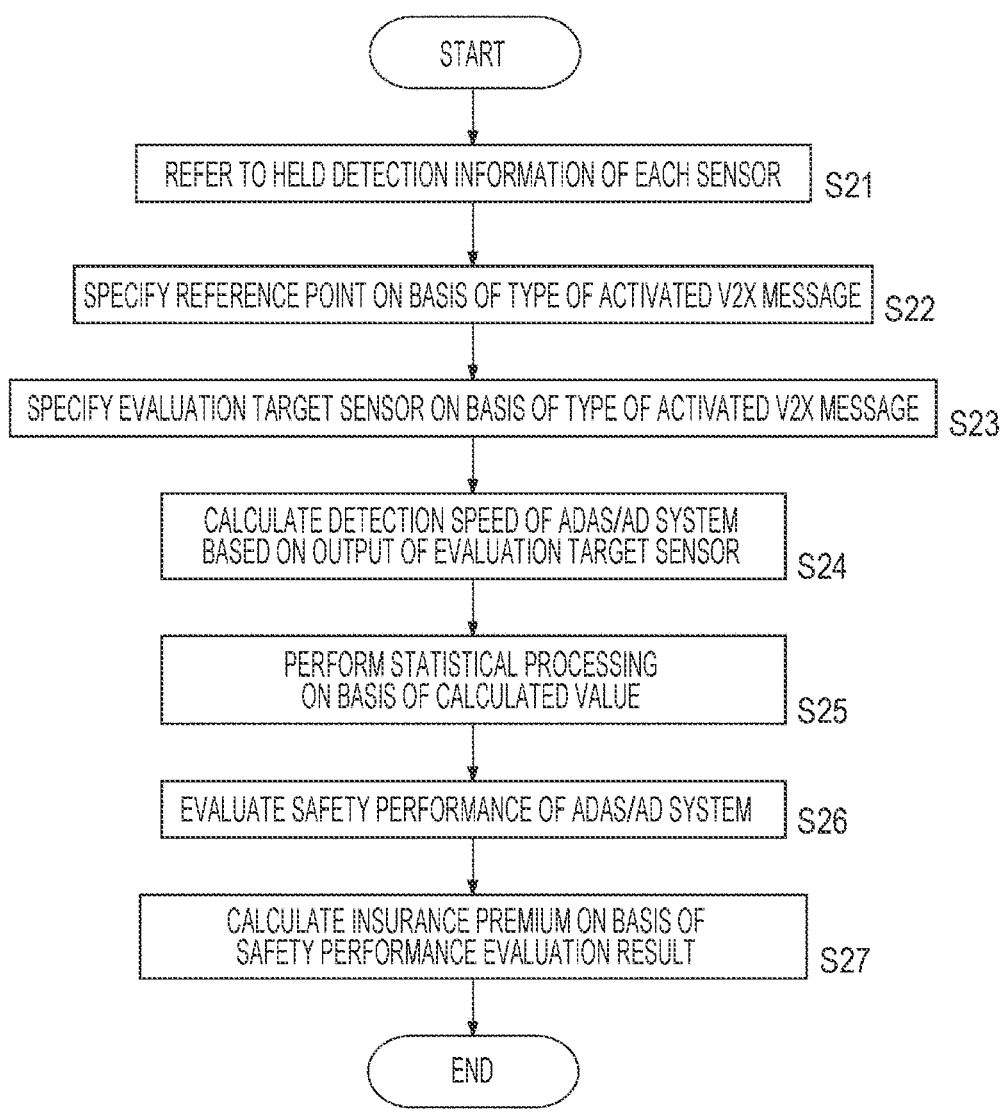
FIG. 15 is a flowchart illustrating a processing operation of the safety performance evaluation apparatus according to the third embodiment mounted on the server.

FIG. 15 is a flowchart illustrating a processing operation of the safety performance evaluation apparatus 1b according to the third embodiment mounted on the server 5b. The processing of FIG. 15 is started in a case where the V2X message transmitted from any of the contract vehicles is received by the server 5b. The server 5b starts the processing of FIG. 15 when the specific V2X message is received.

The safety performance evaluation unit 13b refers to output information of each sensor held in a collected information holding unit 16 (Step S21). The reference point is specified on the basis of a type of the V2X message generated by a driving assistance processing unit 42 of the contract vehicle (Step S22). For example, since a DENM related to a dangerous point is a V2X message generated by sensing a certain dangerous point, it is considered that a similar V2X message is transmitted in association with the dangerous point. That is, the safety performance evaluation unit 13b specifies the dangerous point as the reference point on the basis of DENM related to the dangerous point. Note that the safety performance evaluation unit 13b may specify, as the reference point, only a point where a sufficient number of population parameters can be obtained for statistical processing to be performed later.

Next, the safety performance evaluation unit 13b specifies an evaluation target sensor on the basis of the type of the generated V2X message (Step S23). In Step S23, for example, the type of the sensor such as a LiDAR 32c, a radar 32d, an image capturing unit 32b, or the like may be specified, or some sensors classified for each product model number may be specified.

Next, the safety performance evaluation unit 13b calculates the object detection speed (object detection sensitivity) of the ADAS/AD system based on the output of the sensor on the basis of the specified reference point and the output information of the specified sensor (Step S24).

Figure 16:
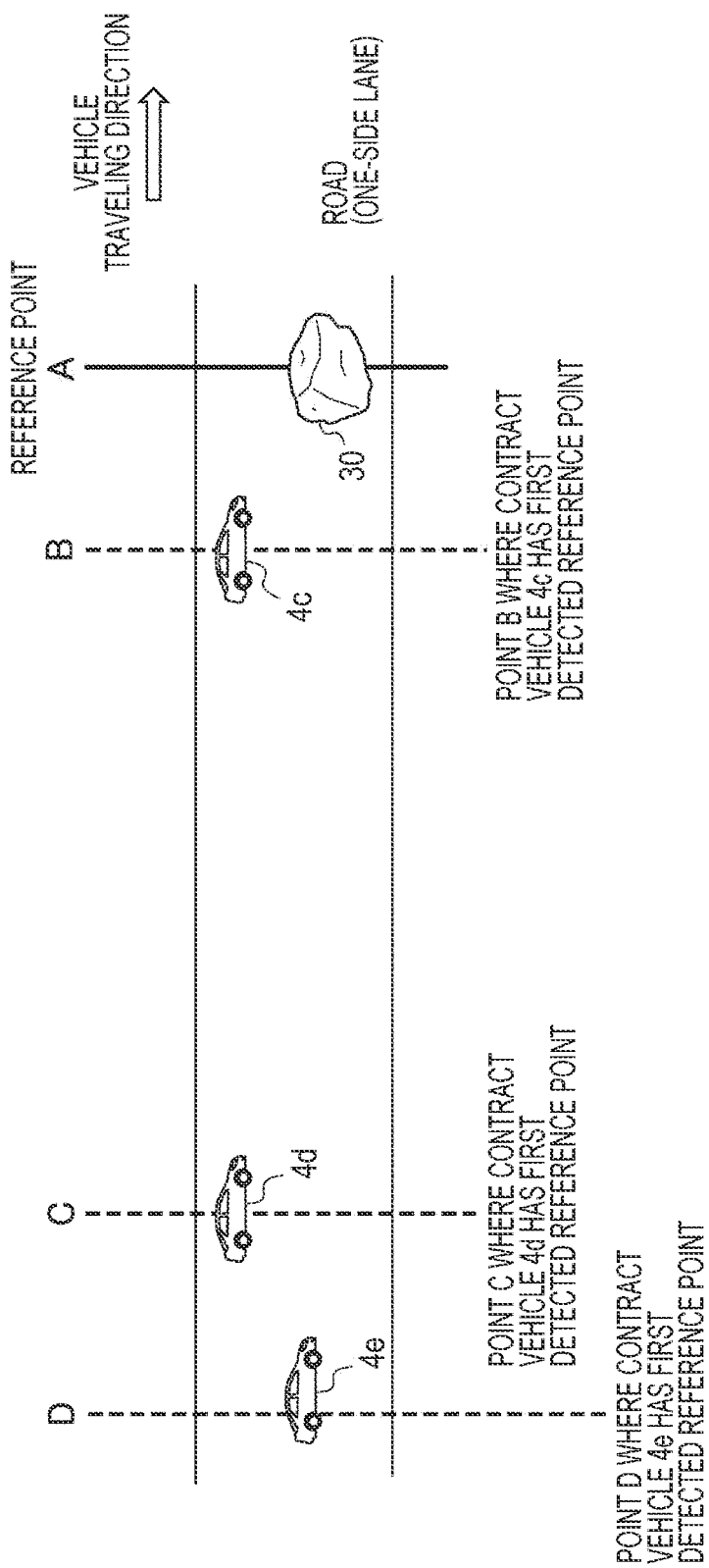
FIG. 16 is a diagram illustrating a first example of a processing procedure of Step S24 of FIG. 15.

FIG. 16 is a diagram illustrating a first example of a processing procedure of Step S24 of FIG. 15. FIG. 16 illustrates points where three contract vehicles 4c, 4d, and 4e have detected an obstacle 30 at a reference point A. FIG. 16 illustrates an example in which the contract vehicle 4c detects the obstacle 30 at a point B closest to the reference point A, the contract vehicle 4d detects the obstacle 30 at a point C farther from the reference point A than the point B, and the contract vehicle 4e detects the obstacle 30 at a point D farther from the reference point A than the point C. In the example of FIG. 16, a distance between the detection point and the reference point is used as the object detection speed (object detection sensitivity) of the ADAS/AD system based on the outputs of the sensors of the contract vehicles 4c to 4e in Step S24 of FIG. 15. Here, it is assumed that the sensor of the contract vehicle 4e farthest from the reference point A has the highest safety performance. In this way, a safety performance level of the ADAS/AD system that is an evaluation target is decided on the basis of the distance from the detection point to the reference point A.

FIG. 16 illustrates an example of using the distance between the detection point and the reference point as an example of calculating the object detection speed (object detection sensitivity) of the ADAS/AD system based on the output of each sensor. However, the object detection speed may be calculated according to a time.

Figure 17:
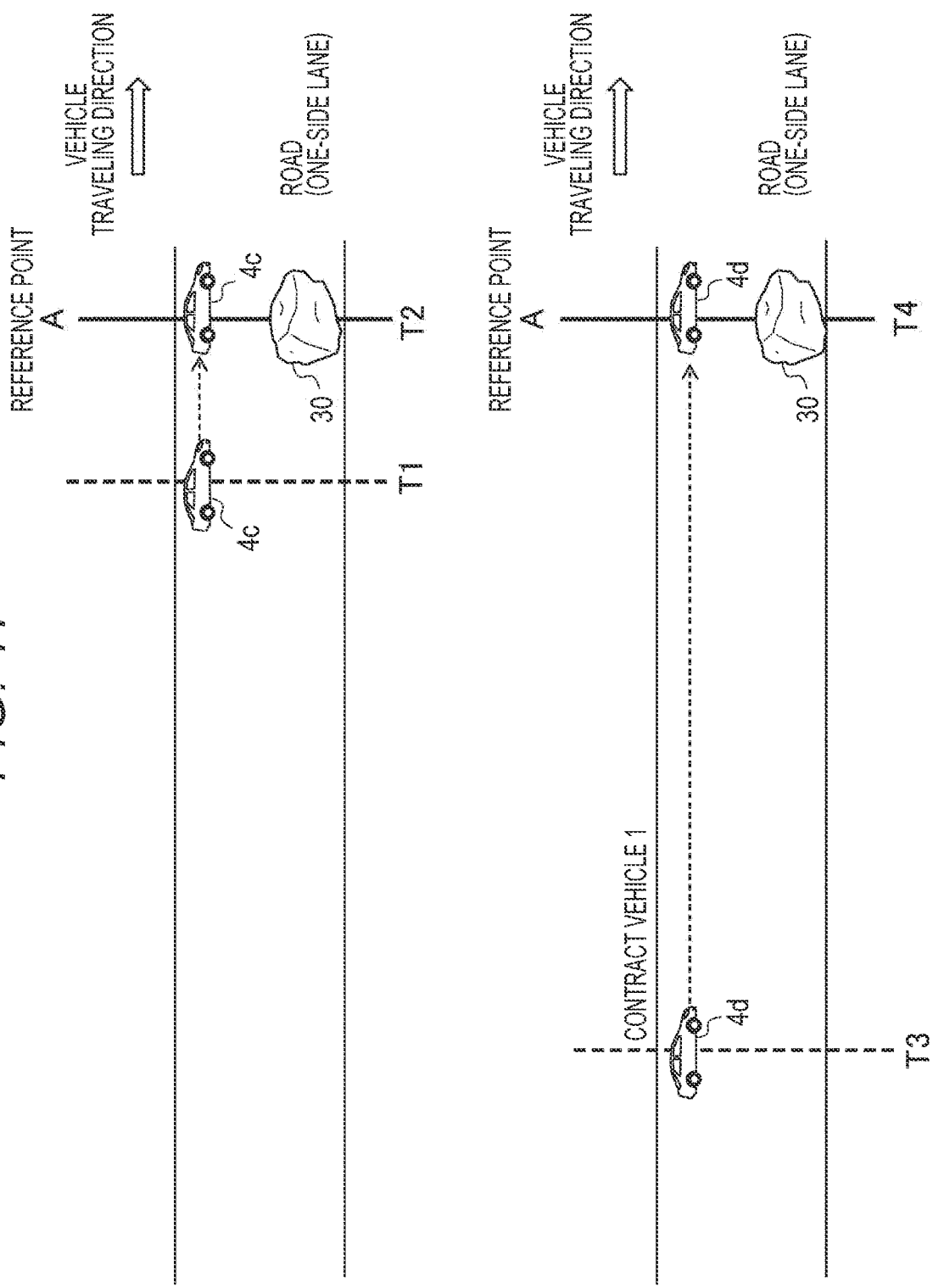
FIG. 17 is a diagram illustrating a second example of the processing procedure of Step S24 of FIG. 15.

FIG. 17 is a diagram illustrating a second example of the processing procedure of Step S24 of FIG. 15. FIG. 17 illustrates a case where the contract vehicles 4c and 4d are traveling on a highway or the like at a substantially constant speed. In Step S24 of FIG. 15, a time difference (T2–T1) from a time T1 when the contract vehicle 4c detects the obstacle 30 at the reference point A and transmits the V2X message to a time T2 when the contract vehicle 4c passes through the reference point A is calculated. In addition, a time difference (T4–T3) from a time T3 when the contract vehicle 4d detects the obstacle 30 at the reference point A and transmits the V2X message to a time T4 when the contract vehicle 4d passes through the reference point A is calculated. Since the time difference (T4–T3) is larger than the time difference (T2–T1), the sensor of the contract vehicle 4d can secure a longer time margin for responding as compared with the contract vehicle 4c, and thus it is determined that the safety performance is high.

Figure 18:
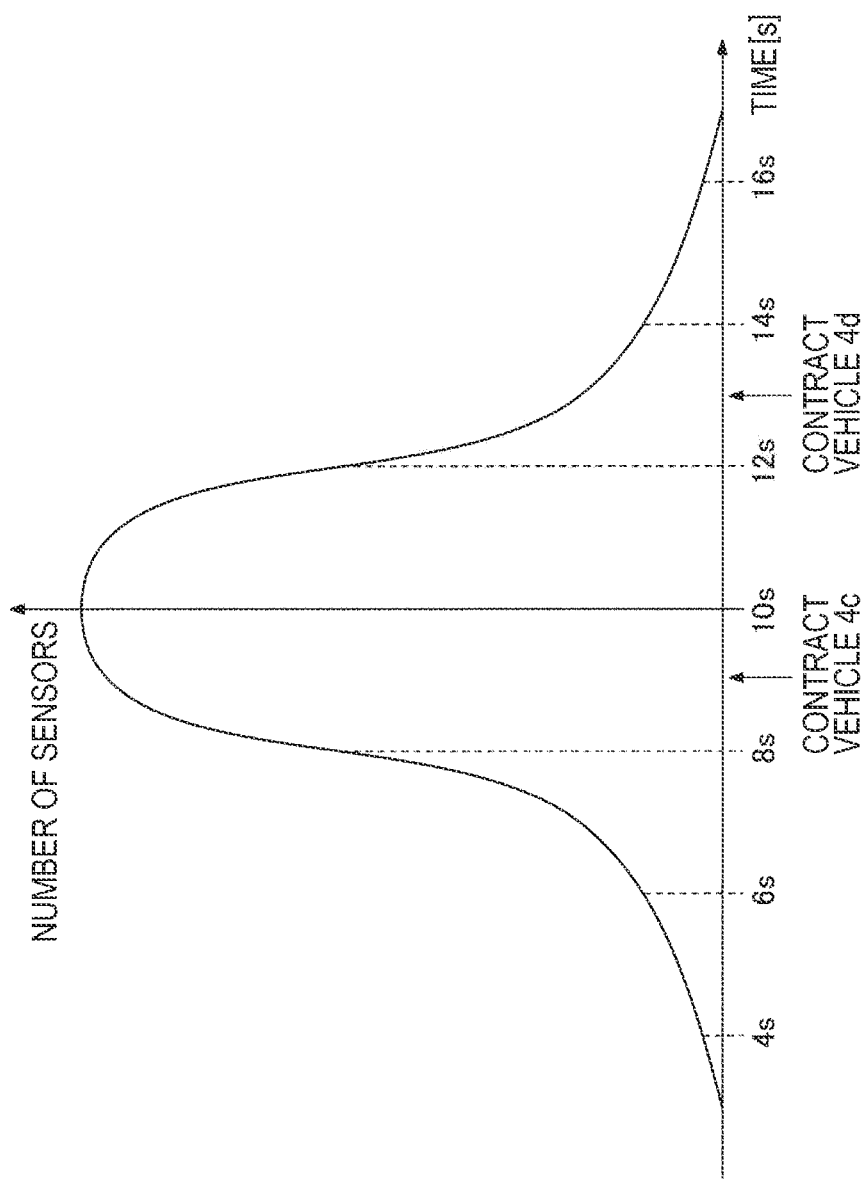
FIG. 18 is a diagram illustrating an example of data distribution related to an object detection speed based on an output of a sensor.

FIG. 18 is a diagram illustrating an example of data distribution related to the object detection speed based on the output of the sensor. In FIG. 18, a horizontal axis represents a time period from a time when the ADAS/AD system (the ADAS/AD system based on the output of the evaluation target sensor) of the contract vehicle detects the obstacle 30 at the reference point A to a time when the contract vehicle passes through the reference point A, and a vertical axis represents the number of cases of object detection. The distribution diagram of FIG. 18 illustrates an example in which an average amount of the above-described time of the ADAS/AD system is 10 seconds. In the example of FIG. 18, the detection speed of the ADAS/AD system of the contract vehicle 4d (the ADAS/AD system based on the output of the evaluation target sensor) is about 13 seconds, whereas the detection speed of the ADAS/AD system of the contract vehicle 4c (the ADAS/AD system based on the output of the evaluation target sensor) is about 9 seconds. Therefore, the ADAS/AD system of the contract vehicle 4d is evaluated as having higher safety performance than the contract vehicle 4c. The distribution diagram of FIG. 18 illustrates data distribution for a plurality of contract vehicles. The data distribution may be created using only data of the same location transmitted from the contract vehicle, or may be created using data of a plurality of locations. A time zone or a period in which the data is generated may be limited to a predetermined time zone or a predetermined period, and the data distribution may be created using the data without such limitation.

Figure 19:
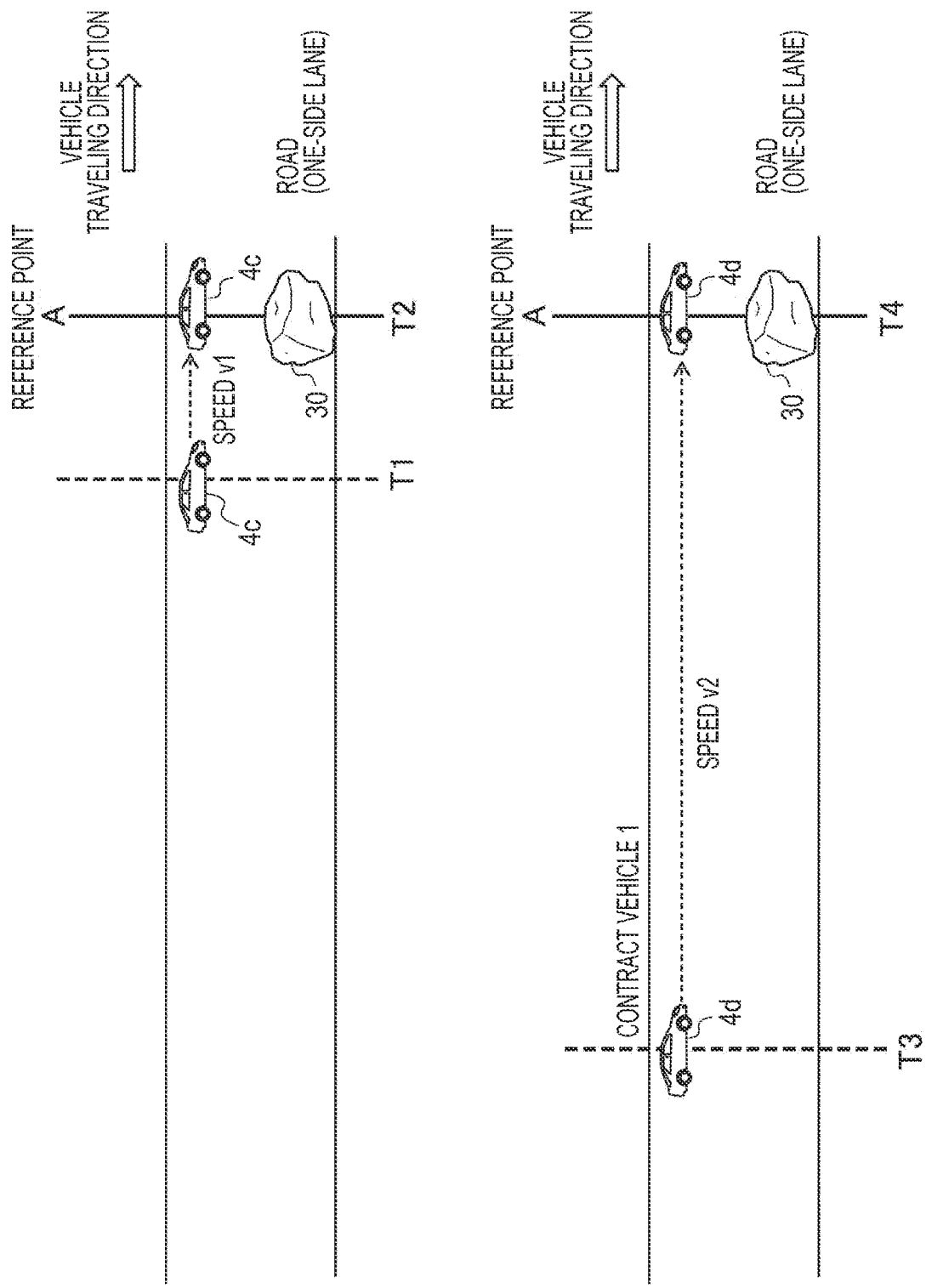
FIG. 19 is a diagram illustrating an example in which a detection speed of an advanced driver-assistance systems (ADAS)/autonomous driving (AD) system (ADAS/AD system) is calculated in consideration of a speed of a contract vehicle.

FIG. 17 illustrates an example in which the detection speed of the ADAS/AD system is calculated on the basis of the time difference from a time when the ADAS/AD system of each contract vehicle detects the obstacle 30 at the reference point to a time when the contract vehicle passes through the reference point. However, the detection speed of the ADAS/AD system (the ADAS/AD system based on the output of the evaluation target sensor) may be calculated in consideration of the speed of the contract vehicle. For example, in FIG. 19, the speed of the contract vehicle 4c is v1, and the speed of the contract vehicle 4d is v2. In a case where a distance v1 (T2–T1) represented by the product of the speed v1 of the contract vehicle 4c and the above-described time difference (T2–T1) is smaller than a distance v2 (T4–T3) represented by the product of the speed v2 of the contract vehicle 4d and the above-described time difference (T4–T3), it may be evaluated that the safety performance of the sensor of the contract vehicle 4d is higher than that of the contract vehicle 4c.

Figure 20:
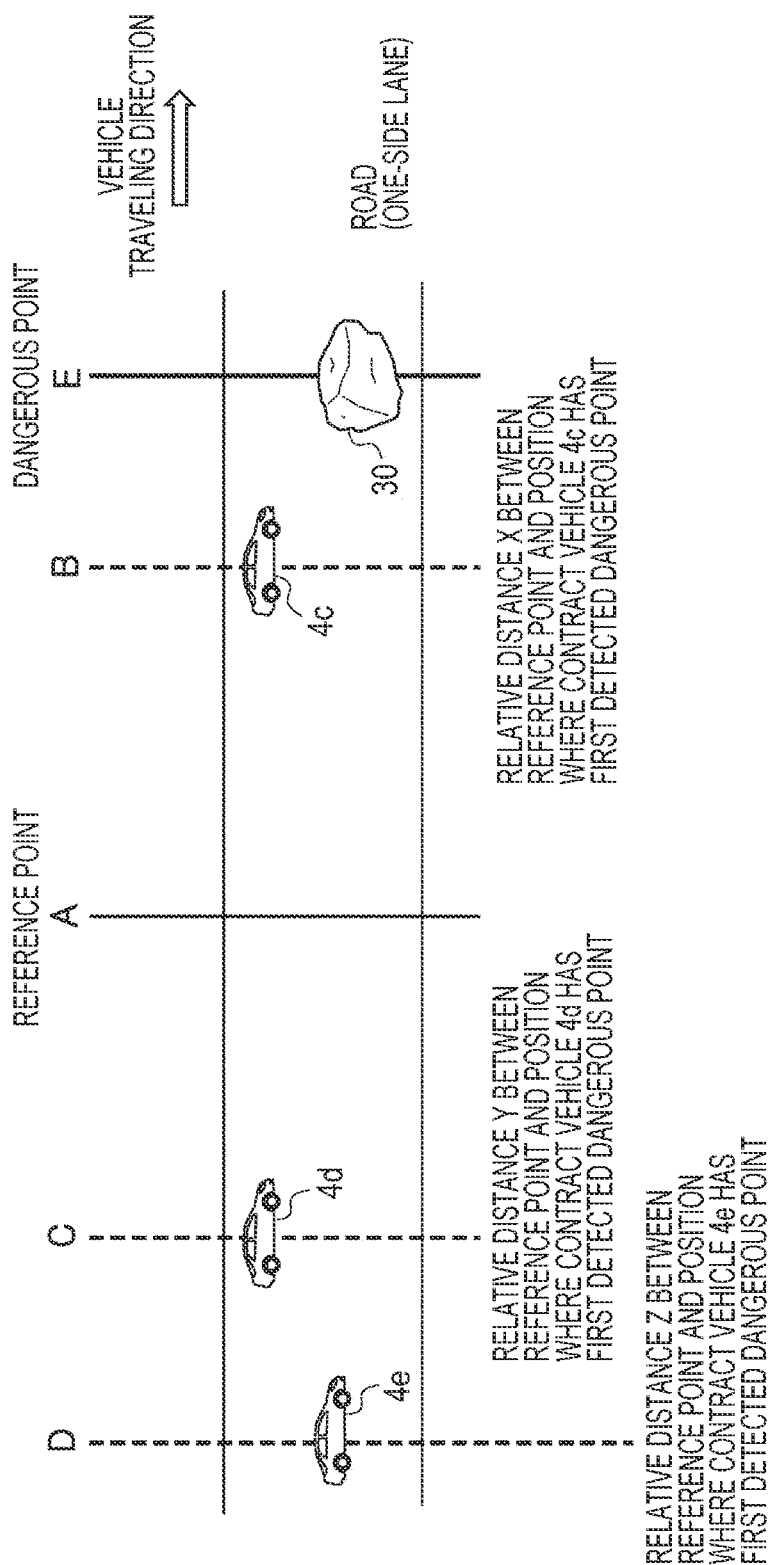
FIG. 20 is a diagram illustrating an example in which safety performance of the ADAS/AD system is evaluated by using a length of a relative distance with respect to a reference point A.

Furthermore, as for the detection speed of the ADAS/AD system based on the evaluation target sensor, as illustrated in FIG. 20, the reference point A set at an arbitrary position, for example, a point corresponding to an average value of the detection speed of the evaluation target sensor may be set as the reference point A, and the safety performance of the ADAS/AD system (the ADAS/AD system based on the output of the evaluation target sensor) may be evaluated on the basis of a length of a relative distance with respect to the reference point A. For example, in the example of FIG. 20, a length of a relative distance of the point B where the ADAS/AD system of the contract vehicle 4c has detected the obstacle 30 at a point E with respect to the reference point A is –X. Furthermore, a length of a relative distance of the point C where the ADAS/AD system of the contract vehicle 4d has detected the obstacle 30 at the point E with respect to the reference point A is Y. Moreover, a length of a relative distance of the point D where the ADAS/AD system of the contract vehicle 4e has detected the obstacle 30 at the point E with respect to the reference point A is Z. Therefore, it is evaluated that the safety performance of the ADAS/AD system of the contract vehicle 4e having the longest relative distance is the highest, the safety performance of the ADAS/AD system of the contract vehicle 4d is the second highest, and the safety performance of the ADAS/AD system of the contract vehicle 4c is the lowest.

Once the processing in Step S24 of FIG. 15 ends, the safety performance evaluation unit 13b then performs statistical processing on the basis of the numerical values calculated in Step S24 (Step S25). The statistical processing performed in Step S25 includes, for example, processing of calculating an average value and a standard deviation of the numerical values calculated in Step S24. The safety performance evaluation unit 13b performs the processing of FIG. 15 every arbitrary period, for example, every day or every month, and updates and holds a numerical value after the statistical processing of Step S25. In the statistical processing, data from a plurality of contract vehicles is used. At this time, data distribution may be created using only data of the same location transmitted from the contract vehicle, or may be created using data of a plurality of locations. In addition, as the data used for the statistical processing, a time zone or a period in which the data is generated may be limited to a predetermined time zone or a predetermined period, and the data distribution may be created using the data without such limitation.

In Step 26, the safety performance of the ADAS/AD system of the contract vehicle for which an insurance premium is to be calculated is evaluated on the basis of the held numerical value, and the safety performance level is calculated (Step S26). Specifically, the standard deviation is acquired for the frequency distribution of the detection speed of the ADAS/AD system based on the output of the evaluation target sensor, and different safety performance levels such as 0 to +σ, +σ to +2σ, +2σ to +3σ, +3σ to +4σ, and the like are set in a stepwise manner on the basis of the standard deviation.

Next, the insurance premium is calculated on the basis of a value representing the evaluation result of the safety performance (Step S27).

When the processing in Step S23 of FIG. 15 is performed, the evaluation target sensor may be specified in consideration of not only the type of the V2X message but also other conditions. For example, under a condition that visibility is poor such as nighttime or the like, weighting may be performed so that the radar 32d or the LiDAR 32c is selected in preference to the image capturing unit 32b. Furthermore, the weighting for the target sensor may be set for each time zone or each area. For example, in a case where a result indicating that an accident of a contract vehicle on which a sensor of a specific type or a sensor with a specific product model number is mounted occurs less at a specific intersection or the like is obtained as a result of the statistical processing, an evaluation result of a system using a sensor of a specific type or a sensor with a specific product model number may be weighted in an arbitrary area including the intersection.

Figure 21:
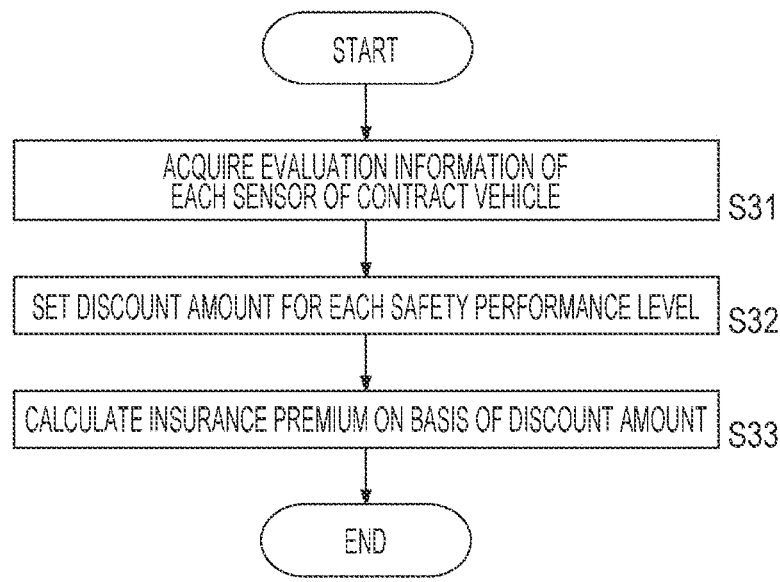
FIG. 21 is a flowchart illustrating an example of a detailed processing operation of an insurance premium deciding unit.

FIG. 21 is a flowchart illustrating an example of a detailed processing operation of the insurance premium deciding unit 14. The flowchart of FIG. 21 is an example of the processing operation of Step S27 in FIG. 15.

First, the insurance premium deciding unit 14 acquires the safety performance level as evaluation information of the ADAS/AD system (the ADAS/AD system based on the output of the evaluation target sensor) connected to the contract vehicle for which the insurance premium is to be decided (Step S31). Here, information indicating a result of evaluation performed by the safety performance evaluation unit 13b (hereinafter, referred to as the safety performance level) is acquired. In deciding the insurance premium, the insurance premium deciding unit 14 may select one main sensor or may reflect evaluation information of a plurality of sensors by weighting. For example, in a case where the image capturing unit 32b is selected as one main sensor and the detection speed is evaluated on the basis of a detection distance, the magnitude of the discount amount may be calculated on the basis of the length of the detection distance in a forward direction with respect to an average distance.

Different discount amounts of 500 yen, 750 yen, 1000 yen, 1250 yen, and the like are set for the respective safety performance levels in a stepwise manner on the basis of the respective safety performance levels (Step S32). In this case, a discount amount of b yen is applied to a monthly standard insurance premium of A yen, and an insurance premium of a certain month is calculated as (A−b) yen (Step S33). The discount amount may be different for each month on the basis of evaluation information of the previous month, or a discount amount of an insurance period may be set to a fixed amount by averaging the evaluation information or the like.

As described above, in the third embodiment, the evaluation target ADAS/AD system (the ADAS/AD system based on the output of the evaluation target sensor) mounted on the contract vehicle is specified on the basis of the object detection information transmitted by the contract vehicle, and the safety performance is evaluated on the basis of the object detection speed (object detection sensitivity) of the specified ADAS/AD system. Then, the safety performance is evaluated in consideration of the performance of the ADAS/AD system, and the insurance premium of the contract vehicle can be decided on the basis of the evaluation result.

Here, an example of performing safety performance evaluation for the ADAS/AD system based on the output of the evaluation target sensor has been described. On the other hand, in a case of a system that performs object detection by integrating outputs of a plurality of sensors of the ADAS/AD system without limiting the evaluation target sensor, the safety performance evaluation of the ADAS/AD system may be performed on the basis of the output of the object detection result of the ADAS/AD system based on the plurality of sensors.

Fourth Embodiment

In a safety performance evaluation system 3 according to a fourth embodiment, a part of an internal configuration of a safety performance evaluation apparatus 1c mounted on a server 5c is different from those in FIGS. 6, 12, and 14, and an information processing apparatus 2 mounted on each contract vehicle has a configuration similar to that in FIGS. 7 to 9. However, in the fourth embodiment, not only static safety performance information but also dynamic safety performance information is transmitted from each contract vehicle to the server 5c.

In the fourth embodiment, safety performance of an ADAS/AD system mounted on each contract vehicle is evaluated while limiting an area.

Figure 22:
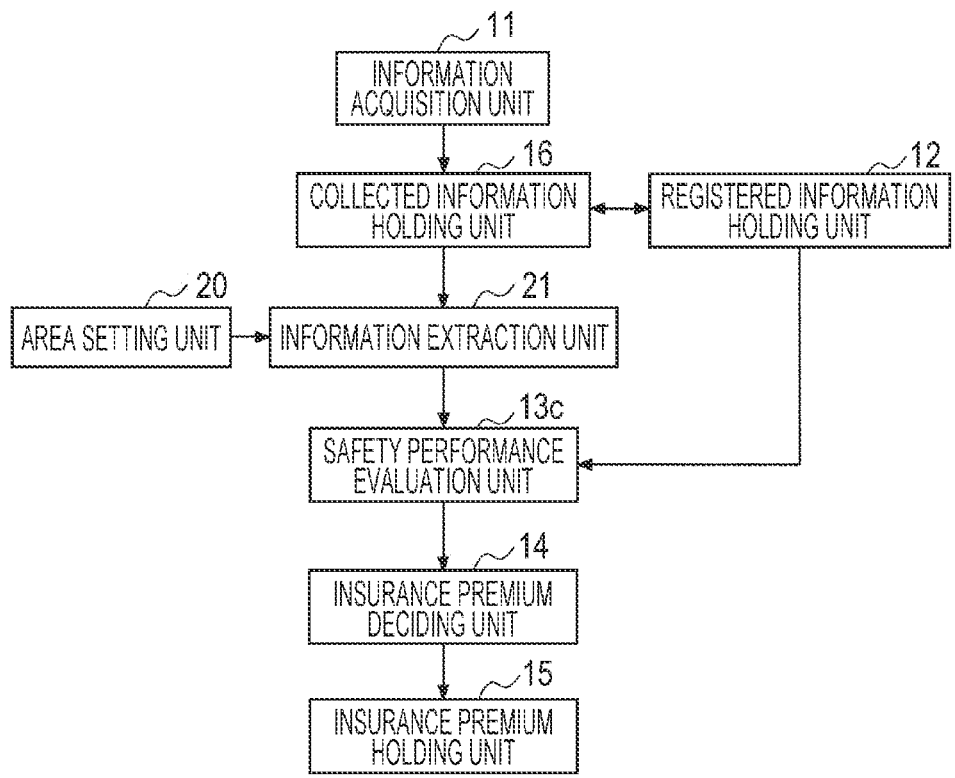
FIG. 22 is a block diagram illustrating an internal configuration of a safety performance evaluation apparatus according to a fourth embodiment.

FIG. 22 is a block diagram illustrating the internal configuration of the safety performance evaluation apparatus 1c according to the fourth embodiment mounted on the server 5c. The safety performance evaluation apparatus 1c of FIG. 22 includes an area setting unit 20 and an information extraction unit 21 in addition to an information acquisition unit 11, a registered information holding unit 12, a collected information holding unit 16, a safety performance evaluation unit 13c, an insurance premium deciding unit 14, and an insurance premium holding unit 15.

The area setting unit 20 sets a predetermined area. The predetermined area is an area in which the contract vehicle transmits the dynamic safety performance information such as a V2X message, an output of a sensor, or the like, and is, for example, an area having a high accident occurrence rate, a specific intersection with poor visibility, an area with many pedestrians and bicycles, or the like.

The information extraction unit 21 extracts the dynamic safety performance information such as the V2X message, the output of the sensor, or the like generated in the predetermined area among pieces of information acquired by the information acquisition unit 11. Since the V2X message, the output of the sensor, or the like is received by the server 5c via a base station 6 or an RSU 7, the information extraction unit 21 can extract the dynamic safety performance information such as the V2X message, the output of the sensor, or the like generated in the predetermined area depending on a location of the base station 6 or the RSU 7 that has received the V2X message or the output of the sensor.

The safety performance evaluation unit 13c evaluates the safety performance of the ADAS/AD system mounted on the contract vehicle that has transmitted the output of the sensor, the V2X message, or the like on the basis of the dynamic safety performance information extracted by the information extraction unit 21 (safety performance information generated in the predetermined area). As a specific processing content of the safety performance evaluation unit 13c, similar processing as that of the safety performance evaluation unit 13a or 13b according to the second or third embodiment may be performed in a state of being limited to a predetermined area. That is, the safety performance evaluation unit 13c may evaluate the safety performance of the ADAS/AD system on the basis of the number of times of transmission of the V2X message in a state of being limited to the predetermined area. Alternatively, the safety performance evaluation unit 13c may evaluate the safety performance on the basis of a detection speed of the ADAS/AD system based on an output of an evaluation target sensor in a state of being limited to the predetermined area.

Figure 23:
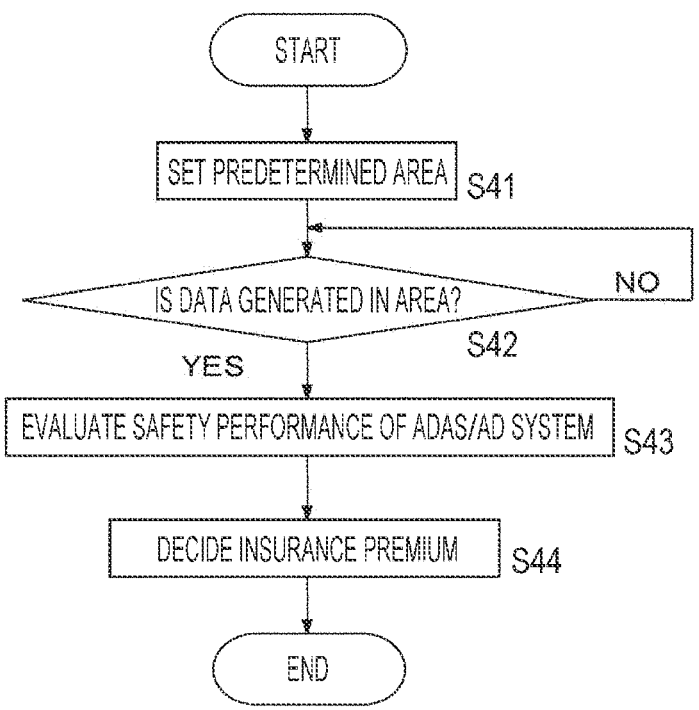
FIG. 23 is a flowchart illustrating a processing operation of the safety performance evaluation apparatus according to the fourth embodiment.

FIG. 23 is a flowchart illustrating a processing operation of the safety performance evaluation apparatus 1c according to the fourth embodiment mounted on the server 5c. First, the area setting unit 20 sets the predetermined area (Step S41).

Next, for each contract vehicle, it is determined whether or not the received dynamic safety performance information such as the V2X message, the output of the sensor, or the like is information that has been generated in the predetermined area (Step S42). The determination processing of Step S42 is performed by the safety performance evaluation unit 13c on the basis of the information extracted by the information extraction unit 21. The information extraction unit 21 extracts the dynamic safety performance information such as the V2X message, the output of the sensor, or the like generated in the predetermined area on the basis of information regarding the location of the base station 6 or the RSU 7 that receives the V2X message, the output of the sensor, or the like. Alternatively, in a case where information regarding the area is included as attached information of the V2X message or the like, it may be determined whether or not the V2X message or the like is information that has been generated in the predetermined area on the basis of the information. The safety performance evaluation unit 13c determines that the information extracted by the information extraction unit 21 is information that has been generated in the predetermined area.

Next, the safety performance evaluation unit 13c evaluates the safety performance of the ADAS/AD system mounted on the corresponding contract vehicle on the basis of the dynamic safety performance information such as the V2X message, the output of the sensor, or the like generated in the predetermined area. Then, the safety performance evaluation level representing corresponding high safety performance is calculated (Step S43). For example, the safety performance evaluation unit 13c evaluates that the ADAS/AD system in which the number of times of output from each sensor or the number of times of transmission of the V2X message in the predetermined area is larger has higher safety performance. In addition, the safety performance evaluation unit 13c may evaluate the safety performance on the basis of the object detection speed of the ADAS/AD system based on the output of the evaluation target sensor, similarly to the third embodiment.

Next, the insurance premium deciding unit 14 decides the insurance premium of the corresponding contract vehicle on the basis of the safety performance evaluation level of the safety performance evaluation unit 13c (Step S44).

As described above, in the fourth embodiment, the safety performance of the ADAS/AD system is evaluated on the basis of the dynamic safety performance information such as the V2X message, the output of the sensor, or the like generated in the predetermined area. As a result, the safety performance evaluation apparatus 1c can objectively evaluate the safety performance of the ADAS/AD system mounted on each contract vehicle with a small amount of data.

Fifth Embodiment

In a safety performance evaluation system 3 according to a fifth embodiment, a part of an internal configuration of a safety performance evaluation apparatus 1d mounted on a server 5d is different from those in FIGS. 6, 12, and 14, and an information processing apparatus 2 mounted on each contract vehicle has a configuration similar to that in FIGS. 7 to 9. However, in the fifth embodiment, not only static safety performance information but also dynamic safety performance information is transmitted from each contract vehicle to the server.

In the fifth embodiment, safety performance of an ADAS/AD system mounted on each contract vehicle is evaluated while limiting a time zone.

Figure 24:
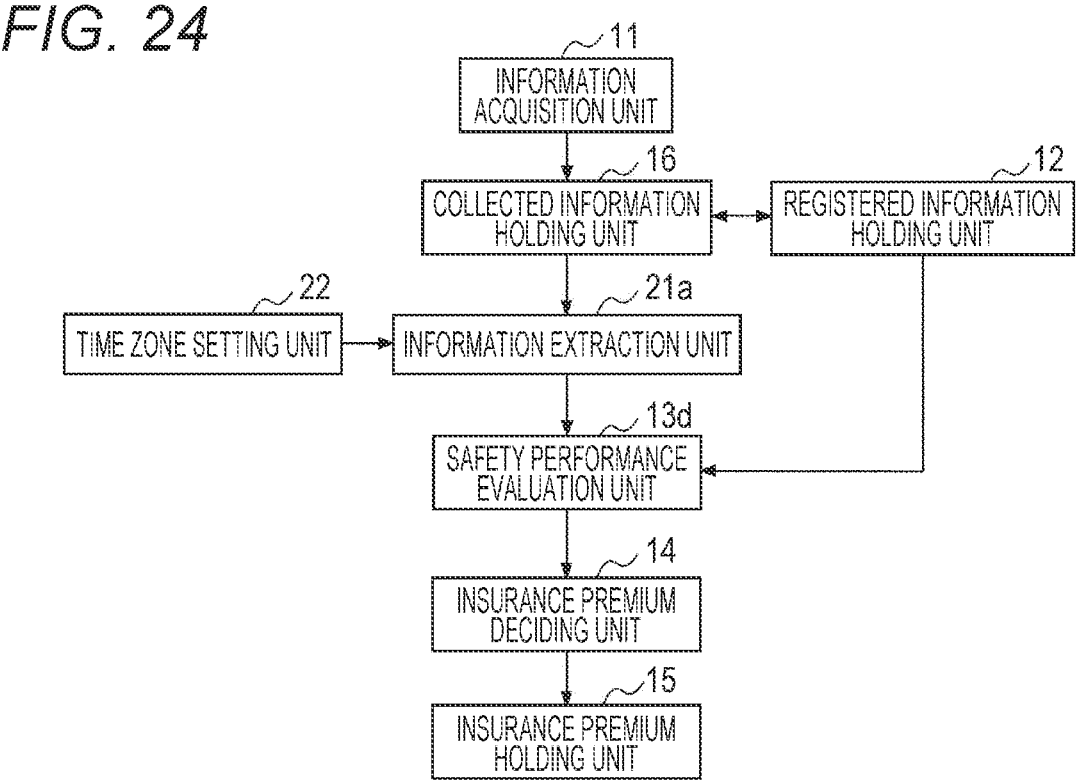
FIG. 24 is a block diagram illustrating an internal configuration of a safety performance evaluation apparatus according to a fifth embodiment.

FIG. 24 is a block diagram illustrating the internal configuration of the safety performance evaluation apparatus 1d according to the fifth embodiment mounted on the server 5d. The safety performance evaluation apparatus 1d of FIG. 24 includes a time zone setting unit 22 and an information extraction unit 21a in addition to an information acquisition unit 11, a registered information holding unit 12, a collected information holding unit 16, a safety performance evaluation unit 13d, an insurance premium deciding unit 14, and an insurance premium holding unit 15.

The time zone setting unit 22 sets a predetermined time zone. The predetermined time zone is arbitrary, and is, for example, a time zone with a large traffic volume such as a rush hour, an evening time zone with poor visibility, a daytime time zone on weekdays, or the like.

The information extraction unit 21a extracts the dynamic safety performance information such as an output of each sensor, a V2X message, or the like generated in the predetermined time zone among information acquired by the information acquisition unit 11. The dynamic safety performance information such as the output of each sensor, the V2X message, or the like is received by the server 5d via a base station 6 or an RSU 7. The information extraction unit 21a can extract the dynamic safety performance information such as the output of the sensor, the V2X message, or the like generated in the predetermined time zone on the basis of received time information of the base station 6 or the RSU 7 that has received the dynamic safety performance information and time information in the vehicle.

The safety performance evaluation unit 13d evaluates the safety performance of the ADAS/AD system mounted on the contract vehicle that has transmitted the dynamic safety performance information on the basis of the dynamic safety performance information generated in the predetermined time zone extracted by the information extraction unit 21a. As processing of the safety performance evaluation unit 13d of the present embodiment, processing similar to that of the safety performance evaluation unit 13a or 13b according to the second or third embodiment may be performed in a state of being limited to the predetermined time zone.

Figure 25:
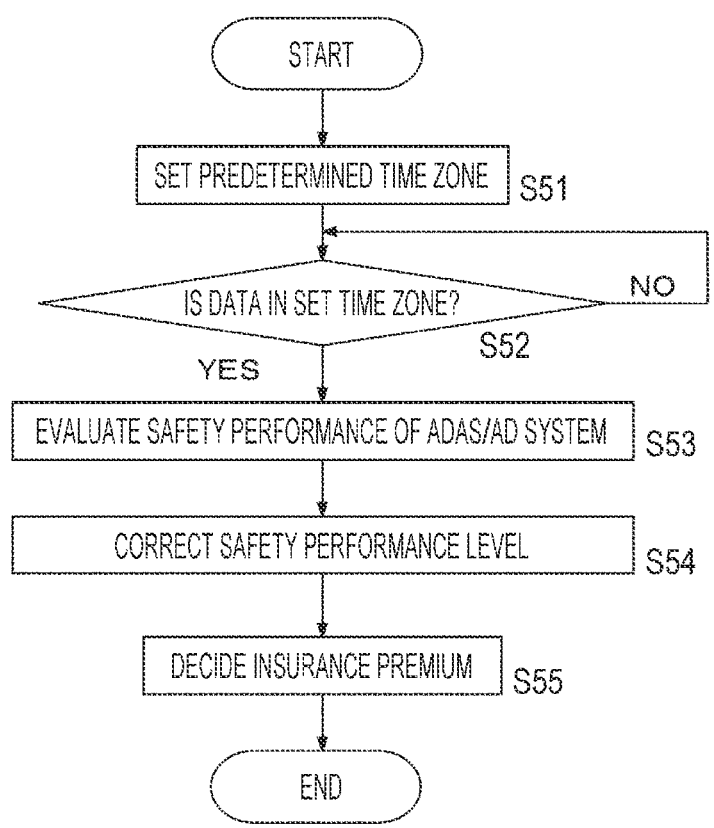
FIG. 25 is a flowchart illustrating a processing operation of the safety performance evaluation apparatus according to the fifth embodiment.

FIG. 25 is a flowchart illustrating a processing operation of the safety performance evaluation apparatus 1d according to the fifth embodiment mounted on the server 5d. First, the time zone setting unit 22 sets the predetermined time zone (Step S51).

Next, for each contract vehicle, it is determined whether or not the received dynamic safety performance information such as the V2X message, the output of the sensor, or the like is information that has been generated in the predetermined time zone (Step S52). The determination processing of Step S52 is performed by the safety performance evaluation unit 13d on the basis of the information extracted by the information extraction unit 21a. The information extraction unit 21a extracts the dynamic safety performance information such as the V2X message, the output of the sensor, or the like generated in the predetermined time zone on the basis of received time information of the base station 6 or the RSU 7 that receives the V2X message or the output of the sensor, and time information in the vehicle. The safety performance evaluation unit 13d determines that the information extracted by the information extraction unit 21a is information that has been generated in the predetermined time zone.

Next, the safety performance evaluation unit 13d evaluates the safety performance of the ADAS/AD system mounted on the corresponding contract vehicle on the basis of the dynamic safety performance information such as the V2X message, the output of the sensor, or the like generated in the predetermined time zone, and determines a safety performance level corresponding to the evaluated performance (Step S53). For example, the safety performance evaluation unit 13d evaluates that the ADAS/AD system in which the number of times of output from each sensor or the number of times of transmission of the V2X message in the predetermined time zone is larger has higher safety performance. In addition, the safety performance evaluation unit 13d may evaluate the safety performance on the basis of the object detection speed (object detection sensitivity) of the ADAS/AD system based on the output of the evaluation target sensor, similarly to the third embodiment.

Next, a travel time or a travel distance of the corresponding contract vehicle in the set time zone is measured. The safety performance level is corrected on the basis of the safety performance level determined in Step S53 and the travel time or the travel distance in the set time zone. For example, in a case where the set time zone is a time zone having a high accident occurrence rate such as an evening time zone or the like, the correction is made so that the longer the travel time or the travel distance in the set time zone with respect to the entire travel time or the entire travel distance, the lower the safety performance level (Step S54). Next, the insurance premium deciding unit 14 decides an insurance premium of the corresponding contract vehicle on the basis of the corrected safety performance level (Step S55). For example, in a case where the set time zone is a time zone having a high accident occurrence rate such as an evening time zone, the longer the travel time or the travel distance in the set time zone, the lower the discount rate for a basic insurance premium.

Here, although the insurance premium is decided on the basis of the corrected safety performance level in Step S55, calculation of the insurance premium/calculation of the insurance premium discount rate may be performed on the basis of the safety performance level decided in Step S53 without performing the processing of Step S54.

As described above, in the fifth embodiment, the safety performance of the ADAS/AD system is evaluated on the basis of the dynamic safety performance information such as the V2X message, the output of the sensor, or the like generated in the predetermined time zone. As a result, the safety performance evaluation apparatus 1d can objectively evaluate the safety performance of the ADAS/AD system mounted on each contract vehicle with a small amount of data.

Sixth Embodiment

In a case where a server 5 receives all V2X messages generated by each contract vehicle, a load of communication between each contract vehicle and the server 5 may be too large. In addition, in a case where the number of V2X messages received by the server 5 is large, a long time is required to search for a desired V2X message from the V2X messages. From such a background, in the fourth to fifth embodiments described above, an example in which the number of V2X messages or the number of outputs of the sensor received by the server 5 is reduced by limiting the area and the time zone has been described. On the other hand, in the sixth embodiment, the number of V2X messages transmitted by each contract vehicle is limited.

A safety performance evaluation system 3 according to the sixth embodiment includes an information processing apparatus 2a different from the information processing apparatus 2 of FIG. 7. Note that the server 5 may have a configuration similar to that of FIG. 6, or may have a configuration similar to that of FIG. 12, 14, 22, or 24.

Figure 26:
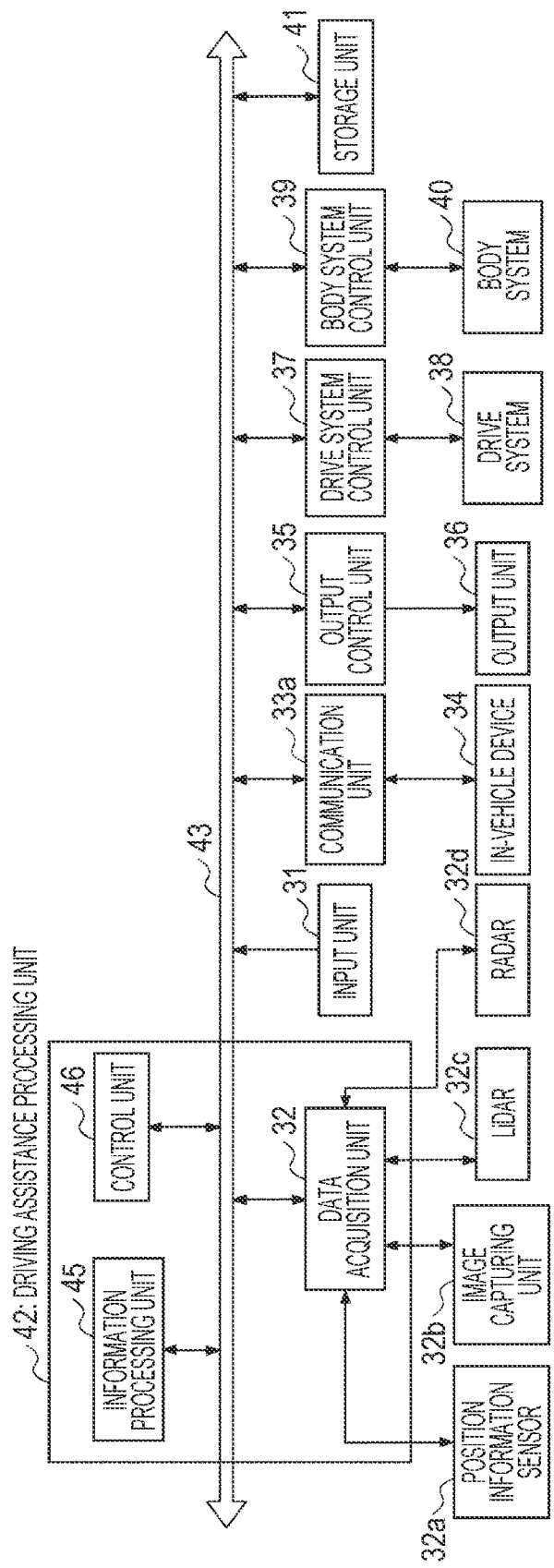
FIG. 26 is a block diagram illustrating a schematic configuration of an information processing apparatus according to a sixth embodiment.

FIG. 26 is a block diagram illustrating a schematic configuration of the information processing apparatus 2a according to the sixth embodiment mounted on each contract vehicle. A communication unit 33a of FIG. 26 transmits dynamic safety performance information such as a V2X message or the like generated when a predetermined event occurs in a case where the contract vehicle is traveling in a predetermined area. Therefore, even in a case where the dynamic safety performance information such as the V2X message or the like is generated due to the occurrence of an event, the communication unit 33a does not transmit the dynamic safety performance information in a case where the contract vehicle is not traveling in the predetermined area. As a result, it is possible to suppress the number of times each contract vehicle transmits the dynamic safety performance information such as the V2X message or the like.

Here, the predetermined event is, for example, a case where an obstacle is found in front of the own vehicle in a traveling direction, or the like. The event may be the trigger condition for transmission of the DENM of FIG. 10, for example. The number of events is not necessarily limited to one. Whether or not the event has occurred is determined on the basis of output information of an arbitrary sensor connected to a driving assistance processing unit 42.

An arbitrary area is set as the predetermined area. For example, an area with a high event occurrence rate may be set as the predetermined area.

In a case where it is determined that the own vehicle is traveling in the predetermined area after the occurrence of the event is detected, a V2X message generation unit 63 in a control unit 46 supplies the V2X message to an output unit 64. The V2X message is transmitted to a base station 6 or an RSU 7 via the communication unit 33a.

Figure 27:
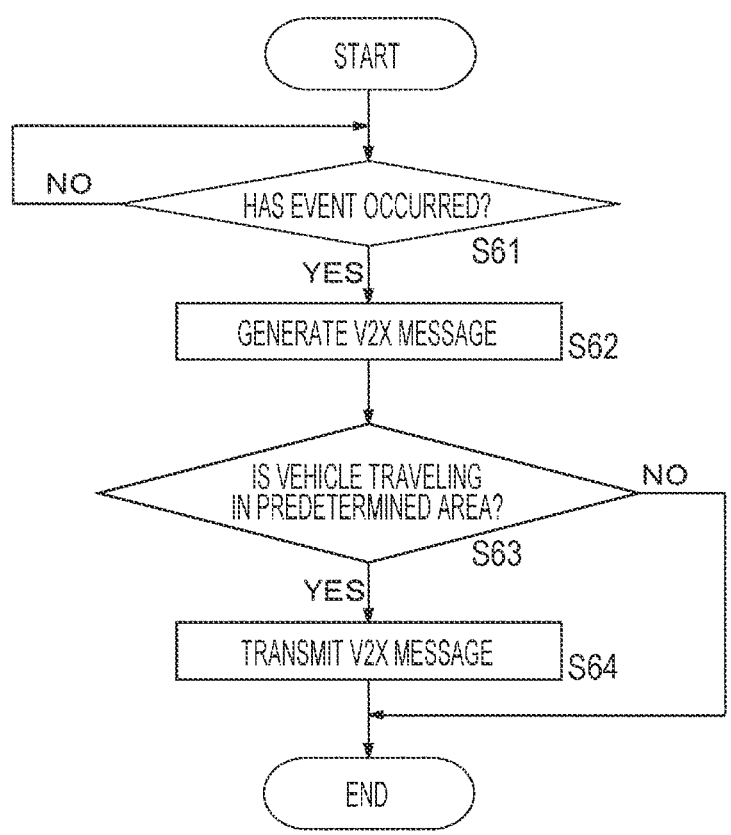
FIG. 27 is a flowchart illustrating a processing operation of the information processing apparatus according to the sixth embodiment.

FIG. 27 is a flowchart illustrating a processing operation of the information processing apparatus 2a according to the sixth embodiment mounted on each contract vehicle. The information processing apparatus 2a of each contract vehicle repeatedly performs processing of the flowchart of FIG. 27 while an engine is running.

First, it is determined whether or not the predetermined event has occurred (Step S61: first determination unit). In a case where no event has occurred, the processing of Step S61 is repeated.

In a case where the predetermined event has occurred, a V2X message corresponding to the occurred event is generated (Step S62). In Step S62, it is assumed that the generated V2X message is different for each type of event.

Next, it is determined whether or not the vehicle is traveling in the predetermined area (Step S63: second determination unit). Whether or not the vehicle is traveling in the predetermined area is determined by, for example, a position information sensor 32a or the like. In a case where the vehicle is traveling in the predetermined area, the V2X message generated in Step S62 is transmitted (Step S64), and in a case where the vehicle is not traveling in the predetermined area, the processing of FIG. 27 ends.

In this manner, in the flowchart of FIG. 27, the V2X message generated in response to the predetermined event is transmitted while the vehicle is traveling in the predetermined area. As a result, the number of times of transmission of the V2X message, that is, a transmission frequency can be reduced. Therefore, the server 5 can evaluate the safety performance of each contract vehicle on the basis of the V2X message from each contract vehicle traveling in the preset area. For example, in a case where the predetermined area is an accident-prone area, the server 5 can evaluate the safety performance of the ADAS/AD system mounted on each contract vehicle on the basis of the number of times each contract vehicle has transmitted the V2X message in the predetermined area.

According to the present embodiment, the amount of communication between each contract vehicle and the base station 6 or the RSU 7 can be reduced, and the amount of communication between the base station 6 or the RSU 7 and the server 5 can also be reduced. In addition, the number of V2X messages held in the server 5 can be reduced, and the server 5 can easily search for a desired V2X message.

FIG. 27 illustrates an example in which a specific V2X message is generated and transmitted in a case where each contract vehicle is traveling in the predetermined area set in advance when the predetermined event has occurred. However, the specific V2X message may also be generated and transmitted in a case where each contract vehicle is traveling in a specific time zone when the predetermined event has occurred. A block configuration of the information processing apparatus 2b in this case is, for example, as illustrated in FIG. 28.

Figure 28:
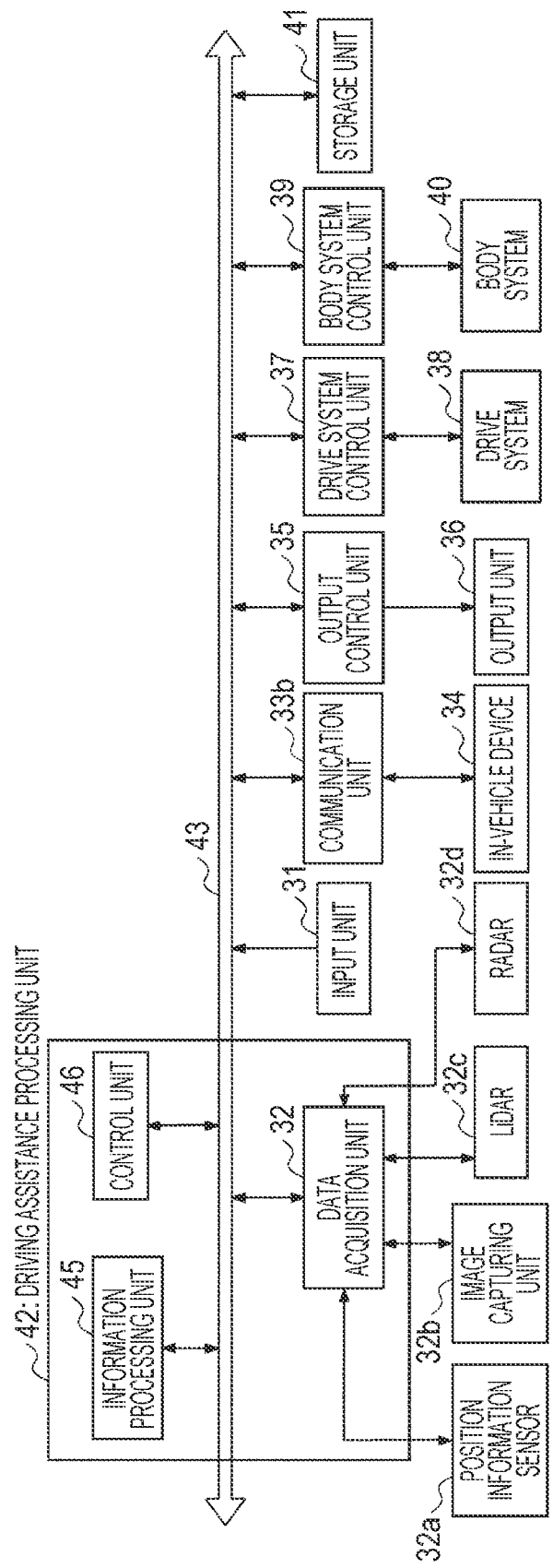
FIG. 28 is a block diagram illustrating a schematic configuration of a modified example of the information processing apparatus according to the sixth embodiment.

A communication unit 33b of FIG. 28 transmits the V2X message generated when the predetermined event has occurred in a case where the contract vehicle is traveling in the predetermined time zone. Therefore, even in a case where the V2X message is generated due to the occurrence of the event, the communication unit 33b does not transmit the V2X message in a case where the contract vehicle is not traveling in the predetermined time zone. As a result, the number of V2X messages transmitted by each contract vehicle can be reduced.

Figure 29:
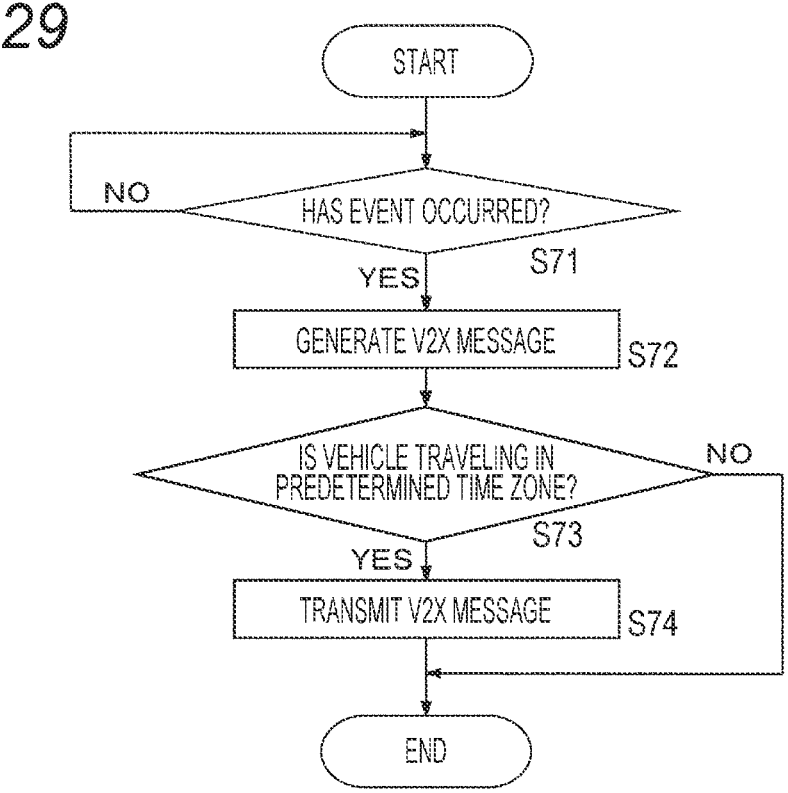
FIG. 29 is a flowchart illustrating a processing operation of the information processing apparatus of FIG. 28.

FIG. 29 is a flowchart illustrating a processing operation of the information processing apparatus 2b of FIG. 28. The processing of Step S73 in FIG. 29 is different from the processing of Step S63 in FIG. 27. After the V2X message is generated due to the occurrence of the predetermined event (Step S72), in Step S73, it is determined whether or not the own vehicle is traveling in the predetermined time zone (Step S73). In a case where the vehicle is traveling in the predetermined time zone, the V2X message is transmitted (Step S74), and in a case where the vehicle is not traveling in the predetermined time zone, the processing of FIG. 28 ends.

As described above, in the sixth embodiment, once the predetermined event occurs in each contract vehicle, a V2X message corresponding to the event is generated, and in a case where the corresponding contract vehicle is traveling in the predetermined area or is traveling in the predetermined time zone, the generated V2X message is transmitted. As a result, the number of V2X messages received by the server 5 can be limited, and the server 5 can easily manage the V2X messages. As a result, the server 5 can evaluate the safety performance of the contract vehicle that has transmitted the V2X message by using a small number of V2X messages.

Seventh Embodiment

In a seventh embodiment, an insurance premium is decided by evaluating safety performance of an ADAS/AD system in consideration of accident information of a contract vehicle.

Figure 30:
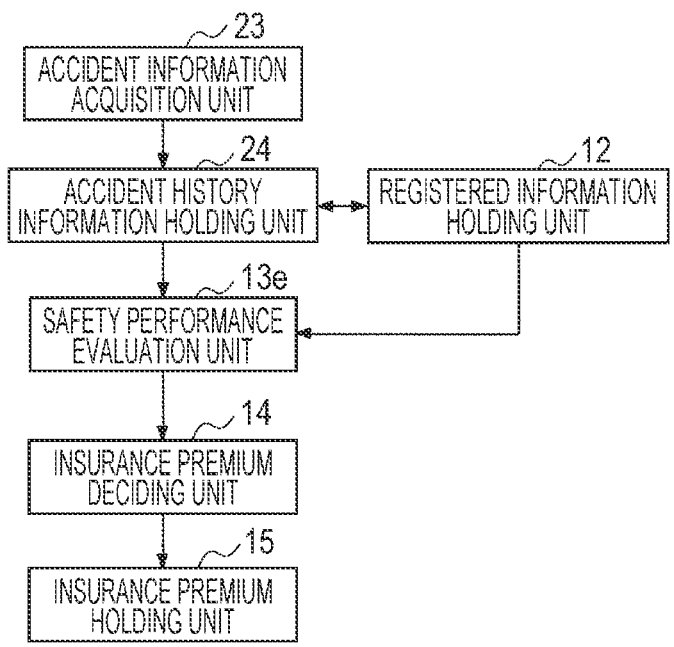
FIG. 30 is a block diagram illustrating an internal configuration of a server on which a safety performance evaluation apparatus according to a seventh embodiment is mounted.

FIG. 30 is a block diagram illustrating an internal configuration of a server 5e on which a safety performance evaluation apparatus 1e according to the seventh embodiment is mounted. In FIG. 30, components common to those in FIG. 6 are denoted by the same reference signs, and differences will be mainly described below. The server 5e of FIG. 30 includes an accident information acquisition unit 23, an accident history information holding unit 24, a registered information holding unit 12, a safety performance evaluation unit 13e, an insurance premium deciding unit 14, and an insurance premium holding unit 15. In addition, in addition to the configuration of FIG. 30, a number-of-times measurement unit 17 and a safety performance determination unit 18 similar to those in FIG. 12 may be provided, a detection sensitivity calculation unit 19 and a safety performance determination unit 18a similar to those in FIG. 14 may be provided, an area setting unit 20 and an information extraction unit 21 similar to those in FIG. 22 may be provided, or a time zone setting unit 22 and an information extraction unit 21a similar to those in FIG. 24 may be provided.

The accident information acquisition unit 23 acquires accident information. In a case where the contract vehicle has an accident, an indemnification or compensation may be paid from the insurance depending on seriousness of the accident. Meanwhile, for the contract vehicle that has had an accident, the insurance premium of the following year may be increased. In the present embodiment, the insurance premium of the contract vehicle is decided in consideration of whether or not the contract vehicle has had an accident. In a case where the contract vehicle has had an accident, the accident information acquisition unit 23 acquires information regarding the accident. The acquired accident information includes a date or place where the accident has occurred, a content of the accident, whether or not the insurance has been paid, the amount of indemnification or compensation, and the like.

The accident information regarding the contract vehicle acquired by the accident information acquisition unit 23 may be information input by an entity that owns the contract vehicle having an insurance contract with an insurance company, or an insurance company that has received a call or the like from a driver of the contract vehicle after confirming the accident. Furthermore, the information may also be information input by a person at a repair shop when repair of the vehicle having the accident is finished. Moreover, the occurrence of the accident may be detected using various sensors mounted on the contract vehicle, and the accident information acquisition unit 23 may acquire the accident information transmitted to the server 5e via the base station 6 or the RSU 7 through, for example, wireless communication.

The accident history information holding unit 24 holds past accident history information in addition to the accident information acquired by the accident information acquisition unit 23. In addition, the accident history information holding unit 24 acquires, from the registered information holding unit 12, information of each sensor mounted on the contract vehicle that has had the accident, and holds the information. The reason why the information of each sensor is acquired is that an accident occurrence frequency and the type of the accident may change depending on the type of the sensor mounted on the contract vehicle. In general, a contract vehicle on which a sensor having high safety performance is mounted is considered to have a low accident occurrence frequency.

The safety performance evaluation unit 13e generates statistical information of each sensor and an accident occurrence rate on the basis of the accident history information and the information of each sensor mounted on the contract vehicle, evaluates the safety performance of the ADAS/AD system mounted on the contract vehicle on the basis of the generated statistical information, and sets a safety performance level. Here, the accident occurrence rate is calculated, for example, for each product model number of the sensor. The insurance premium deciding unit 14 decides a discount amount for a basic insurance premium on the basis of the safety performance level set by the safety performance evaluation unit 13e.

The server 5e having a function combining the first to sixth embodiments and the seventh embodiment may be provided by adding the information acquisition unit 11 and the collected information holding unit 16 of FIG. 12 and the like to the server 5e of FIG. 30. That is, the server 5e may acquire safety performance information of a driving assistance processing unit 42 mounted on the contract vehicle and acquire the accident information. In this case, the safety performance evaluation unit 13e can evaluate the safety performance of the ADAS/AD system mounted on the contract vehicle in comprehensive consideration of the safety performance information of the contract vehicle and the accident history information, and decide the insurance premium on the basis of the evaluation result.

As described above, in the seventh embodiment, the information of the sensor mounted on the contract vehicle is acquired together with the accident information of the contract vehicle, the statistical information of the sensor and the accident occurrence rate is generated, and the safety performance of the ADAS/AD system mounted on the contract vehicle is evaluated on the basis of the statistical information to decide the discount amount for the insurance premium. As a result, the insurance premium can be decided in consideration of the accident occurrence rate and the like, and it is possible to promote the spread of the ADAS/AD system having high safety performance capable of reducing the accident occurrence rate.

Eighth Embodiment

In an eighth embodiment, the server 5, 5a, 5b, 5c, 5d, or 5e having the function of any one of the first to fifth and seventh embodiments further has an additional function related to maintenance. In the eighth embodiment, not only static safety performance information but also dynamic safety performance information is transmitted from each contract vehicle to a server 5f.

Figure 31:
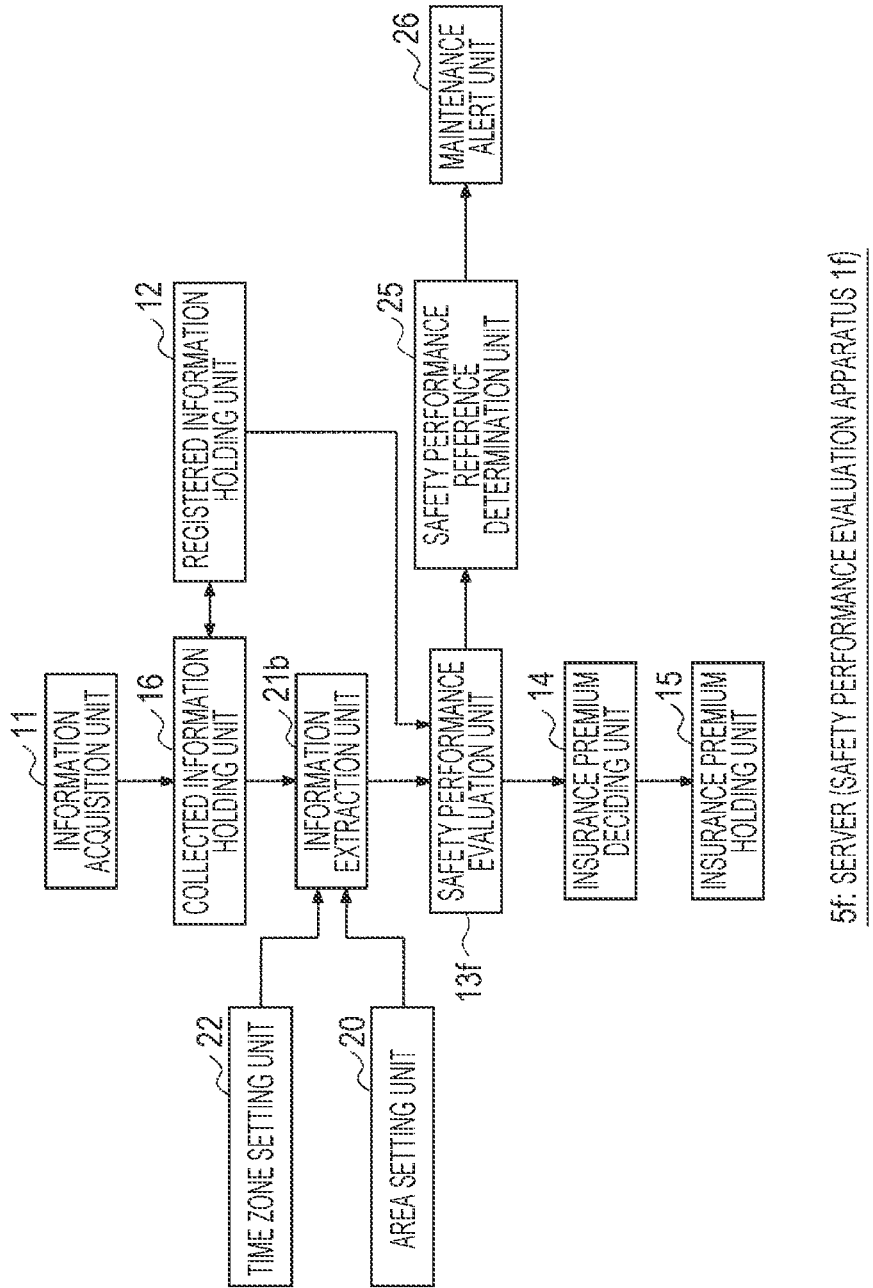
FIG. 31 is a block diagram illustrating an internal configuration of a server on which a safety performance evaluation apparatus according to an eighth embodiment is mounted.

FIG. 31 is a block diagram illustrating an internal configuration of the server 5f on which a safety performance evaluation apparatus if according to the eighth embodiment is mounted. The safety performance evaluation apparatus if of FIG. 31 includes an information acquisition unit 11, a collected information holding unit 16, a registered information holding unit 12, a safety performance evaluation unit 13f, an insurance premium deciding unit 14, and an insurance premium holding unit 15. The safety performance evaluation unit 13f includes, for example, a number-of-times measurement unit 17 similar to that of FIG. 12, a detection sensitivity calculation unit 19 similar to that of FIG. 13, and a safety performance determination unit 18. Furthermore, the safety performance evaluation apparatus if of FIG. 31 includes an area setting unit 20 similar to that of FIG. 22, a time zone setting unit 22 similar to that of FIG. 23, and an information extraction unit 21b. Although omitted in FIG. 31, the safety performance evaluation unit 13f may include the number-of-times measurement unit 17 and the safety performance determination unit 18 of FIG. 12, or may include the detection sensitivity calculation unit 19 and the safety performance determination unit 18a of FIG. 14. Note that the area setting unit 20, the time zone setting unit 22, or the information extraction unit 21b can be omitted as appropriate. In addition, the safety performance evaluation apparatus if of FIG. 31 includes a safety performance standard determination unit 25 and a maintenance alert unit 26.

The safety performance standard determination unit 25 determines whether or not a safety performance level evaluated by the safety performance evaluation unit 13f reaches a predetermined standard. The predetermined standard is a standard for determining whether or not maintenance of a driving assistance processing unit 42 is necessary. For example, the safety performance evaluation unit 13f can quantify safety performance of an ADAS/AD system by an output of each sensor connected to the driving assistance processing unit 42 as the safety performance level, compare an additional value or an average value of numerical values of the safety performance of all the sensors of the driving assistance processing unit 42 with a reference value for each contract vehicle, and determine whether or not the predetermined standard has been reached. Instead of evaluating the safety performance of the ADAS/AD system for each sensor output, the safety performance evaluation unit 13f may evaluate the safety performance of the entire ADAS/AD system and set the safety performance level as a whole.

Note that processing performed by the safety performance evaluation unit 13f is processing of a combination of the pieces of processing performed by the safety performance evaluation units 13c and 13d described in Examples 4 and 5.

The safety performance standard determination unit 25 may provide a plurality of reference values and classify and determine the safety performance of the contract vehicle into a plurality of levels.

In a case where the safety performance standard determination unit 25 determines that the predetermined standard has not been reached, the maintenance alert unit 26 urges maintenance of the driving assistance processing unit 42. For example, the maintenance of the driving assistance processing unit 42 may be requested to an owner or user of the contract vehicle on which the driving assistance processing unit 42 is mounted. In this case, it is assumed that contact information of the owner or user of the contract vehicle is held in advance.

In addition, in a case where the safety performance standard determination unit 25 determines that the contract vehicle does not reach the predetermined standard while traveling, the maintenance alert unit 26 may issue an instruction to the target contract vehicle from the server 5f to present an alert to the driver.

In addition, in a case where the safety performance standard determination unit 25 determines that the contract vehicle does not reach the predetermined standard while traveling, the maintenance alert unit 26 may issue an instruction to the target contract vehicle from the server 5f to perform a control to move the contract vehicle to a safe place such as a road shoulder or the like to thereby urge the stop of the engine. As described above, in a case where the safety performance standard determination unit 25 provides a plurality of reference values and classifies the safety performance of the contract vehicle into a plurality of levels, the maintenance alert unit 26 can take a maintenance measure according to the classified level. For example, a measure such as forcibly stopping traveling or the like may be performed as described above for a contract vehicle whose safety performance is classified as the lowest level. In addition, in a case where the level of the safety performance is not the lowest level, it may be only required to contact the owner or the user of the contract vehicle.

Figure 32:
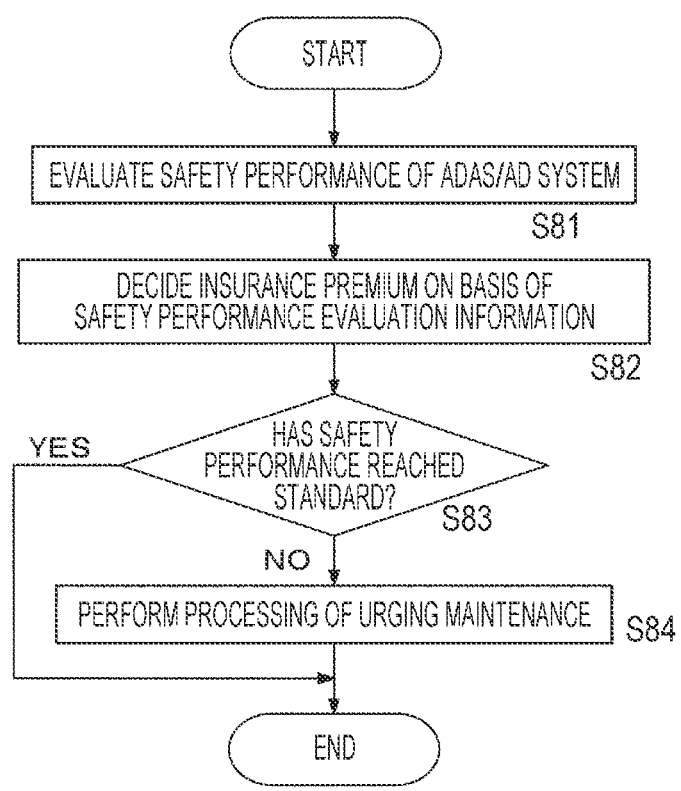
FIG. 32 is a flowchart illustrating a processing operation of the safety performance evaluation apparatus according to the eighth embodiment.

FIG. 32 is a flowchart illustrating a processing operation of the safety performance evaluation apparatus 1f according to the eighth embodiment. Steps S81 to S82 are similar to Steps S1 to S2 in FIG. 11. Once the insurance premium is determined in Step S82, next, it is determined whether or not the safety performance evaluated by the safety performance evaluation unit 13f has reached the predetermined standard (Step S83). For example, the safety performance evaluation unit 13f sets the safety performance level. More specifically, the safety performance evaluation unit 13f outputs, as the safety performance level, numerical value data that increases as the safety performance is improved. In Step S83, it is determined whether or not the safety performance level output from the safety performance evaluation unit 13f is less than a predetermined reference value. In a case where the safety performance level is equal to or greater than the reference value, it is regarded that the safety performance has reached the standard, and the processing of FIG. 32 ends. On the other hand, in a case where the safety performance level is less than the reference value, it is regarded that the safety performance has not reached the standard, and processing of urging the maintenance of the driving assistance processing unit 42 is performed (Step S84). Here, the server 5f may notify the contract vehicle of a request for the maintenance of the driving assistance processing unit 42 via the base station 6 or the RSU 7. In this case, for example, a notification of a recommendation of the maintenance of the driving assistance processing unit 42 may be made on a monitor of a dashboard of the contract vehicle. Alternatively, the server 5f may make a notification to cause an insurance company to request the contract vehicle for the maintenance of the driving assistance processing unit 42. In this case, the insurance company notifies the contractor or the user of the contract vehicle of the request for the maintenance of the driving assistance processing unit 42 by mail, e-mail, or the like. Here, the request for the maintenance of the driving assistance processing unit 42 notified from the insurance company to the contractor or the user of the contract vehicle may include, for example, a place or contact of a candidate maintenance factory, a candidate time zone for maintenance reception, and the like.

Note that the safety performance standard determination unit 25 and the maintenance alert unit 26 may be added inside the server 5 of FIG. 6, the server 5a of FIG. 12, the server 5b of FIG. 14, the server 5c of FIG. 22, or the server 5d of FIG. 24, and processing similar to Steps S93 to S94 of FIG. 32 may be added to the flowchart of FIG. 13, FIG. 15, FIG. 21, FIG. 23, or FIG. 25.

As described above, in the eighth embodiment, in a case where the safety performance of the ADAS/AD system mounted on the contract vehicle does not reach the predetermined standard, the maintenance of the ADAS/AD system is urged, such that it is possible to prevent the contract vehicle from continuing traveling in a state where the maintenance of the ADAS/AD system is insufficient. In addition, in a case where the safety performance of the ADAS/AD system is originally low, replacement with an ADAS/AD system having high safety performance can be urged. For example, when urging the maintenance of the ADAS/AD system, it is possible to promote the spread of the ADAS/AD system having high safety performance by presenting how much the insurance premium is reduced by the replacement with the ADAS/AD system having high safety performance.

Note that, in the first to eighth embodiments described above, the ADAS/AD system does not have to be activated for a vehicle on which an in-vehicle system having low safety performance is mounted. Further, in a case where a vehicle on which an in-vehicle system having low safety performance is traveling, the vehicle may be safely stopped by a remote vehicle control or the like. In this case, although not illustrated, a control command is transmitted from the server 5 to the vehicle via the network. The vehicle receives the control command through the communication unit 33 of FIG. 7. The vehicle is controlled by the drive system control unit 37 on the basis of the control command, and is stopped in a safety zone such as a road shoulder or the like.

Ninth Embodiment

In a ninth embodiment, the server 5, 5a, 5b, 5c, 5d, 5e, or 5f having the function of any one of the first to fifth, seventh, and eighth embodiments further has an additional function related to transmission of control information to the vehicle.

Figure 33:
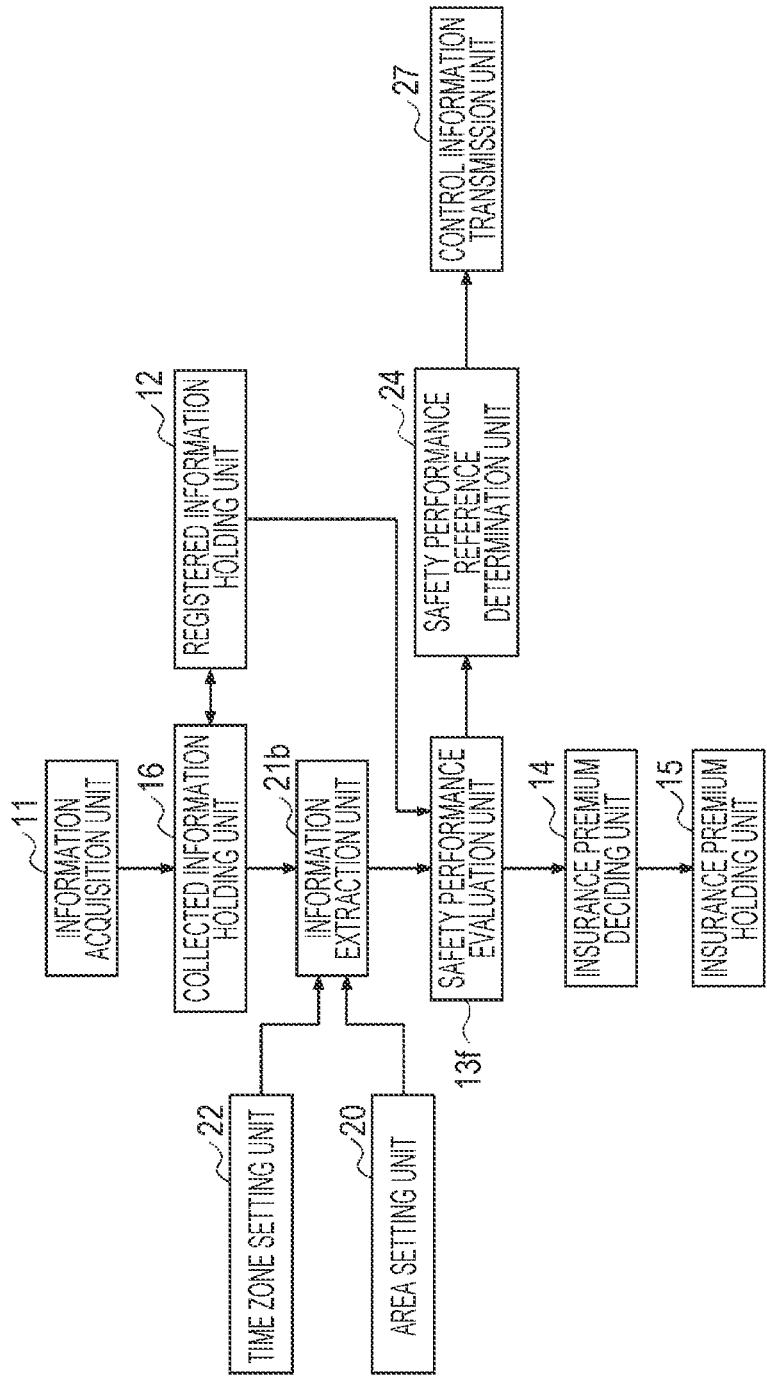
FIG. 33 is a block diagram illustrating an internal configuration of a server on which a safety performance evaluation apparatus according to a ninth embodiment is mounted.

FIG. 33 is a block diagram illustrating an internal configuration of a server 5g on which a safety performance evaluation apparatus 1g according to the ninth embodiment is mounted. Similarly to the safety performance evaluation apparatus 1f of FIG. 31, the safety performance evaluation apparatus 1g of FIG. 33 includes an information acquisition unit 11, a collected information holding unit 16, a registered information holding unit 12, a safety performance evaluation unit 13f, an insurance premium deciding unit 14, and an insurance premium holding unit 15, an area setting unit 20, a time zone setting unit 22, and a safety performance standard determination unit 25.

In addition, the safety performance evaluation apparatus 1g of FIG. 33 includes a control information transmission unit 27 instead of the maintenance alert unit 26 of FIG. 31. Note that the maintenance alert unit 26 may be additionally provided in the safety performance evaluation apparatus 1g of FIG. 33. The control information transmission unit 27 transmits control information for limiting an autonomous driving function or not permitting autonomous driving to a vehicle whose evaluated safety performance is determined as not reaching a predetermined standard. For example, the vehicle that has received the control information indicating that the autonomous driving is not permitted makes a notification for a driver so as to perform switching to manual driving in a case where the autonomous driving is being performed. In a case of not switching to the manual driving, the vehicle that has received the control information performs a control to stop on a traveling lane where the vehicle is traveling or a road shoulder.

Furthermore, the control information may be information for controlling the vehicle so that low-function autonomous driving (or ADAS processing) can be performed but high-function autonomous driving (or ADAS processing) cannot be performed. In this case, in the vehicle that has received the control information, an autonomous driving level is changed to the low-function autonomous driving in a case where the vehicle is performing the high-function autonomous driving. Then, a passenger such as the driver or the like is notified that the autonomous driving level has been changed to an autonomous driving level in which a level of the performable function (permitted function) is low. In a case where the manual driving is being performed, when switching from the manual driving to the autonomous driving mode is performed, the traveling of the vehicle is controlled by the low-function autonomous driving (/ADAS processing) instead of the high-function autonomous driving (/ADAS processing). In this case, the driver cannot select (or perform) the high-function autonomous driving (/ADAS processing). For example, the vehicle can use an automatic lane change function in the high-function autonomous driving, whereas the vehicle cannot use the automatic lane change function in the low-function autonomous driving. That is, the autonomous driving function may be performed only in the same traveling lane. In addition, in the high-function autonomous driving (/ADAS processing), autonomous driving at a speed faster than that in the low-function autonomous driving (for example, the speed is up to the legal speed) may be performed (permitted), and in the low-function autonomous driving (/ADAS processing), only the automatic driving at a speed (for example, up to 40 km/h) lower than that in the high-function autonomous driving may be performed (permitted). Here, the high-function autonomous driving (/ADAS processing) and the low-function autonomous driving (/ADAS processing) are performed, but the function of the autonomous driving (/ADAS processing) may be divided into three or more levels, and a safety performance evaluation result may be associated with each level. In this case, the association may be performed so that a vehicle evaluated as having high safety performance (as being safer) can perform the high-function autonomous driving (/ADAS processing).

Figure 34:
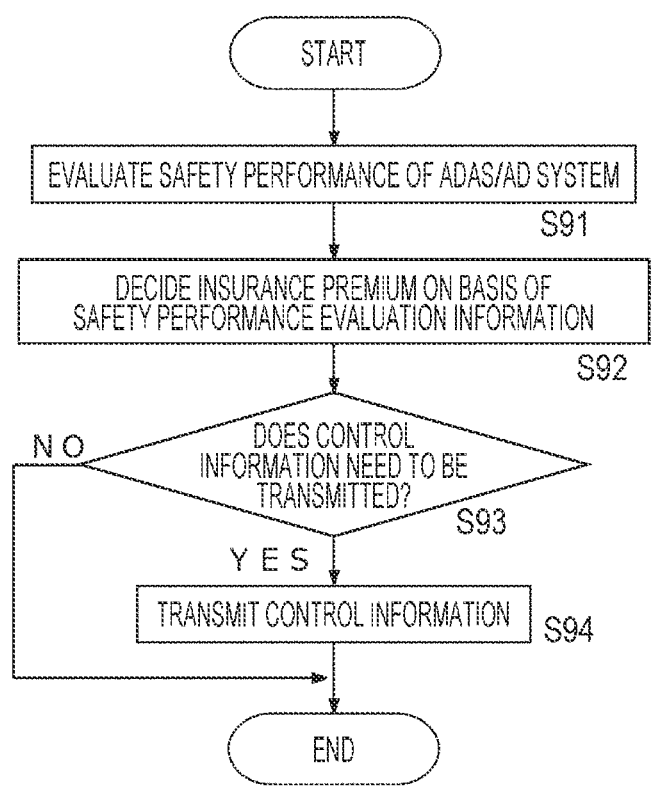
FIG. 34 is a flowchart illustrating a processing operation of the safety performance evaluation apparatus according to the ninth embodiment.

FIG. 34 is a flowchart illustrating a processing operation of the safety performance evaluation apparatus 1g according to the ninth embodiment. Steps S91 to S92 are similar to Steps S81 to S82 in FIG. 32. Once an insurance premium is determined in Step S92, next, it is determined whether or not the control information needs to be transmitted by the control information transmission unit 27 (Step S93). In Step S93, it is determined that the control information needs to be transmitted to a vehicle whose evaluated safety is determined as not reaching the predetermined standard, and the control information is transmitted to the vehicle (Step S94). As described above, the control information is, for example, information for switching from the autonomous driving to the manual driving or switching from the high-function autonomous driving to the low-function autonomous driving. On the other hand, in a case where it is determined in Step S93 that the control information need not be transmitted, the processing of FIG. 34 ends without transmitting the control information.

Figure 35:
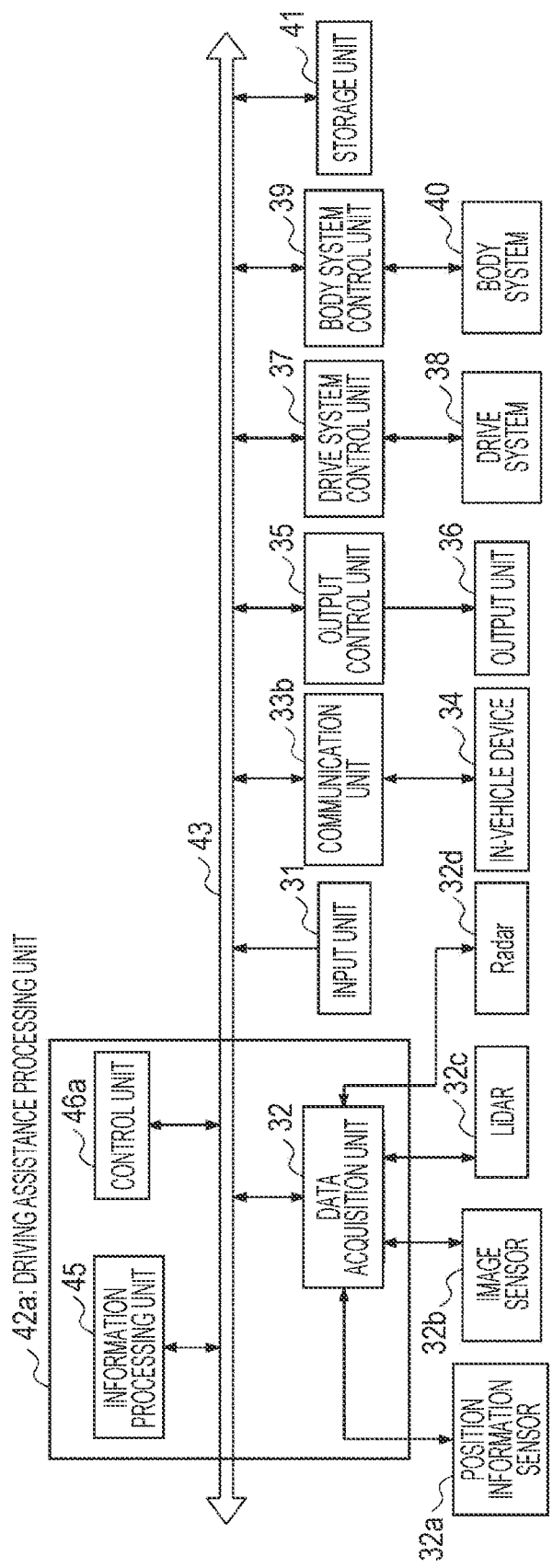
FIG. 35 is a block diagram illustrating a schematic configuration of an information processing apparatus 2c according to the ninth embodiment.

FIG. 35 is a block diagram illustrating a schematic configuration of an information processing apparatus 2c according to the ninth embodiment mounted on each contract vehicle. The information processing apparatus 2c of FIG. 35 has a block configuration similar to that of the information processing apparatus 2b of FIG. 28, but an operation of a control unit 46a in a driving assistance processing unit 42a is different from that of the control unit 46 of FIG. 28.

The control unit 46a of FIG. 35 controls the vehicle on the basis of the control information transmitted from the server 5g (safety performance evaluation apparatus 1g) of FIG. 33.

Figure 36:
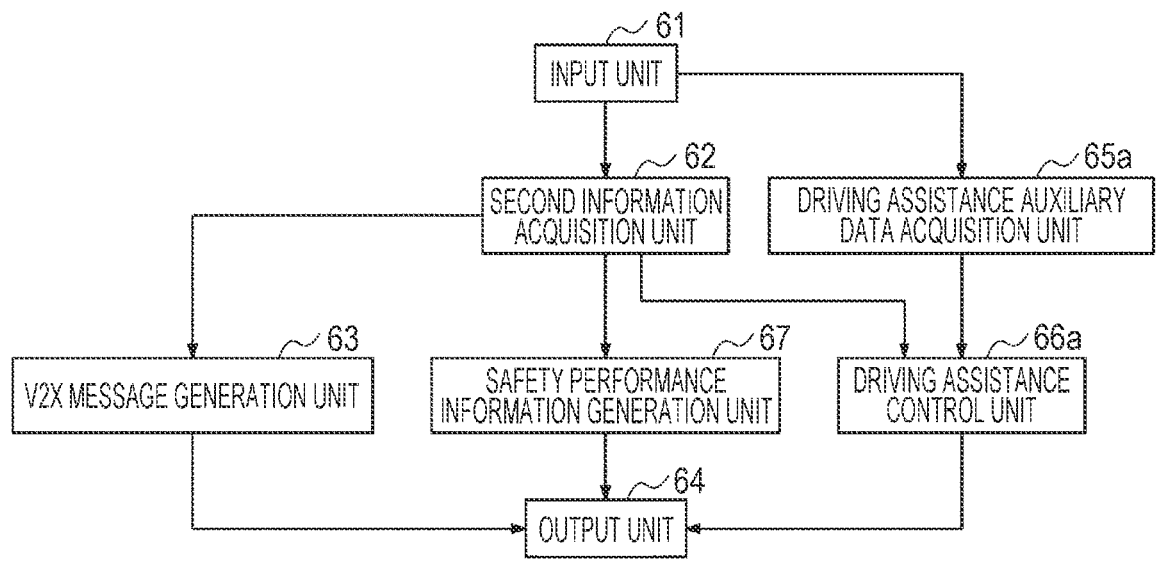
FIG. 36 is a block diagram illustrating an example of a detailed configuration of a control unit 46a of FIG. 35.

FIG. 36 is a block diagram illustrating an example of a detailed configuration of the control unit 46a of FIG. 35. The control unit 46a of FIG. 36 has a block configuration similar to that of the control unit 46 of FIG. 9, but includes a driving assistance auxiliary data acquisition unit 65a and a driving assistance control unit 66a that are operated differently from the driving assistance auxiliary data acquisition unit 65 and the driving assistance control unit 66 of FIG. 9.

The driving assistance auxiliary data acquisition unit 65a acquires the control information transmitted from the server 5g (safety performance evaluation apparatus 1g). The acquired control information is, for example, autonomous driving level control information for controlling an autonomous driving level allowable for the vehicle. In this case, the driving assistance control unit 66a generates vehicle control information on the basis of the autonomous driving level allowable on the basis of the autonomous driving level control information.

Furthermore, in a case where the acquired control information includes the safety performance evaluation result, the driving assistance control unit 66a decides the allowable autonomous driving level on the basis of the safety performance evaluation result, and generates the vehicle control information on the basis of the decided autonomous driving level. For example, the driving assistance control unit 66a holds relationship information indicating a correspondence relationship between the allowable autonomous driving level and the safety performance evaluation result, and decides the autonomous driving level from the safety performance evaluation result on the basis of the relationship information. The driving assistance control unit 66a can perform driving assistance on the basis of a function corresponding to the allowable autonomous driving level. Furthermore, the driving assistance control unit 66a generates the vehicle control information for autonomous driving on the basis of the function corresponding to the allowable autonomous driving level.

In a case where the allowable autonomous driving level is not the autonomous driving but the manual driving, and the vehicle is performing autonomous driving, the driving assistance control unit 66a urges the driver to perform switching to the manual driving via an in-vehicle device such as a display or a speaker inside the vehicle. In a case where the driver does not perform switching to the manual driving, the driving assistance control unit 66a generates the vehicle control information to automatically stop the vehicle or move the vehicle to a safe place such as a road shoulder or the like and stop the vehicle.

Figure 37:
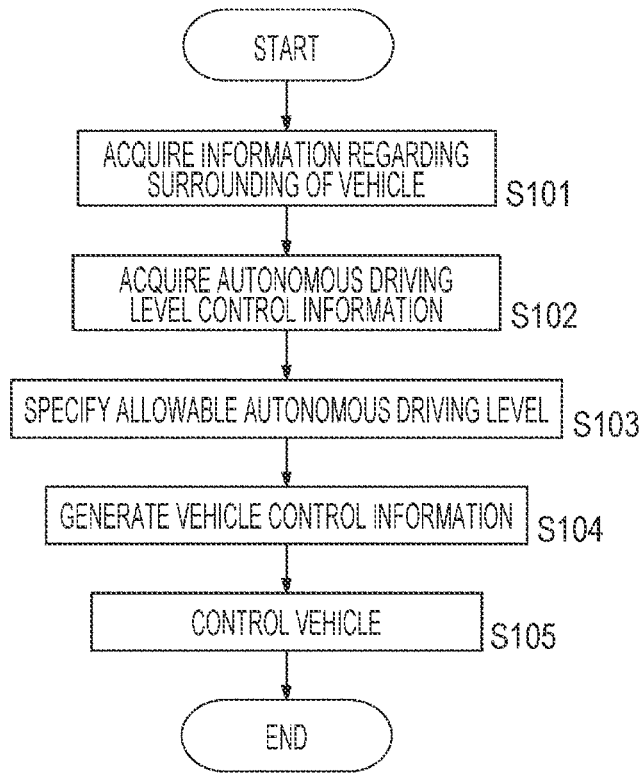
FIG. 37 is a flowchart illustrating an operation of the control unit 46a of FIG. 36.

FIG. 37 is a flowchart illustrating an operation of the control unit 46a of FIG. 36. First, information regarding the surrounding of the vehicle is acquired (Step S101). Here, information (for example, 3D map information) regarding a situation around the vehicle such as an object recognition result of each sensor or the like is acquired. The information regarding the surrounding of the vehicle may include environment information generated by the environment information generation unit 67 of FIG. 36.

Next, the autonomous driving level control information transmitted from the server 5g (safety performance evaluation apparatus 1g) is acquired (Step S102). Next, the allowable autonomous driving level is specified on the basis of the information regarding the surrounding of the vehicle and the autonomous driving level control information (Step S103). Next, the vehicle control information is generated on the basis of the specified autonomous driving level (Step S104).

Next, a drive system apparatus of the vehicle is controlled on the basis of the generated vehicle control information (Step S105).

As described above, in the ninth embodiment, the autonomous driving level control information is generated on the basis of the safety performance of the vehicle evaluated by the server 5g (safety performance evaluation apparatus 1g) and is transmitted to the vehicle, and in the vehicle, the autonomous driving level is specified on the basis of the received autonomous driving level control information to control the vehicle. As a result, the vehicle can travel more safely, and an accident due to autonomous driving in a situation where the safety performance is not secured can be prevented in advance.

As the ninth embodiment, in addition to the above-described example, a server, in which the safety performance standard determination unit 25 to which the safety performance evaluation level or the safety performance level is input from the safety performance determination unit 18 or 18a or the safety performance evaluation unit 18 or 18a, and the control information transmission unit 27 to which information indicating whether or not the safety performance has reached the predetermined standard is input from the safety performance standard determination unit 25 are added to the server 5, 5a, 5b, 5c, 5d, 5e, or 5f having the function of any of the first to fifth, seventh, and eighth embodiments, may be used.

At least some of the safety performance evaluation apparatuses 1, 1a, 1b, 1c, 1d, 1e, 1f, and 1g, the information processing apparatuses 2, 2a, 2b, and 2c, and the safety performance evaluation system 3 described in the respective embodiments described above may be configured by hardware or software. In a case of being configured by software, a program that implements the functions of at least some of the safety performance evaluation apparatuses 1, 1a, 1b, 1c, 1d, 1e, 1f, and 1g, the information processing apparatuses 2, 2a, 2b, and 2c, and the safety performance evaluation system 3 may be stored in a recording medium such as a semiconductor memory, a hard disk, a flexible disk, a CD-ROM, or the like, and may be read and executed by a computer. In addition, the program that implements the functions of at least some of the safety performance evaluation apparatuses 1, 1a, 1b, 1c, 1d, 1e, 1f, and 1g, the information processing apparatuses 2, 2a, 2b, and 2c, and the safety performance evaluation system 3 may be dynamically downloaded from the base station 6 or the RSU 7 and stored in the recording medium described above.

Figure 38:
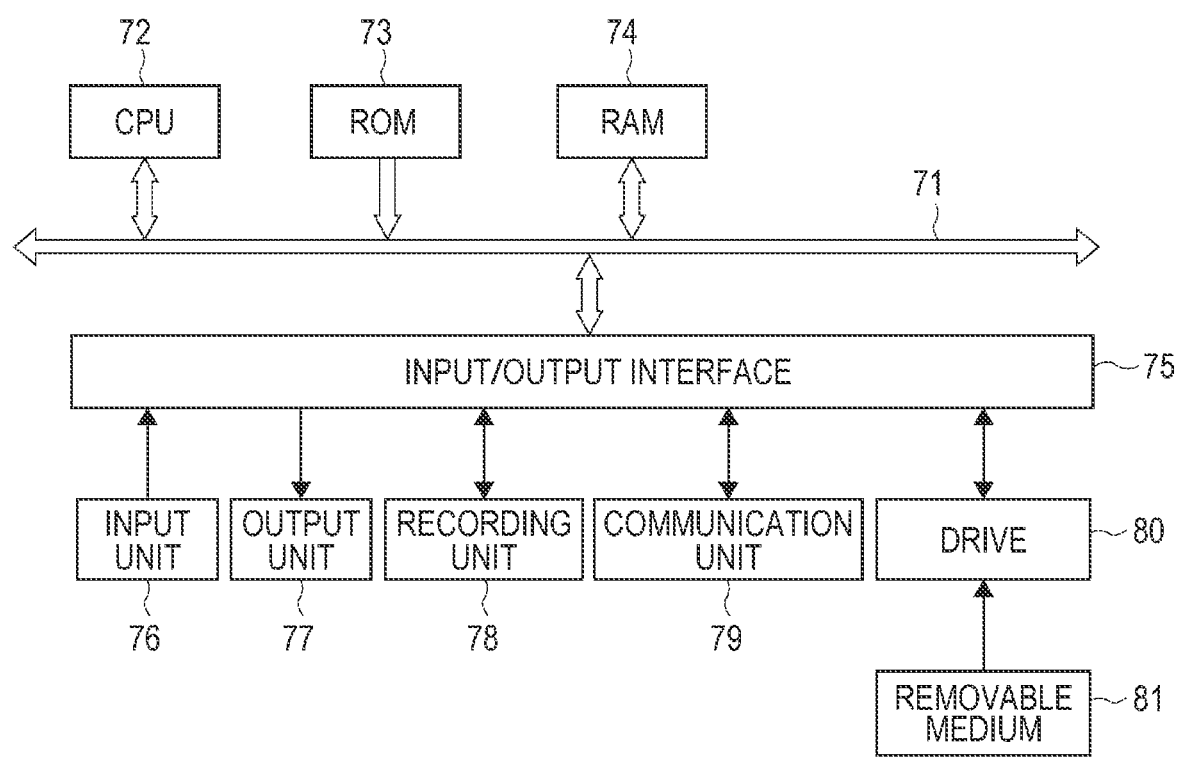
FIG. 38 is a block diagram illustrating a hardware configuration example of a computer that executes a program to perform a series of pieces of processing of the safety performance evaluation apparatus, the information processing apparatus, and the safety performance evaluation system.

FIG. 38 is a block diagram illustrating a hardware configuration example of a computer 70 that executes the program to perform a series of pieces of processing of the safety performance evaluation apparatuses 1, 1a, 1b, 1c, 1d, 1e, 1f, and 1g, the information processing apparatuses 2, 2a, 2b, and 2c, and the safety performance evaluation system 3 described above.

The computer 70 of FIG. 38 includes a central processing unit (CPU) 72, a read only memory (ROM) 73, a random access memory (RAM) 74, and an input/output interface 75 connected to one another by a bus 71.

An input unit 76, an output unit 77, a recording unit 78, a communication unit 79, and a drive 80 are connected to the input/output interface 75.

The input unit 76 includes an input switch, a button, a microphone, an image capturing element, or the like. The output unit 77 includes a display, a speaker, or the like. The recording unit 78 includes a hard disk, a nonvolatile memory device, or the like. The communication unit 79 includes a wired or wireless communication interface, and can access a public network such as the Internet or the like, or a dedicated network. The drive 80 is an apparatus that drives a removable medium 81 such as a magnetic disk, an optical disk, a magneto-optical disk, a semiconductor memory, or the like.

The CPU 72 of the computer 70 of FIG. 38 performs the above-described series of pieces of processing by, for example, loading the program recorded in the recording unit 78 into the RAM 74 via the input/output interface 75 and the bus 71 and executing the program.

The program executed by the computer 70, that is, the CPU 72, can be provided by being recorded in the removable medium 81 as a package medium or the like, for example. Furthermore, the program can be provided via a wired or wireless transmission medium such as a local area network, the Internet, or digital satellite broadcasting, or a cellular network.

The program executed by the computer 70 can be installed in the recording unit 78 via the input/output interface 75 by mounting the removable medium 81 on the drive 80. Furthermore, the program can be received by the communication unit 79 via a wired or wireless transmission medium and installed in the recording unit 78. In addition, the program can be installed in the ROM 73 or the recording unit 78 in advance. Moreover, the program may be distributed via a wired line or a wireless line such as the Internet or the like or may be distributed by being stored in the removable medium 81, in an encrypted, modulated, or compressed state.

Note that the program executed by the computer 70 may be a program by which the pieces of processing are performed in time series in the order described in the present specification, or may be a program by which the pieces of processing are performed in parallel or at a necessary timing such as when a call is performed or the like.

In addition, in the above description, a system means a set of a plurality of components (apparatuses, modules (parts), or the like), and it does not matter whether or not all the components are in the same housing. Therefore, a plurality of apparatuses housed in separate housings and connected via a network and one apparatus in which a plurality of modules is housed in one housing are both systems.

Note that the present technology can have the following configuration.

(1) A safety performance evaluation apparatus including:
an acquisition unit that acquires information regarding a driving assistance function of a mobile object; and
an evaluation unit that evaluates safety performance of the driving assistance function of the mobile object on the basis of the acquired information.

(2) The safety performance evaluation apparatus according to (1),
in which the information regarding the driving assistance function of the mobile object includes identification information of a driving assistance processing unit mounted on the mobile object, and
the evaluation unit evaluates the safety performance of the driving assistance function of the mobile object on the basis of the identification information of the driving assistance processing unit.

(3) The safety performance evaluation apparatus according to (2),
in which the information regarding the driving assistance function of the mobile object includes safety performance information of the driving assistance processing unit, and the evaluation unit evaluates the safety performance of the driving assistance function of the mobile object on the basis of the identification information and the safety performance information of the driving assistance processing unit.

(4) The safety performance evaluation apparatus according to (3), in which the safety performance information includes at least one of identification information or output information of a sensor built in or connected to the driving assistance processing unit.

(5) The safety performance evaluation apparatus according to (3) or (4), in which the safety performance information includes at least one of identification information of a signal processing large scale integrated circuit (LSI) that implements a function of the driving assistance processing unit, version information of software that implements the function of the driving assistance processing unit, or accident information of the mobile object.

(6) The safety performance evaluation apparatus according to any one of (2) to (5), in which the evaluation unit evaluates the safety performance of the driving assistance function of the mobile object on the basis of detection capability of a sensor built in or connected to the driving assistance processing unit.

(7) The safety performance evaluation apparatus according to (6), in which the evaluation unit evaluates the safety performance of the driving assistance function of the mobile object on the basis of time difference information from a time when the sensor built in or connected to the driving assistance processing unit detects a target object at a reference point to a time when the mobile object passes through the reference point.

(8) The safety performance evaluation apparatus according to any one of (2) to (5), further including
a number-of-times measurement unit that measures the number of times a specific message has been transmitted by the driving assistance processing unit,
in which the evaluation unit evaluates the safety performance of the driving assistance function of the mobile object on the basis of the number of times measured by the number-of-times measurement unit.

(9) The safety performance evaluation apparatus according to any one of (2) to (5), in which the evaluation unit evaluates the safety performance of the driving assistance function of the mobile object on the basis of the output information of the sensor built in or connected to the driving assistance processing unit when the mobile object transmits a message.

(10) The safety performance evaluation apparatus according to any one of (1) to (9), further including:
an area setting unit that sets a predetermined area; and
an information extraction unit that extracts the information regarding the driving assistance function of the mobile object acquired within the predetermined area by the acquisition unit,
in which the evaluation unit evaluates the safety performance of the driving assistance function of the mobile object on the basis of the information extracted by the information extraction unit.

(11) The safety performance evaluation apparatus according to any one of (1) to (9), further including:
a time zone setting unit that sets a predetermined time zone; and
an information extraction unit that extracts the information regarding the driving assistance function of the mobile object acquired within the predetermined time zone by the acquisition unit,
in which the evaluation unit evaluates the safety performance of the driving assistance function of the mobile object on the basis of the information extracted by the information extraction unit.

(12) The safety performance evaluation apparatus according to any one of (1) to (11), further including a deciding unit that decides an insurance premium for the mobile object on the basis of the safety performance evaluated by the evaluation unit.

(13) The safety performance evaluation apparatus according to any one of (1) to (12), further including:
a safety performance standard determination unit that determines whether or not the safety performance evaluated by the evaluation unit has reached a predetermined standard; and
a maintenance alert unit that urges maintenance of the driving assistance function of the mobile object in a case where it is determined by the safety performance standard determination unit that the predetermined standard has not been reached.

(14) A safety performance evaluation method including:
acquiring information regarding a driving assistance function of a mobile object; and
evaluating safety performance of the driving assistance function of the mobile object on the basis of the acquired information.

(15) An information processing apparatus including:
a driving assistance processing unit that generates information regarding safety performance evaluation for a driving assistance function; and
a communication unit that transmits the information,
in which the information transmitted from the communication unit includes first identification information for identifying the driving assistance processing unit and second identification information for identifying a mobile object on which the driving assistance processing unit and the communication unit are mounted.

(16) The information processing apparatus according to (15),
in which one or more sensors are built in or connected to the driving assistance processing unit, and
the information includes output information of the one or more sensors and third identification information for identifying the one or more sensors.

(17) The information processing apparatus according to (16), in which the information includes at least one of identification information of a signal processing LSI that implements a function of the driving assistance processing unit, version information of software that implements the function of the driving assistance processing unit, or accident information of the mobile object.

(18) The information processing apparatus according to any one of (15) to (17), in which the driving assistance processing unit dynamically sets a type of a specific message according to at least one of an area in which the mobile object is positioned or a time zone in which the communication unit performs communication.

(19) The information processing apparatus according to any one of (15) to (18), further including:
a first determination unit that determines whether or not a predetermined event has occurred; and
a second determination unit that determines whether or not the mobile object is traveling in a predetermined area or in a predetermined time zone,
in which the driving assistance processing unit generates dynamic information regarding safety performance corresponding to the event in a case where it is determined that the predetermined event has occurred, and in a case where it is determined that the predetermined event has occurred and it is determined that the mobile object is traveling in the predetermined area or the predetermined time zone, the transmission unit transmits the dynamic information corresponding to the event.

(20) An information processing method including:

generating information regarding safety performance evaluation for a driving assistance function of a mobile object; and transmitting a plurality of messages and the information from a communication unit, in which the information transmitted from the communication unit in a case where the communication unit transmits a specific message among the plurality of messages includes first identification information for identifying a driving assistance processing unit mounted on the mobile object and second identification information for identifying the mobile object on which the driving assistance processing unit and the communication unit are mounted.

(21) A program for causing a computer to perform:

acquiring information regarding a driving assistance function of a mobile object; and evaluating safety performance of the driving assistance function of the mobile object on the basis of the acquired information.

(22) A program causing a computer to perform:

causing a driving assistance processing unit to generate information regarding safety performance evaluation for a driving assistance function; and transmitting the messages and the information from a communication unit, in which the information transmitted from the communication unit in a case where the communication unit transmits a specific message among the plurality of messages includes first identification information for identifying the driving assistance processing unit and second identification information for identifying a mobile object on which the driving assistance processing unit and the communication unit are mounted.

(23) An information processing apparatus that assists driving of a mobile object, the information processing apparatus including:

a plurality of sensors;

an acquisition unit that acquires detection data of the plurality of sensors;

a computing unit that performs computation processing on the detection data;

a recognition unit that recognizes an object on the basis of the detection data; and a movement control unit that controls movement of the mobile object on the basis of data subjected to the computation processing performed by the computing unit, in which the plurality of sensors includes a first sensor that detects image data of an object that is a first target, and a second sensor that detects information regarding a distance to an object that is a second target, the recognition unit determines whether or not the object that is the first target and the object that is the second target are the same on the basis of the image data and the information regarding the distance, and recognizes the first target and the second target as one object in a case where the objects are determined as being the same, and the computing unit estimates a change in a relative distance between the one object recognized by the recognition unit and the mobile object, and changes at least one of a movement speed or a traveling direction of the mobile object with respect to the movement control unit in a case where it is determined that the mobile object is to collide with the one object.

(24) The information processing apparatus according to (23), further including:

a threshold value setting unit that sets a first threshold value related to a distance; and a group management unit that manages two or more objects recognized by the recognition unit as one group according to a condition, in which the computing unit calculates a distance between the one object and one different object in a case where the recognition unit recognizes the one different object in addition to the one object, and the group management unit manages the one object and the one different object as the one group in a case where the condition that the distance calculated by the computing unit is equal to or less than the first threshold value is satisfied.

(25) The information processing apparatus according to (24), in which the computing unit estimates a change in a relative distance between the one group managed by the group management unit and the mobile object, and changes at least one of the movement speed or the traveling direction of the mobile object with respect to the movement control unit in a case where it is determined that the mobile object is to collide with the one group.

(26) The information processing apparatus according to (24) or (25), in which the threshold value setting unit sets a second threshold value, the computing unit calculates a distance between the one group managed by the group management unit and the one object managed as the one group, and the group management unit removes the one object from the one group in a case where the distance is equal to or more than the second threshold value.

(27) The information processing apparatus according to (24) or (25), in which the threshold value setting unit sets a second threshold value, and the computing unit calculates a distance between the one object managed as the one group by the group management unit and the one different object, and the group management unit removes the one different object from the one group in a case where the distance between the one object managed as the one group and the one different object is equal to or more than the second threshold value.

(28) The information processing apparatus according to (26) or (27), in which the threshold value setting unit sets the second threshold value by adding a positive or negative offset to the first threshold value.

(29) The information processing apparatus according to any one of (24) to (28), in which in a case where an object managed as the one group is only the one object or the one different object, the group management unit associates history information indicating a constituent element of an object included in the one group with the one object or the one different object.

(30) A safety performance evaluation apparatus including:
an acquisition unit that acquires information regarding a driving assistance function of a mobile object; and
an evaluation unit that evaluates safety performance of the driving assistance function of the mobile object on the basis of the acquired information,
in which autonomous driving level control information regarding an autonomous driving level allowed for the mobile object is generated on the basis of the safety performance.

(31) The safety performance evaluation apparatus according to (30), in which the autonomous driving level control information indicates the autonomous driving level allowable for the mobile object.

(32) The safety performance evaluation apparatus according to (30), in which the autonomous driving level control information includes a safety performance evaluation result (safety performance evaluation level) used for determination of the autonomous driving level allowable for the mobile object.

Aspects of the present disclosure are not limited to the respective embodiments described above, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

1 Safety performance evaluation apparatus
2 Information processing apparatus
3 Safety performance evaluation system
4a First contract vehicle
4b Second contract vehicle
5 Server
6 Base station
7 RSU
8 Traffic light
11 Information acquisition unit
12 Registered information holding unit
13, 13a, 13b, 13c, 13d, 13e, 13f Safety performance evaluation unit
14 Insurance premium deciding unit
15 Insurance premium holding unit
16 Collected information holding unit
17 Number-of-times measurement unit
18, 18a Safety performance determination unit
19 Detection sensitivity calculation unit
20 Area setting unit
21, 21a, 21b Information extraction unit
22 Time zone setting unit
23 Accident information acquisition unit
24 Accident history information holding unit
25 Safety performance standard determination unit
26 Maintenance alert unit
27 Control information transmission unit
31 Input unit
32 Data acquisition unit
33, 33a, 33b Communication unit
34 In-vehicle device
35 Output control unit
36 Output unit
37 Drive system control unit
38 Drive system
39 Body system control unit
40 Body system
41 Storage unit
42, 42a Driving assistance processing unit
43 Communication network
45 Information processing unit
46, 46a Control unit
51 Input unit
52 First information acquisition unit
53 Object identification processing unit
54 Distance measurement unit
55 Integrated processing unit
56 Information holding unit
57 Obstacle determination unit
58 Output unit
61 Input unit
62 Second information acquisition unit
63 V2X message generation unit
64 Output unit
65, 65a Driving assistance auxiliary data acquisition unit
66, 66b Driving assistance control unit
67 Environment information generation unit
70 Computer
71 Bus
72 CPU
73 ROM
74 RAM
75 Input/output interface
76 Input unit
77 Output unit
78 Recording unit
79 Communication unit
80 Drive
81 Removable medium

The invention claimed is:

1. A safety performance evaluation apparatus, comprising:
at least one processor configured to:
acquire information regarding a driving assistance function of a mobile object, wherein
the information regarding the driving assistance function of the mobile object includes identification information of a driving assistance processor mounted on the mobile object;
control reception of a specific message from one of a base station or a roadside unit (RSU), wherein
the specific message is transmitted by the mobile object to the one of the base station or the RSU, and
the specific message is transmitted based on an output of a sensor mounted on the mobile object;
measure a number of times the specific message is transmitted by the driving assistance processor within a specific time period, wherein
the specific message includes information related to object detection;
evaluate safety performance of the driving assistance function of the mobile object based on the measured number of times and the identification information of the driving assistance processor; and
control transmission of control information to the mobile object based on the evaluated safety performance, wherein the control information causes the driving assistance processor to limit an autonomous driving function of the mobile object.

2. The safety performance evaluation apparatus according to claim 1, wherein
the information regarding the driving assistance function of the mobile object further includes safety performance information of the driving assistance processor, and
the at least one processor is further configured to evaluate the safety performance of the driving assistance function of the mobile object based on the safety performance information of the driving assistance processor.

3. The safety performance evaluation apparatus according to claim 2, wherein the safety performance information includes at least one of identification information or output information of the sensor connected to the driving assistance processor.

4. The safety performance evaluation apparatus according to claim 2, wherein the safety performance information includes at least one of identification information of a signal processing large scale integrated circuit (LSI) that implements a function of the driving assistance processor, version information of software that implements the function of the driving assistance processor, or accident information of the mobile object.

5. The safety performance evaluation apparatus according to claim 1, wherein the at least one processor is further configured to evaluate the safety performance of the driving assistance function of the mobile object based on detection capability of the sensor connected to the driving assistance processor.

6. The safety performance evaluation apparatus according to claim 5, wherein the at least one processor is further configured to evaluate the safety performance of the driving assistance function of the mobile object based on time difference information from a time at which the sensor detects a target object at a reference point to a time at which the mobile object passes through the reference point.

7. The safety performance evaluation apparatus according to claim 1, wherein the at least one processor is further configured to evaluate the safety performance of the driving assistance function of the mobile object based on output information of the sensor connected to the driving assistance processor.

8. The safety performance evaluation apparatus according to claim 1, wherein the at least one processor is further configured to:
set a determined area;
extract the information regarding the driving assistance function of the mobile object acquired within the determined area; and
evaluate the safety performance of the driving assistance function of the mobile object based on the extracted information.

9. The safety performance evaluation apparatus according to claim 1, wherein the at least one processor is further configured to:
set a determined time zone;
extract the information regarding the driving assistance function of the mobile object acquired within the determined time zone; and
evaluate the safety performance of the driving assistance function of the mobile object based on the extracted information.

10. The safety performance evaluation apparatus according to claim 1, wherein the at least one processor is further configured to determine an insurance premium for the mobile object based on the evaluated safety performance.

11. The safety performance evaluation apparatus according to claim 1, wherein the at least one processor is further configured to:
determine whether the evaluated safety performance has reached a determined standard; and
output an alert to urge maintenance of the driving assistance function of the mobile object in a case where the determined standard has not been reached.

12. The safety performance evaluation apparatus according to claim 1, wherein the at least one processor is further configured to:
determine an object detection sensitivity of the driving assistance processor based on a time difference (T2−T1) from a time T1 at which the sensor detects an obstacle at a reference point and causes transmission of the specific message to a time T2 at which the mobile object passes through the reference point; and
evaluate the safety performance of the driving assistance function of the mobile object based on the determined object detection sensitivity of the driving assistance processor.

13. A safety performance evaluation method, comprising:
acquiring information regarding a driving assistance function of a mobile object, wherein
the information regarding the driving assistance function of the mobile object includes identification information of a driving assistance processor mounted on the mobile object;
controlling reception of a specific message from one of a base station or a roadside unit (RSU), wherein
the specific message is transmitted by the mobile object to the one of the base station or the RSU, and
the specific message is transmitted based on an output of a sensor mounted on the mobile object;
measuring a number of times the specific message is transmitted by the driving assistance processor within a specific time period, wherein
the specific message includes information related to object detection;
evaluating safety performance of the driving assistance function of the mobile object based on the measured number of times and the identification information of the driving assistance processor; and
controlling transmission of control information to the mobile object based on the evaluated safety performance, wherein the control information causes the driving assistance processor to limit an autonomous driving function of the mobile object.

14. An information processing apparatus, comprising:
a driving assistance processor configured to:
generate information regarding safety performance evaluation for a driving assistance function;
control transmission of the information, wherein the transmitted information includes first identification information that identifies the driving assistance processor and second identification information that identifies a mobile object on which the driving assistance processor is mounted; and
control transmission of a specific message based on an output of at least one sensor mounted on the mobile object, wherein the specific message is transmitted a number of times within a determined time period.

15. The information processing apparatus according to claim 14, wherein
the at least one sensor is connected to the driving assistance processor, and the information further includes output information of the at least one sensor and third identification information that identifies the at least one sensor.

16. The information processing apparatus according to claim 15, wherein the information further includes at least one of identification information of a signal processing large scale integrated circuit (LSI) that implements a function of the driving assistance processor, version information of software that implements the function of the driving assistance processor, or accident information of the mobile object.

17. The information processing apparatus according to claim 14, wherein the driving assistance processor is further configured to dynamically set a type of the specific message according to at least one of an area in which the mobile object is positioned or a time zone in which the transmission is performed.

18. The information processing apparatus according to claim 14, wherein the driving assistance processor is further configured to:
    determine whether a determined event has occurred;
    determine whether the mobile object is traveling in one of a determined area or in a determined time zone;
    generate dynamic information regarding safety performance corresponding to the determined event in a case where the determined event has occurred; and
    in a case where the determined event has occurred and the mobile object is traveling in one of the determined area or the determined time zone, control transmission of the dynamic information corresponding to the determined event.

19. An information processing method, comprising:
    generating information regarding safety performance evaluation for a driving assistance function of a mobile object;
    controlling transmission of the information, wherein the transmitted information includes first identification information that identifies a driving assistance processor mounted on the mobile object and second identification information that identifies the mobile object on which the driving assistance processor is mounted; and
    controlling transmission of a specific message based on an output of at least one sensor mounted on the mobile object, wherein the specific message is transmitted a number of times within a determined time period.

* * * * *